United States Patent
Hosoi et al.

(10) Patent No.: US 10,967,521 B2
(45) Date of Patent: Apr. 6, 2021

(54) ROBOT AND ROBOT SYSTEM

(71) Applicant: Finewell Co., Ltd., Osaka (JP)

(72) Inventors: Hiroshi Hosoi, Osaka (JP); Yoji Hosoi, Osaka (JP); Masahide Tanaka, Osaka (JP)

(73) Assignee: Finewell Co., Ltd., Osaka (JP)

( * ) Notice: Subject to any disclaimer, the term of this patent is extended or adjusted under 35 U.S.C. 154(b) by 352 days.

(21) Appl. No.: 15/743,723

(22) PCT Filed: Jul. 14, 2016

(86) PCT No.: PCT/JP2016/070848
§ 371 (c)(1),
(2) Date: Jan. 11, 2018

(87) PCT Pub. No.: WO2017/010547
PCT Pub. Date: Jan. 19, 2017

(65) Prior Publication Data
US 2019/0381672 A1 Dec. 19, 2019

(30) Foreign Application Priority Data

Jul. 15, 2015 (JP) .................................. 2015-141168
Jul. 13, 2016 (JP) ............................. JP2016-138187

(51) Int. Cl.
*G06F 17/00* (2019.01)
*B25J 11/00* (2006.01)
(Continued)

(52) U.S. Cl.
CPC ......... *B25J 11/0005* (2013.01); *B25J 9/0009* (2013.01); *B25J 9/101* (2013.01);
(Continued)

(58) Field of Classification Search
CPC ...... B25J 11/0005; B25J 9/0009; B25J 9/101; B25J 15/0009; H04R 1/1016
See application file for complete search history.

(56) References Cited

U.S. PATENT DOCUMENTS

| 2,045,404 A | 6/1936 | Nicholides |
| 4,351,166 A | 9/1982 | Belin |
| (Continued) | | |

FOREIGN PATENT DOCUMENTS

| CN | 2198618 | 5/1995 |
| CN | 1110857 A | 10/1995 |
| (Continued) | | |

OTHER PUBLICATIONS

SIPO, Office Action dated Aug. 8, 2018 for Chinese application No. 201580044713.0 (with English translation).
(Continued)

*Primary Examiner* — Simon King
(74) *Attorney, Agent, or Firm* — Fish & Richardson P.C.

(57) ABSTRACT

Provided is a robot to which is disposed a cartilage vibration-transmission source, the robot being configured so that both hands of the robot are lain onto the face of a person or hold the back of the head, or so that one hand touches the cartilage of the ear. The relative positions of both hands touching the cartilage of both ears are maintained, but movement of the face is not restricted. The hands of the robot extend in the line-of-sight direction of the robot. The mouth of the robot is caused to move in conjunction with cartilage transmission audio. A limiter is applied to the touch pressure of the hands. Permission is sought before touching. Safety is confirmed before touching. When a malfunction occurs, touching with the hands is cancelled. The hands are warmed to the temperature of the human body.

13 Claims, 23 Drawing Sheets

(51) Int. Cl.
  *B25J 9/00* (2006.01)
  *B25J 9/10* (2006.01)
  *B25J 15/00* (2006.01)
  *H04R 1/10* (2006.01)
  *H04R 5/027* (2006.01)
  *H04R 5/04* (2006.01)
  *H04R 25/00* (2006.01)

(52) U.S. Cl.
  CPC ........ *B25J 15/0009* (2013.01); *H04R 1/1016* (2013.01); *H04R 5/027* (2013.01); *H04R 5/04* (2013.01); *H04R 25/407* (2013.01); *H04R 1/1041* (2013.01); *H04R 1/1075* (2013.01); *H04R 2460/09* (2013.01); *H04R 2460/11* (2013.01); *H04R 2460/13* (2013.01); *H04R 2499/11* (2013.01)

(56) References Cited

U.S. PATENT DOCUMENTS

| | | |
|---|---|---|
| 5,125,032 A | 6/1992 | Meister |
| RE34,525 E | 2/1994 | Lazzaroni |
| 5,295,193 A | 3/1994 | Ono |
| 5,323,468 A | 6/1994 | Bottesch |
| 5,396,563 A | 3/1995 | Yoshimi |
| 5,682,173 A | 10/1997 | Holakovszky et al. |
| 5,686,882 A | 11/1997 | Giani |
| 5,687,244 A | 11/1997 | Untersander |
| 5,956,682 A | 9/1999 | Loudermilk |
| 5,986,813 A | 11/1999 | Saikawa |
| 6,028,556 A | 2/2000 | Shiraki |
| 6,380,923 B1 | 4/2002 | Fukumoto et al. |
| 6,456,721 B1 | 9/2002 | Fukuda |
| 6,463,157 B1 | 10/2002 | May |
| 6,483,917 B1 | 11/2002 | Kang et al. |
| 6,603,863 B1 | 8/2003 | Nagayoshi |
| 6,754,359 B1 | 6/2004 | Svean |
| 6,825,830 B1 | 11/2004 | Kanesaka et al. |
| 6,912,287 B1 * | 6/2005 | Fukumoto ............... G06F 1/163 379/430 |
| 6,950,126 B1 | 9/2005 | Homma et al. |
| 6,957,049 B1 | 10/2005 | Takeda |
| 7,231,235 B2 | 6/2007 | Harrold |
| 7,257,372 B2 | 8/2007 | Kaltenbach |
| 7,437,122 B2 | 10/2008 | Choi |
| 7,442,164 B2 | 10/2008 | Berrang et al. |
| 7,555,136 B2 | 6/2009 | Wang |
| 7,616,771 B2 | 11/2009 | Lenhardt |
| 7,783,034 B2 | 8/2010 | Manne |
| 7,822,215 B2 | 10/2010 | Carazo |
| 7,890,147 B2 | 2/2011 | Tanada |
| 8,194,875 B2 | 6/2012 | Miranda |
| 8,238,967 B1 | 8/2012 | Arnold et al. |
| 8,433,080 B2 | 4/2013 | Rader |
| 8,521,239 B2 | 8/2013 | Hosoi et al. |
| 8,526,646 B2 | 9/2013 | Boesen |
| 8,532,322 B2 | 9/2013 | Parker |
| 8,886,263 B2 | 11/2014 | Hosoi et al. |
| 8,918,149 B2 | 12/2014 | Hosoi et al. |
| 9,020,168 B2 | 4/2015 | Karkkainen |
| 9,020,170 B2 | 4/2015 | Hosoi et al. |
| 9,107,466 B2 | 8/2015 | Hoying |
| 9,313,306 B2 | 4/2016 | Hosoi et al. |
| 9,351,090 B2 | 5/2016 | Tachibana |
| 9,367,087 B1 | 6/2016 | Townsend et al. |
| 9,471,102 B2 | 10/2016 | Townsend et al. |
| 9,552,707 B1 | 1/2017 | Bala |
| 9,565,285 B2 | 2/2017 | Theverapperunna |
| 9,949,670 B2 | 4/2018 | Ikeda |
| 10,016,161 B2 | 7/2018 | Townsend et al. |
| 10,079,925 B2 | 9/2018 | Hosoi |
| 10,356,231 B2 | 7/2019 | Hosoi et al. |
| 2001/0011951 A1 | 8/2001 | Kimata et al. |
| 2001/0026626 A1 | 10/2001 | Athanas |
| 2002/0001381 A1 | 1/2002 | Mori |
| 2002/0003604 A1 | 1/2002 | Yaguchi |
| 2002/0012441 A1 | 1/2002 | Matsunaga et al. |
| 2002/0068995 A1 | 6/2002 | Yoshida |
| 2002/0114214 A1 | 8/2002 | Hansen et al. |
| 2002/0115478 A1 | 8/2002 | Fujisawa et al. |
| 2002/0149561 A1 | 10/2002 | Fukumoto et al. |
| 2002/0183014 A1 | 12/2002 | Takeda et al. |
| 2003/0064758 A1 | 4/2003 | Mizuta et al. |
| 2003/0083112 A1 | 5/2003 | Fukuda |
| 2003/0108209 A1 | 6/2003 | McIntosh |
| 2003/0118197 A1 | 6/2003 | Nagayasu et al. |
| 2003/0119566 A1 | 6/2003 | Chen |
| 2003/0174856 A1 | 9/2003 | Johannsen et al. |
| 2004/0013279 A1 | 1/2004 | Takeda |
| 2004/0048633 A1 | 3/2004 | Sato et al. |
| 2004/0086149 A1 | 5/2004 | Johannsen et al. |
| 2004/0087346 A1 | 5/2004 | Johannsen et al. |
| 2004/0105566 A1 | 6/2004 | Matsunaga et al. |
| 2004/0131211 A1 | 7/2004 | Miyata et al. |
| 2004/0132509 A1 | 7/2004 | Glezerman |
| 2004/0137963 A1 | 7/2004 | Barras et al. |
| 2004/0189151 A1 | 9/2004 | Athanas |
| 2004/0207542 A1 | 10/2004 | Chang et al. |
| 2004/0259513 A1 | 12/2004 | Park |
| 2005/0031152 A1 | 2/2005 | Hansen et al. |
| 2005/0046790 A1 | 3/2005 | Jannard et al. |
| 2005/0088530 A1 | 4/2005 | Homma et al. |
| 2005/0129257 A1 | 6/2005 | Tamura |
| 2005/0160270 A1 | 7/2005 | Goldberg |
| 2005/0176459 A1 | 8/2005 | Fukuda |
| 2005/0184875 A1 | 8/2005 | Schmandt et al. |
| 2005/0185813 A1 | 8/2005 | Sinclair et al. |
| 2005/0207599 A1 | 9/2005 | Fukumoto et al. |
| 2005/0213432 A1 | 9/2005 | Hoshuyama |
| 2005/0232436 A1 | 10/2005 | Nagayasu et al. |
| 2005/0237685 A1 | 10/2005 | Miyata |
| 2005/0244020 A1 * | 11/2005 | Nakajima ............... G10L 21/06 381/151 |
| 2005/0260969 A1 | 11/2005 | Nagata et al. |
| 2005/0275714 A1 | 12/2005 | Ishikawa et al. |
| 2005/0276164 A1 | 12/2005 | Amron |
| 2005/0286734 A1 | 12/2005 | Wang |
| 2006/0079271 A1 | 4/2006 | Granovetter et al. |
| 2006/0089522 A1 | 4/2006 | Rastatter et al. |
| 2006/0093161 A1 | 5/2006 | Falcon |
| 2006/0094464 A1 | 5/2006 | Kyou et al. |
| 2006/0113932 A1 | 6/2006 | Mori et al. |
| 2006/0120546 A1 | 6/2006 | Tanaka et al. |
| 2006/0121960 A1 | 6/2006 | Wang |
| 2006/0140439 A1 | 6/2006 | Nakagawa |
| 2006/0158064 A1 | 7/2006 | Asakawa et al. |
| 2006/0159297 A1 | 7/2006 | Wirola et al. |
| 2006/0171107 A1 | 8/2006 | Yamamoto et al. |
| 2006/0215873 A1 | 9/2006 | Hansen et al. |
| 2006/0216022 A1 | 9/2006 | Lee et al. |
| 2006/0227984 A1 | 10/2006 | Sinclair |
| 2006/0262951 A1 | 11/2006 | Jun |
| 2006/0286998 A1 | 12/2006 | Fukuda |
| 2007/0003098 A1 | 1/2007 | Martenson |
| 2007/0014423 A1 | 1/2007 | Darbut et al. |
| 2007/0015467 A1 | 1/2007 | Nagayasu et al. |
| 2007/0019452 A1 | 1/2007 | Ohkubo et al. |
| 2007/0025574 A1 | 2/2007 | Azima et al. |
| 2007/0036370 A1 | 2/2007 | Granovetter et al. |
| 2007/0053530 A1 | 3/2007 | Ochiai et al. |
| 2007/0057601 A1 | 3/2007 | Kawase et al. |
| 2007/0080951 A1 | 4/2007 | Maruyama et al. |
| 2007/0081679 A1 | 4/2007 | Suzuki et al. |
| 2007/0098200 A1 | 5/2007 | Takei |
| 2007/0117594 A1 | 5/2007 | Ong |
| 2007/0160238 A1 | 7/2007 | Kobayashi |
| 2007/0160253 A1 | 7/2007 | Takei et al. |
| 2007/0249395 A1 | 10/2007 | Kondo et al. |
| 2007/0263893 A1 | 11/2007 | Kim |
| 2007/0269777 A1 | 11/2007 | Fux |
| 2007/0297637 A1 | 12/2007 | Sugiyama |
| 2008/0008344 A1 | 1/2008 | Wakabayashi et al. |
| 2008/0054862 A1 | 3/2008 | Hara |

(56) References Cited

U.S. PATENT DOCUMENTS

| | | |
|---|---|---|
| 2008/0092278 A1 | 4/2008 | Rogers et al. |
| 2008/0106449 A1 | 5/2008 | Doi |
| 2008/0107290 A1 | 5/2008 | Tamura |
| 2008/0107300 A1 | 5/2008 | Chen |
| 2008/0123893 A1 | 5/2008 | Lee |
| 2008/0129703 A1 | 6/2008 | Takeshita et al. |
| 2008/0137883 A1 | 6/2008 | Araki |
| 2008/0139254 A1 | 6/2008 | Levy |
| 2008/0140868 A1 | 6/2008 | Kalayjian et al. |
| 2008/0143512 A1 | 6/2008 | Wakisaka et al. |
| 2008/0170725 A1 | 7/2008 | Asada et al. |
| 2008/0205679 A1 | 8/2008 | Darbut et al. |
| 2008/0227490 A1 | 9/2008 | Homma et al. |
| 2008/0227501 A1 | 9/2008 | Joe et al. |
| 2008/0239061 A1 | 10/2008 | Cok et al. |
| 2008/0240465 A1 | 10/2008 | Shiraishi |
| 2008/0247562 A1 | 10/2008 | Nagayasu et al. |
| 2008/0267433 A1 | 10/2008 | Katou et al. |
| 2008/0297373 A1 | 12/2008 | Hayakawa et al. |
| 2008/0319250 A1 | 12/2008 | Asnes |
| 2009/0002626 A1 | 1/2009 | Wakabayashi |
| 2009/0028356 A1 | 1/2009 | Ambrose et al. |
| 2009/0069045 A1 | 3/2009 | Cheng |
| 2009/0093283 A1 | 4/2009 | Mizuta et al. |
| 2009/0129620 A1 | 5/2009 | Tagawa et al. |
| 2009/0156186 A1 | 6/2009 | Lyle |
| 2009/0158423 A1 | 6/2009 | Orlassino |
| 2009/0184884 A1 | 7/2009 | Kyou et al. |
| 2009/0185699 A1 | 7/2009 | Kim |
| 2009/0226011 A1 | 9/2009 | Abolfathi et al. |
| 2009/0226017 A1 | 9/2009 | Abolfathi et al. |
| 2009/0226020 A1 | 9/2009 | Abolfathi et al. |
| 2009/0245556 A1 | 10/2009 | Parker et al. |
| 2009/0245557 A1 | 10/2009 | Parker |
| 2009/0288489 A1 | 11/2009 | Lee et al. |
| 2009/0290730 A1 | 11/2009 | Fukuda et al. |
| 2009/0304210 A1 | 12/2009 | Weisman |
| 2009/0323976 A1 | 12/2009 | Asada et al. |
| 2010/0056227 A1 | 3/2010 | Hayakawa et al. |
| 2010/0061582 A1 | 3/2010 | Takigawa et al. |
| 2010/0061584 A1 | 3/2010 | Lin et al. |
| 2010/0098269 A1 | 4/2010 | Abolfathi et al. |
| 2010/0150368 A1 | 6/2010 | Chang et al. |
| 2010/0172519 A1 | 7/2010 | Kimura et al. |
| 2010/0178597 A1 | 7/2010 | Ishida et al. |
| 2010/0178957 A1 | 7/2010 | Chen |
| 2010/0184487 A1 | 7/2010 | Takada |
| 2010/0216526 A1 | 8/2010 | Chen et al. |
| 2010/0222639 A1 | 9/2010 | Purcell |
| 2010/0238108 A1 | 9/2010 | Rekimoto |
| 2010/0245585 A1 | 9/2010 | Fisher |
| 2010/0246878 A1 | 9/2010 | Sim |
| 2010/0254562 A1 | 10/2010 | Koo |
| 2010/0310086 A1 | 12/2010 | Magrath et al. |
| 2010/0311462 A1 | 12/2010 | Endo et al. |
| 2010/0320961 A1 | 12/2010 | Castillo |
| 2010/0322127 A1 | 12/2010 | Nakajima |
| 2010/0328033 A1 | 12/2010 | Kamei |
| 2010/0329485 A1 | 12/2010 | Fukuda et al. |
| 2011/0028190 A1 | 2/2011 | Mizuta et al. |
| 2011/0028777 A1 | 2/2011 | Rastatter et al. |
| 2011/0034219 A1 | 2/2011 | Filson |
| 2011/0059769 A1 | 3/2011 | Brunolli |
| 2011/0143769 A1 | 6/2011 | Jones et al. |
| 2011/0143819 A1 | 6/2011 | Sugiyama et al. |
| 2011/0158425 A1 | 6/2011 | Hayakawa |
| 2011/0159855 A1 | 6/2011 | Cheng |
| 2011/0169622 A1 | 7/2011 | Billmaier |
| 2011/0170718 A1 | 7/2011 | Fukuda et al. |
| 2011/0180542 A1 | 7/2011 | Drollinger et al. |
| 2011/0201301 A1 | 8/2011 | Okada et al. |
| 2011/0237306 A1 | 9/2011 | Kamii |
| 2011/0254616 A1 | 10/2011 | Kawano |
| 2011/0263200 A1 | 10/2011 | Thornton et al. |
| 2011/0267551 A1 | 11/2011 | Yokote et al. |
| 2011/0280416 A1 | 11/2011 | Abolfathi et al. |
| 2011/0281617 A1 | 11/2011 | Kim et al. |
| 2011/0293105 A1 | 12/2011 | Arie et al. |
| 2011/0293133 A1 | 12/2011 | Yan |
| 2011/0299695 A1 | 12/2011 | Nicholson |
| 2011/0301729 A1 | 12/2011 | Heiman et al. |
| 2011/0316289 A1 | 12/2011 | Trimarche |
| 2011/0319016 A1 | 12/2011 | Gormley et al. |
| 2012/0008793 A1 | 1/2012 | Knox et al. |
| 2012/0008807 A1 | 1/2012 | Gran |
| 2012/0010735 A1 | 1/2012 | Gilboa |
| 2012/0020503 A1 | 1/2012 | Endo et al. |
| 2012/0028679 A1 | 2/2012 | Ozasa |
| 2012/0082329 A1 | 4/2012 | Neumeyer |
| 2012/0082335 A1 | 4/2012 | Duisters et al. |
| 2012/0105192 A1 | 5/2012 | Norieda |
| 2012/0130660 A1 | 5/2012 | Neumeyer |
| 2012/0133213 A1 | 5/2012 | Borke et al. |
| 2012/0139750 A1 | 6/2012 | Hayakawa et al. |
| 2012/0140917 A1 | 6/2012 | Nicholson et al. |
| 2012/0162143 A1 | 6/2012 | Kai et al. |
| 2012/0182429 A1 | 7/2012 | Forutanpour et al. |
| 2012/0183163 A1 | 7/2012 | Apfel |
| 2012/0219161 A1 | 8/2012 | Amada |
| 2012/0221329 A1 | 8/2012 | Harsch |
| 2012/0237075 A1 | 9/2012 | East et al. |
| 2012/0238908 A1 | 9/2012 | Osako et al. |
| 2012/0244917 A1 | 9/2012 | Hosoi et al. |
| 2012/0249223 A1 | 10/2012 | Neugebauer |
| 2012/0253236 A1 | 10/2012 | Snow |
| 2012/0283746 A1 | 11/2012 | Hu et al. |
| 2012/0289162 A1 | 11/2012 | Hosoi et al. |
| 2012/0298441 A1 | 11/2012 | Lin et al. |
| 2012/0300956 A1 | 11/2012 | Horii |
| 2012/0301859 A1 | 11/2012 | Rastatter et al. |
| 2012/0330654 A1 | 12/2012 | Angell |
| 2013/0039508 A1 | 2/2013 | Chen et al. |
| 2013/0051585 A1 | 2/2013 | Karkkainen |
| 2013/0100596 A1 | 4/2013 | Yokote et al. |
| 2013/0111346 A1 | 5/2013 | Little |
| 2013/0120311 A1 | 5/2013 | Ichikawa |
| 2013/0129121 A1 | 5/2013 | Yamashita |
| 2013/0133424 A1* | 5/2013 | Donaldson ......... A61B 5/02444 73/510 |
| 2013/0136279 A1 | 5/2013 | Brown |
| 2013/0142348 A1 | 6/2013 | Weisman |
| 2013/0169352 A1 | 7/2013 | Kawano |
| 2013/0169829 A1 | 7/2013 | Homma et al. |
| 2013/0177188 A1 | 7/2013 | Apfel |
| 2013/0180033 A1 | 7/2013 | Uemoto et al. |
| 2013/0191114 A1 | 7/2013 | Gim |
| 2013/0236043 A1 | 9/2013 | Abolfathi et al. |
| 2013/0242262 A1 | 9/2013 | Lewis |
| 2013/0242809 A1 | 9/2013 | Tone et al. |
| 2013/0252675 A1 | 9/2013 | Nicholson |
| 2013/0259221 A1 | 10/2013 | Shusaku et al. |
| 2013/0281152 A1 | 10/2013 | Nishimura |
| 2013/0293373 A1 | 11/2013 | Gegner et al. |
| 2013/0301860 A1 | 11/2013 | Neumeyer et al. |
| 2013/0308799 A1 | 11/2013 | Lin et al. |
| 2013/0316691 A1 | 11/2013 | Forutanpour et al. |
| 2013/0324193 A1 | 12/2013 | Hosoi et al. |
| 2013/0335210 A1 | 12/2013 | Arai et al. |
| 2013/0336507 A1 | 12/2013 | Gran |
| 2014/0003641 A1 | 1/2014 | Neumeyer et al. |
| 2014/0086417 A1 | 3/2014 | Hansen et al. |
| 2014/0120834 A1 | 5/2014 | Gormley et al. |
| 2014/0205131 A1 | 6/2014 | Azmi et al. |
| 2014/0201889 A1 | 7/2014 | Pietrzak |
| 2014/0233356 A1 | 8/2014 | Pattikonda |
| 2014/0305714 A1 | 10/2014 | Huang |
| 2014/0313280 A1 | 10/2014 | Takuno et al. |
| 2014/0342783 A1 | 11/2014 | Suzuki et al. |
| 2014/0355792 A1 | 12/2014 | Nabata |
| 2014/0378191 A1 | 12/2014 | Hosoi et al. |
| 2015/0022438 A1 | 1/2015 | Hong |
| 2015/0023527 A1 | 1/2015 | Sato |
| 2015/0043748 A1 | 2/2015 | Sudo |
| 2015/0043758 A1 | 2/2015 | Yamada |

(56) References Cited

U.S. PATENT DOCUMENTS

| | | |
|---|---|---|
| 2015/0054779 A1 | 2/2015 | Horii et al. |
| 2015/0065057 A1 | 3/2015 | Hosoi et al. |
| 2015/0070083 A1 | 3/2015 | Kawano |
| 2015/0078569 A1 | 3/2015 | Magrath et al. |
| 2015/0086047 A1 | 3/2015 | Horii et al. |
| 2015/0110318 A1 | 4/2015 | Miyano |
| 2015/0110322 A1 | 4/2015 | Andersson |
| 2015/0131816 A1 | 5/2015 | Inagaki |
| 2015/0131838 A1 | 5/2015 | Horii |
| 2015/0141088 A1 | 5/2015 | Hosoi et al. |
| 2015/0156295 A1 | 6/2015 | Kazama |
| 2015/0172588 A1 | 6/2015 | Homma et al. |
| 2015/0180547 A1 | 6/2015 | Gormley et al. |
| 2015/0181338 A1* | 6/2015 | Hosoi ............... H04M 1/03 381/309 |
| 2015/0208153 A1 | 7/2015 | Hosoi et al. |
| 2015/0256656 A1 | 9/2015 | Horii |
| 2015/0256946 A1 | 9/2015 | Neumeyer et al. |
| 2015/0289052 A1 | 10/2015 | Takeda et al. |
| 2015/0320135 A1 | 11/2015 | Lowe |
| 2016/0007109 A1 | 1/2016 | Neumeyer et al. |
| 2016/0018892 A1* | 1/2016 | Gu ..................... G06F 3/014 345/156 |
| 2016/0058091 A1 | 3/2016 | Sasaki |
| 2016/0062392 A1 | 3/2016 | Townsend et al. |
| 2016/0073202 A1 | 3/2016 | Nabata et al. |
| 2016/0086594 A1 | 3/2016 | Asada et al. |
| 2016/0100262 A1 | 4/2016 | Inagaki |
| 2016/0150328 A1 | 5/2016 | Inagaki |
| 2016/0205233 A1 | 7/2016 | Hosoi et al. |
| 2016/0248894 A1 | 8/2016 | Hosoi et al. |
| 2016/0261299 A1 | 9/2016 | Hosoi et al. |
| 2016/0286296 A1 | 9/2016 | Hosoi et al. |
| 2016/0337760 A1 | 11/2016 | Suenaga |
| 2016/0349803 A1 | 12/2016 | Dusan |
| 2017/0006144 A1 | 1/2017 | Hosoi et al. |
| 2017/0013338 A1* | 1/2017 | Wong ................ H04R 1/025 |
| 2017/0026727 A1 | 1/2017 | Hosoi et al. |
| 2017/0213452 A1 | 7/2017 | Brunolli |
| 2017/0230754 A1 | 8/2017 | Dusan |
| 2017/0295269 A1 | 10/2017 | Hosoi |
| 2017/0302320 A1 | 10/2017 | Hosoi et al. |
| 2017/0353797 A1 | 12/2017 | Hosoi et al. |
| 2018/0124222 A1 | 5/2018 | Hosoi et al. |
| 2018/0199127 A1 | 7/2018 | Hosoi et al. |
| 2018/0262839 A1 | 7/2018 | Hosoi et al. |
| 2018/0259915 A1 | 9/2018 | Hosoi |
| 2018/0332152 A1 | 11/2018 | Hosoi et al. |
| 2018/0352061 A1 | 12/2018 | Hosoi |
| 2019/0028580 A1 | 1/2019 | Hosoi et al. |
| 2020/0050269 A1* | 2/2020 | Gu ..................... B25J 9/0006 |
| 2020/0068308 A1 | 2/2020 | Hosoi et al. |

FOREIGN PATENT DOCUMENTS

| | | |
|---|---|---|
| CN | 1276142 | 12/2000 |
| CN | 1311942 | 9/2001 |
| CN | 1411253 | 4/2003 |
| CN | 2575916 Y | 9/2003 |
| CN | 1141856 | 3/2004 |
| CN | 1627864 A | 6/2005 |
| CN | 1672114 | 9/2005 |
| CN | 1679371 | 10/2005 |
| CN | 1723733 A | 1/2006 |
| CN | 1791283 | 6/2006 |
| CN | 2800681 Y | 7/2006 |
| CN | 1843019 | 10/2006 |
| CN | 1984505 A | 6/2007 |
| CN | 101022678 A | 8/2007 |
| CN | 201035260 Y | 3/2008 |
| CN | 101267463 | 9/2008 |
| CN | 101277331 | 10/2008 |
| CN | 101321196 | 12/2008 |
| CN | 101355823 | 1/2009 |
| CN | 101360140 | 2/2009 |
| CN | 101390438 | 3/2009 |
| CN | 101390440 | 3/2009 |
| CN | 201216023 | 4/2009 |
| CN | 101513081 | 8/2009 |
| CN | 101594161 | 12/2009 |
| CN | 101795143 | 8/2010 |
| CN | 101874410 | 10/2010 |
| CN | 101897198 | 11/2010 |
| CN | 101978704 | 2/2011 |
| CN | 102075633 | 5/2011 |
| CN | 201845183 U | 5/2011 |
| CN | 102670206 | 9/2012 |
| CN | 202652216 | 1/2013 |
| CN | 102959930 | 3/2013 |
| CN | 103053147 | 4/2013 |
| CN | 203039851 | 7/2013 |
| CN | 103281953 | 9/2013 |
| CN | 203181220 | 9/2013 |
| CN | 103891308 | 6/2014 |
| CN | 103999480 | 8/2014 |
| EP | 1705875 | 3/2005 |
| EP | 1705075 | 9/2006 |
| EP | 1705874 | 9/2006 |
| EP | 1 783 919 | 5/2007 |
| EP | 1970792 | 9/2008 |
| EP | 2388981 | 11/2011 |
| EP | 2544430 | 1/2013 |
| JP | S51-94220 | 8/1976 |
| JP | S5236894 A | 3/1977 |
| JP | S55-088497 | 7/1980 |
| JP | S56-17780 U | 2/1981 |
| JP | S5690018 | 7/1981 |
| JP | S56089086 | 7/1981 |
| JP | S57162611 | 10/1982 |
| JP | S57169312 U | 10/1982 |
| JP | S58-182398 | 10/1983 |
| JP | S60116800 U | 8/1985 |
| JP | S62-208680 | 9/1987 |
| JP | S63-115728 U | 7/1988 |
| JP | 63-142981 | 9/1988 |
| JP | S63140753 U | 9/1988 |
| JP | H0212099 | 1/1990 |
| JP | H02-62199 | 3/1990 |
| JP | 2-182098 | 7/1990 |
| JP | H02-248121 | 10/1990 |
| JP | 3-29424 | 2/1991 |
| JP | H03117995 | 12/1991 |
| JP | 4-90298 | 3/1992 |
| JP | H04-303815 | 10/1992 |
| JP | H0573073 | 3/1993 |
| JP | H05-41297 | 6/1993 |
| JP | H05-183618 | 7/1993 |
| JP | H05-207579 | 8/1993 |
| JP | H05-292167 | 11/1993 |
| JP | 06-030494 | 2/1994 |
| JP | 3003950 U | 8/1994 |
| JP | 3009206 | 1/1995 |
| JP | 07-107146 | 4/1995 |
| JP | 07-131268 | 5/1995 |
| JP | H7-039150 U | 7/1995 |
| JP | H07210176 | 8/1995 |
| JP | 08-033026 | 2/1996 |
| JP | H879338 | 3/1996 |
| JP | 8-102780 | 4/1996 |
| JP | H08-090986 | 4/1996 |
| JP | H08111703 | 4/1996 |
| JP | 08-237185 | 9/1996 |
| JP | H08-256080 | 10/1996 |
| JP | H09-023256 | 1/1997 |
| JP | H10-042021 | 2/1998 |
| JP | 3050147 | 4/1998 |
| JP | 10-136480 | 5/1998 |
| JP | H10-200608 | 7/1998 |
| JP | 10-227 U | 9/1998 |
| JP | H11112672 | 4/1999 |
| JP | H11-163980 | 6/1999 |
| JP | 3064055 U | 9/1999 |
| JP | 11-298595 | 10/1999 |

(56) References Cited

FOREIGN PATENT DOCUMENTS

| | | |
|---|---|---|
| JP | H11-352138 | 12/1999 |
| JP | 2000-013294 | 1/2000 |
| JP | 2000-031858 | 1/2000 |
| JP | 2000-49935 | 2/2000 |
| JP | 3066305 U | 2/2000 |
| JP | 3070222 U | 4/2000 |
| JP | 2000/217015 | 8/2000 |
| JP | 2000-295696 | 10/2000 |
| JP | 2000-322186 | 11/2000 |
| JP | 2000-324217 | 11/2000 |
| JP | 2000-339793 | 12/2000 |
| JP | 2001125742 | 5/2001 |
| JP | 2001-177809 | 6/2001 |
| JP | 2001169016 | 6/2001 |
| JP | 2001-268211 | 9/2001 |
| JP | 2001-287183 A | 10/2001 |
| JP | 2001287183 | 10/2001 |
| JP | 2001-320790 | 11/2001 |
| JP | 2001-333161 | 11/2001 |
| JP | 2001-339504 | 12/2001 |
| JP | 2001-352395 | 12/2001 |
| JP | 2002-016720 | 1/2002 |
| JP | 2002023115 | 1/2002 |
| JP | 2002-036158 A | 2/2002 |
| JP | 2002-041411 A | 2/2002 |
| JP | 2002036158 | 2/2002 |
| JP | 2002041411 | 2/2002 |
| JP | 2002051111 | 2/2002 |
| JP | 2002-84575 | 3/2002 |
| JP | 2002-111822 | 4/2002 |
| JP | 2002-149312 | 5/2002 |
| JP | 2002-164986 | 6/2002 |
| JP | 2002-171321 | 6/2002 |
| JP | 2002-223475 | 8/2002 |
| JP | 2002-238262 | 8/2002 |
| JP | 2002-262377 | 9/2002 |
| JP | 3090729 U | 10/2002 |
| JP | 2002-359889 | 12/2002 |
| JP | 2002-368839 | 12/2002 |
| JP | 2003-032768 | 1/2003 |
| JP | 2003032343 | 1/2003 |
| JP | 2003-037651 | 2/2003 |
| JP | 2003-037885 | 2/2003 |
| JP | 2003-102094 | 4/2003 |
| JP | 2003-103220 | 4/2003 |
| JP | 2003-111175 | 4/2003 |
| JP | 2003-125473 | 4/2003 |
| JP | 2003101625 | 4/2003 |
| JP | 2003-143253 | 5/2003 |
| JP | 2003-145048 | 5/2003 |
| JP | 2003-169115 | 6/2003 |
| JP | 2003-173375 | 6/2003 |
| JP | 2003-179988 | 6/2003 |
| JP | 2003-188985 | 7/2003 |
| JP | 2003-211087 | 7/2003 |
| JP | 2003-218989 | 7/2003 |
| JP | 2003198719 | 7/2003 |
| JP | 2003-274376 | 9/2003 |
| JP | 2003-274470 | 9/2003 |
| JP | 2003-300015 | 10/2003 |
| JP | 2003-304308 | 10/2003 |
| JP | 2003-319022 | 11/2003 |
| JP | 2003-348208 | 12/2003 |
| JP | 2004-064457 | 2/2004 |
| JP | 2004-094389 | 3/2004 |
| JP | 2004-128915 | 4/2004 |
| JP | 2004-157873 | 6/2004 |
| JP | 2004-158961 | 6/2004 |
| JP | 2004-166174 | 6/2004 |
| JP | 2004-173018 | 6/2004 |
| JP | 2004-173264 | 6/2004 |
| JP | 2004-187031 | 7/2004 |
| JP | 2004-205839 | 7/2004 |
| JP | 2004190699 | 7/2004 |
| JP | 2004208220 | 7/2004 |
| JP | 2004233316 | 8/2004 |
| JP | 2004-252626 | 9/2004 |
| JP | 2004-266321 | 9/2004 |
| JP | 2004-274438 | 9/2004 |
| JP | 2004-357198 | 12/2004 |
| JP | 2005-020234 | 1/2005 |
| JP | 2005-020730 | 1/2005 |
| JP | 2005072643 | 3/2005 |
| JP | 2005074257 | 3/2005 |
| JP | 2005-311125 | 4/2005 |
| JP | 2005-512440 | 4/2005 |
| JP | 2005-142835 | 6/2005 |
| JP | 2005-159969 | 6/2005 |
| JP | 2005142729 | 6/2005 |
| JP | 2005151292 A | 6/2005 |
| JP | 2005184267 | 7/2005 |
| JP | 2005-223717 | 8/2005 |
| JP | 2005-229324 | 8/2005 |
| JP | 2005/229324 | 8/2005 |
| JP | 2005-237026 | 9/2005 |
| JP | 2005-244968 | 9/2005 |
| JP | 2005-328125 | 11/2005 |
| JP | 2005-534269 | 11/2005 |
| JP | 2005-340927 | 12/2005 |
| JP | 2005-341543 | 12/2005 |
| JP | 2005-348193 | 12/2005 |
| JP | 2005-352024 | 12/2005 |
| JP | 2006-007342 A | 1/2006 |
| JP | 2006-007919 | 1/2006 |
| JP | 2006-011591 | 1/2006 |
| JP | 2006-019812 | 1/2006 |
| JP | 2006005625 | 1/2006 |
| JP | 2006007342 | 1/2006 |
| JP | 2006-050056 | 2/2006 |
| JP | 2006-051300 | 2/2006 |
| JP | 2006-066972 | 3/2006 |
| JP | 2006-067049 | 3/2006 |
| JP | 2006-074671 | 3/2006 |
| JP | 2006-086581 | 3/2006 |
| JP | 2006-109326 | 4/2006 |
| JP | 2006-115060 | 4/2006 |
| JP | 2006-115476 | 4/2006 |
| JP | 2006094158 | 4/2006 |
| JP | 2006-129117 | 5/2006 |
| JP | 2006-129404 | 5/2006 |
| JP | 2006-148295 | 6/2006 |
| JP | 2006-155734 | 6/2006 |
| JP | 2006-157226 | 6/2006 |
| JP | 2006-157318 | 6/2006 |
| JP | 2006-165702 | 6/2006 |
| JP | 2006-166128 | 6/2006 |
| JP | 2006-166300 | 6/2006 |
| JP | 2006-186691 | 7/2006 |
| JP | 2006-197404 | 7/2006 |
| JP | 2006197267 | 7/2006 |
| JP | 2006-211317 | 8/2006 |
| JP | 2006-226506 | 8/2006 |
| JP | 2006-229647 | 8/2006 |
| JP | 2006217088 | 8/2006 |
| JP | 2006217321 | 8/2006 |
| JP | 2006-238072 | 9/2006 |
| JP | 2006-295786 | 10/2006 |
| JP | 2006283541 | 10/2006 |
| JP | 2006303618 | 11/2006 |
| JP | 2006-333058 | 12/2006 |
| JP | 2006-345025 | 12/2006 |
| JP | 2006-345471 | 12/2006 |
| JP | 2006333058 | 12/2006 |
| JP | 2006339914 | 12/2006 |
| JP | 2007-003702 | 1/2007 |
| JP | 2007-006369 | 1/2007 |
| JP | 2007/010518 | 1/2007 |
| JP | 2007-019898 | 1/2007 |
| JP | 2007-019957 | 1/2007 |
| JP | 2007-020051 | 1/2007 |
| JP | 2007-028469 | 2/2007 |
| JP | 2007-051395 | 3/2007 |
| JP | 2007-072015 | 3/2007 |
| JP | 2007-081276 | 3/2007 |

(56) References Cited

FOREIGN PATENT DOCUMENTS

| | | |
|---|---|---|
| JP | 20070-51007 | 3/2007 |
| JP | 2007074663 | 3/2007 |
| JP | 2007505540 A | 3/2007 |
| JP | 2007-096386 | 4/2007 |
| JP | 2007-103989 | 4/2007 |
| JP | 2007-104548 | 4/2007 |
| JP | 2007-104603 | 4/2007 |
| JP | 2007-129740 | 5/2007 |
| JP | 2007-133698 | 5/2007 |
| JP | 2007-142920 | 6/2007 |
| JP | 2007-165938 | 6/2007 |
| JP | 2007-180827 | 7/2007 |
| JP | 2007-189578 | 7/2007 |
| JP | 2007-195239 | 8/2007 |
| JP | 2007-214883 | 8/2007 |
| JP | 2007-228508 | 9/2007 |
| JP | 2007-268028 | 10/2007 |
| JP | 2007-275819 | 10/2007 |
| JP | 2007281916 | 10/2007 |
| JP | 2007-306465 | 11/2007 |
| JP | 2007-307124 | 11/2007 |
| JP | 2007-330560 | 12/2007 |
| JP | 2007-336418 | 12/2007 |
| JP | 2008-000709 | 1/2008 |
| JP | 2008-006558 A | 1/2008 |
| JP | 2008-017327 | 1/2008 |
| JP | 2008-017398 | 1/2008 |
| JP | 2008006558 | 1/2008 |
| JP | 2008-042324 | 2/2008 |
| JP | 2008-046844 | 2/2008 |
| JP | 2008-092164 | 4/2008 |
| JP | 2008-092313 | 4/2008 |
| JP | 2008-511217 | 4/2008 |
| JP | 2008085417 | 4/2008 |
| JP | 2008-121796 | 5/2008 |
| JP | 2008-135991 | 6/2008 |
| JP | 2008-141589 | 6/2008 |
| JP | 2008-141687 | 6/2008 |
| JP | 2008-148086 | 6/2008 |
| JP | 2008-149427 A | 7/2008 |
| JP | 2008-153783 | 7/2008 |
| JP | 2008-177705 | 7/2008 |
| JP | 2008149427 | 7/2008 |
| JP | 2008177629 | 7/2008 |
| JP | 3144392 U | 8/2008 |
| JP | 2008-227123 | 9/2008 |
| JP | 2008-227806 | 9/2008 |
| JP | 2008-229531 | 10/2008 |
| JP | 2008-263383 | 10/2008 |
| JP | 2008-301071 | 12/2008 |
| JP | 2009010593 | 1/2009 |
| JP | 2009-044510 | 2/2009 |
| JP | 2009-077260 | 4/2009 |
| JP | 2009-094986 | 4/2009 |
| JP | 2009088942 | 4/2009 |
| JP | 2009-117953 | 5/2009 |
| JP | 2009-118396 | 5/2009 |
| JP | 200922261 | 5/2009 |
| JP | 2009111820 | 5/2009 |
| JP | 2009-147680 | 7/2009 |
| JP | 2009-159402 | 7/2009 |
| JP | 2009-159577 | 7/2009 |
| JP | 2009-166213 A | 7/2009 |
| JP | 2009166213 | 7/2009 |
| JP | 2009171249 | 7/2009 |
| JP | 4307488 | 8/2009 |
| JP | 2009-207056 | 10/2009 |
| JP | 2009-232443 | 10/2009 |
| JP | 2009-246954 | 10/2009 |
| JP | 2009246954 | 10/2009 |
| JP | 2009-260883 | 11/2009 |
| JP | 2009-542038 | 11/2009 |
| JP | 2009267616 | 11/2009 |
| JP | 2010-010945 | 1/2010 |
| JP | 2010011117 | 1/2010 |
| JP | 2010-068299 | 3/2010 |
| JP | 2010054731 | 3/2010 |
| JP | 2010-094799 | 4/2010 |
| JP | 2010-094799 A | 4/2010 |
| JP | 2010087810 | 4/2010 |
| JP | 2010-109795 | 5/2010 |
| JP | 2010-124287 | 6/2010 |
| JP | 2010-147727 | 7/2010 |
| JP | 2010-166406 | 7/2010 |
| JP | 2010-524295 | 7/2010 |
| JP | 4541111 | 7/2010 |
| JP | 2010-528547 | 8/2010 |
| JP | 2010-207963 A | 9/2010 |
| JP | 2010207963 | 9/2010 |
| JP | 2010232755 | 10/2010 |
| JP | 2010245854 | 10/2010 |
| JP | 2010-258701 | 11/2010 |
| JP | 2010-268336 | 11/2010 |
| JP | 2010283541 | 12/2010 |
| JP | 2011-004195 | 1/2011 |
| JP | 2011-008503 | 1/2011 |
| JP | 2011-010791 | 1/2011 |
| JP | 2011-010791 A | 1/2011 |
| JP | 2011-015193 | 1/2011 |
| JP | 2011-017969 | 1/2011 |
| JP | 2011-035560 | 2/2011 |
| JP | 2011-048697 | 3/2011 |
| JP | 2011-053744 | 3/2011 |
| JP | 2011-059376 | 3/2011 |
| JP | 2011-087142 | 4/2011 |
| JP | 2011-512745 | 4/2011 |
| JP | 2011-130334 | 6/2011 |
| JP | 2011114454 | 6/2011 |
| JP | 2011-139439 | 7/2011 |
| JP | 2011-139462 | 7/2011 |
| JP | 2011135489 | 7/2011 |
| JP | 2011-212167 | 10/2011 |
| JP | 2011-223556 | 11/2011 |
| JP | 2011-223824 | 11/2011 |
| JP | 2011-233971 | 11/2011 |
| JP | 2011-234323 | 11/2011 |
| JP | 2012-028852 | 2/2012 |
| JP | 2012-034064 | 2/2012 |
| JP | 2012-508499 | 4/2012 |
| JP | 2012070245 | 4/2012 |
| JP | 2012-109663 | 6/2012 |
| JP | 2012-138770 | 7/2012 |
| JP | 2012-515574 | 7/2012 |
| JP | 2012142679 | 7/2012 |
| JP | 2012-156781 | 8/2012 |
| JP | 2012150266 | 8/2012 |
| JP | 2012-169817 | 9/2012 |
| JP | 2012-178695 | 9/2012 |
| JP | 2012-196455 | 10/2012 |
| JP | 5108161 | 10/2012 |
| JP | 2012-249097 | 12/2012 |
| JP | 2012-257072 | 12/2012 |
| JP | 2012244515 | 12/2012 |
| JP | 2013-005212 | 1/2013 |
| JP | 2013-055492 | 3/2013 |
| JP | 2013-078116 | 4/2013 |
| JP | 2013-514737 | 4/2013 |
| JP | 5246695 | 4/2013 |
| JP | 2013061176 | 4/2013 |
| JP | 2013078116 | 4/2013 |
| JP | 2013-081047 | 5/2013 |
| JP | 2013-081047 A | 5/2013 |
| JP | 2013105272 | 5/2013 |
| JP | 2013-115800 | 6/2013 |
| JP | 2013115638 | 6/2013 |
| JP | 2013-128896 | 7/2013 |
| JP | 2013130402 | 7/2013 |
| JP | 2013-162167 | 8/2013 |
| JP | 2013-198072 | 9/2013 |
| JP | 2013-201560 | 10/2013 |
| JP | 2013-232860 | 11/2013 |
| JP | 2013-235316 | 11/2013 |
| JP | 2013-236396 | 11/2013 |
| JP | 2013-255091 A | 12/2013 |

(56) References Cited

FOREIGN PATENT DOCUMENTS

| | | |
|---|---|---|
| JP | 2013-255212 A | 12/2013 |
| JP | 2013255091 | 12/2013 |
| JP | 2013255212 | 12/2013 |
| JP | 2014-003488 A | 1/2014 |
| JP | 2014003488 | 1/2014 |
| JP | 2014-068346 | 4/2014 |
| JP | 2014-089494 | 5/2014 |
| JP | 2014-089494 A | 5/2014 |
| JP | 2014-116972 | 6/2014 |
| JP | 2014116755 | 6/2014 |
| JP | 3193583 U | 9/2014 |
| JP | 2014165692 | 9/2014 |
| JP | 2014190965 | 10/2014 |
| JP | 2014-216861 | 11/2014 |
| JP | 2014-229991 | 12/2014 |
| JP | 2014-232905 | 12/2014 |
| JP | 5676003 | 2/2015 |
| JP | 2015-053640 | 3/2015 |
| JP | 2015-061285 | 3/2015 |
| JP | 2015082818 | 4/2015 |
| JP | 2015-084801 A | 5/2015 |
| JP | 2015084801 | 5/2015 |
| JP | 2015089016 | 5/2015 |
| JP | 2015-139132 | 7/2015 |
| JP | 3200747 U | 10/2015 |
| JP | 2015222908 | 12/2015 |
| KR | 970008927 | 5/1997 |
| KR | 10-1998-0022845 | 6/1998 |
| KR | 20-0389666 | 7/2005 |
| KR | 10-2005-0086378 | 8/2005 |
| KR | 20060121606 | 11/2006 |
| KR | 10-2007-0109323 | 11/2007 |
| KR | 10-2008-0006514 | 1/2008 |
| KR | 10-2008-0009602 | 1/2008 |
| KR | 10-2008-0040962 | 5/2008 |
| KR | 10-2009-0033564 | 4/2009 |
| KR | 1020090082879 | 7/2009 |
| KR | 10-2009-0120951 | 11/2009 |
| KR | 10-2010-0034906 | 4/2010 |
| KR | 10-2010-0041386 | 4/2010 |
| KR | 20110006838 | 1/2011 |
| KR | 20110121012 | 11/2011 |
| KR | 20120015209 | 2/2012 |
| KR | 101358881 | 2/2014 |
| KR | 20150010087 | 1/2015 |
| KR | 20160003340 | 1/2016 |
| KR | 10-2017755 | 9/2019 |
| TW | 200423682 | 11/2004 |
| TW | 200536415 | 11/2005 |
| TW | 200539664 | 12/2005 |
| TW | 200605621 | 2/2006 |
| TW | 1353164 B | 3/2009 |
| TW | I391880/200912814 | 3/2009 |
| TW | 201018982 | 5/2010 |
| TW | 201119339 | 6/2011 |
| TW | 201233119 | 8/2012 |
| TW | M452360 U | 5/2013 |
| TW | 201332333 | 8/2013 |
| TW | 201342313 | 10/2013 |
| TW | 201513629 | 4/2015 |
| WO | 1996/27253 | 9/1996 |
| WO | 199805148 | 2/1998 |
| WO | WO 2001087007 | 11/2001 |
| WO | 2003/055183 | 7/2003 |
| WO | 2004/034734 | 4/2004 |
| WO | 2005/067339 | 7/2005 |
| WO | 2005/069586 | 7/2005 |
| WO | 2005/086522 | 9/2005 |
| WO | 2005/091670 | 9/2005 |
| WO | 2005/096599 | 10/2005 |
| WO | 2005/096664 | 10/2005 |
| WO | 2006/006313 | 1/2006 |
| WO | 2006/021133 | 3/2006 |
| WO | 2006/028045 | 3/2006 |
| WO | 2006/075440 | 7/2006 |
| WO | 2007/034739 | 3/2007 |
| WO | 2007/046269 | 4/2007 |
| WO | WO 2007046269 | 4/2007 |
| WO | 2007/099707 | 9/2007 |
| WO | 2008/007666 | 1/2008 |
| WO | 2008/029515 | 3/2008 |
| WO | 2009/104437 | 8/2009 |
| WO | WO 2009105115 | 8/2009 |
| WO | 2009/133873 | 11/2009 |
| WO | 2009/136498 | 11/2009 |
| WO | 2009/141912 | 11/2009 |
| WO | 2010/005045 | 1/2010 |
| WO | 2010/050154 | 5/2010 |
| WO | 2010/060323 | 6/2010 |
| WO | 2010/116510 | 10/2010 |
| WO | 2010140087 | 12/2010 |
| WO | 2011/007679 | 1/2011 |
| WO | 2011/023672 | 3/2011 |
| WO | 2011/090944 | 7/2011 |
| WO | 2011/121740 | 10/2011 |
| WO | 2011/153165 | 12/2011 |
| WO | 2011/159349 | 12/2011 |
| WO | 2002/021881 | 3/2012 |
| WO | 2012/090947 | 7/2012 |
| WO | 2012097314 | 7/2012 |
| WO | 2012114772 | 8/2012 |
| WO | WO2012/114917 | 8/2012 |
| WO | 2013/047609 | 4/2013 |
| WO | WO2013/121631 | 8/2013 |
| WO | 2013/168628 | 11/2013 |
| WO | 2014156534 | 10/2014 |
| WO | 2015/064340 | 5/2015 |
| WO | 2015122879 | 8/2015 |
| WO | WO-2015187092 A1 * | 12/2015 ........... A61H 39/007 |
| WO | WO 2015033677 | 3/2017 |
| WO | WO 2017/099938 | 6/2017 |

OTHER PUBLICATIONS

Japan Patent Office, Office Action dated Oct. 23, 2018 for Japanese application No. 2015-012282 (with English translation).
Japanese Patent Office, International Search Report for PCT/JP2013/067781 dated Oct. 1, 2013 (with English translation).
Japanese Patent Office, International Search Report for International Patent Application PCT/JP2012/066376 (dated Oct. 30, 2012).
International Search Report for International Patent Application PCT/JP2011/080099 (dated Apr. 3, 2012).
Taiwanese Patent Office, search report in application 100148983 (2 pages) (dated Jan. 17, 2013).
U.S. Patent and Trademark Office, Office Action in U.S. Appl. No. 13/556,367 (dated Oct. 19, 2012).
European Patent Office, official communication in Application No. EP 11 85 3718 (dated May 14, 2014).
U.S. Patent and Trademark Office, Office Action in U.S. Appl. No. 13/489,971 (dated Oct. 24, 2012).
Isaka et al., "Development of Bone Conduction Speaker by Using Piezoelectric Vibration," The Japan Society of Mechanical Engineers (No. 04-5) Dynamics and Design Conference 2004 CD-Rom Compilation (Sep. 27-30, 2004; Tokyo) (and English translation).
Japanese Patent Office, International Search Report for International Patent Application PCT/JP2012/053231 (dated Mar. 13, 2012).
Extended European Search Report in European patent application No. 12866397.8 dated Jul. 20, 2015.
Japanese Patent Office, International Search Report for PCT/JP2014/071607 dated Nov. 11, 2014 (with English translation).
Japan Patent Office, International Search Report for PCT/JP2014/077792 dated Dec. 16, 2014 (with English translation).
Extended European Search Report for PCTJP2013067781 dated Feb. 19, 2016.
Japanese Patent Office, official communication in Japanese Patent Application No. 2012-054308 dated Jun. 7, 2016 (and machine translation).
Japanese Patent Office, official communication in Japanese Patent Application No. 2015-056466 dated Jul. 12, 2016 (and machine translation).

(56) References Cited

OTHER PUBLICATIONS

Japanese Patent Office, official communication in Japanese Patent Application No. 2015-217427 dated Jul. 19, 2016 (and machine translation).
Japanese Patent Office, official communication in Japanese Patent Application No. 2015-217421 dated Jul. 19, 2016 (and machine translation).
SIPO of People's Republic of China, official communication for Chinese Patent Application No. 201180031904.5 dated Jul. 20, 2016 (and machine translation).
Japanese Patent Office, official communication in Japanese Patent Application No. 2012-120173 dated Jul. 26, 2016 (and machine translation).
Japanese Patent Office, official communication in Japanese Patent Application No. 2015-048052 dated Aug. 2, 2016 (and machine translation).
Japanese Patent Office, official communication in Japanese Patent Application No. 2012-147753 dated Aug. 23, 2016 (and machine translation).
Japanese Patent Office, official communication in Japanese Patent Application No. 2015-231478 dated Aug. 30, 2016 (and machine translation).
News Release, "New Offer of Smartphone Using Cartilage Conduction", Rohm Semiconductor, Kyoto, Japan, Apr. 23, 2012 (with English translation).
European Patent Office, Partial Search Report for EP 11 85 3443 dated Oct. 27, 2016.
Japan Patent Office, International Search Report for PCT/JP2015/071490 dated Nov. 2, 2015 with English translation.
U.S. Patent and Trademark Office, Office Action in U.S. Appl. No. 15/049,403 dated Nov. 23, 2016.
U.S. Patent and Trademark Office, Office Action in U.S. Appl. No. 15/174,746 dated Nov. 25, 2016.
Smartphone Black Berry Bold 9700, Operation guide (2010).
Office Action for JP Patent Application No. 2016-013411 dated Nov. 22, 2016 with English Translation.
Office Action for KR Patent Application No. 10-2016-7004740 dated Nov. 28, 2016 with English Translation.
Office Action for JP Patent Application No. 2012-252203 dated Dec. 20, 2016 with English Translation.
Office Action for JP Patent Application No. 2012-243480 dated Dec. 20, 2016 with English Translation.
Office Action for JP Patent Application No. 2012-229176 dated Dec. 27, 2016 with English Translation.
Office Action for JP Patent Application No. 2012-268649 dated Jan. 31, 2017 with English Translation.
Office Action for JP Patent Application No. 2012-054308 dated Feb. 7, 2017 with English Translation.
Final Office Action for JP Patent Application No. 2012-120173 dated Feb. 7, 2017 with English translation.
Japanese Office Action in Japanese Application No. 2016-051347, dated Feb. 14, 2017, 6 pages (English Translation).
Korean Office Action in Korean Application No. 10-2015-7005518, dated Mar. 20, 2017, 12 pages (English Translation).
Japanese Office Action in Japanese Application No. 2015-217421, dated Feb. 28, 2017, 6 pages (English Translation).
Japanese Office Action in Japanese Application No. 2013-028997, dated Mar. 21, 2017, 8 pages (English Translation).
International Search Report for International Application No. PCT/JP2017/000787, dated Mar. 28, 2017, 1 page.
Japanese Office Action in Japanese Application No. 2016-087027, dated Mar. 28, 2017, 9 pages (English Translation).
Japanese Office Action in Japanese Application No. 2016-097777, dated Mar. 21, 2017, 8 pages (English Translation).
Chinese Office Action in Chinese Application No. 201510148247.2, dated May 3, 2017, 39 pages (English Translation).
Japanese Office Action in Japanese Application No. 2016-114221, dated Jun. 13, 2017, English Translation.
Japanese Office Action in Japanese Application No. 2012-150941, dated May 9, 2017, English Translation.

Shimomura et al., "Vibration and Acoustic Characteristics of Cartilage Transducer," Acoustical Society of Japan, 2010 with Partial English Translation.
Rion Co. Ltd., "New-generation Vibration Level Meter Model VM-51," Acoustical Society of Japan, 1990 with Partial English Translation.
Japanese Office Action in Japanese Application No. 2013-106416, dated May 30, 2017, English Translation.
Japanese Office Action in Japanese Application No. 2012-197484, dated Jun. 13, 2017, English Translation.
Japanese Office Action in Japanese Application No. 2013-126623, dated Jun. 13, 2017, English Translation.
Office Action for Japanese Patent Application No. 2016-185559 dated Jul. 25, 2017 with English translation.
Office Action for Japanese Patent Application No. 2016-195560 dated Aug. 22, 2017 with English translation.
Office Action for Japanese Patent Application No. 2016-197219 dated Aug. 22, 2017_ with English translation.
Office Action for Japanese Patent Application No. 2016-197225 dated Aug. 22, 2017 with English translation.
Office Action for Japanese Patent Application No. 2013-186424 dated Sep. 26, 2017_with English translation.
Office Action for Japanese Patent Application No. 2013-195756 dated Sep. 26, 2017_with English translation.
Office Action for Japanese Patent Application No. 2013-173595 dated Oct. 10, 2017 (with English translation).
Fukumoto, M. and Sugimum, T., Fulltime-wear Interface Technology , NTT Technical Review, 8(1):77-81, (2003) (with English Translation).
Sasaki C, Crusoe Supplementary Class note Which Condensed the Function Called For, ASCII, 12 pages (2001) (Partial English Translation).
Japanese Patent Office; Office Action mailed in counterpart Japanese patent Application No. 2017-004233 dated Nov. 21, 2017 (with English-language translation).
Office Action mailed for KR Patent Application No. 10-2017-7019074 dated Oct. 13, 2017 with English Translation.
Office Action mailed for Japanese Patent Application No. 2013-227279 dated Oct. 17, 2017 with English translation.
Office Action for Japanese Patent Application No. 2013-221303 dated Oct. 17, 2017 with English Translation.
Office Action for Japanese Patent Application No. 2013-237963 dated Nov. 7, 2017 with English Translation.
Office Action for Japanese Application No. 2017-004233 dated Nov. 21, 2017 with English Translation.
Office Action for Japanese Patent Application No. 2016-236604 dated Nov. 21, 2017 with English Translation.
Office Action for Japanese Patent Application No. 2014-010271 dated Nov. 28, 2017 with English Translation.
Office Action for Japanese Patent Application No. 2017-000580 dated Dec. 19, 2017 with English Translation.
Office Action for Korean Application No. 10-2016-7004740 dated Dec. 19, 2017 with English Translation.
Office Action for Japanese Patent Application No. 2013-221303 dated Dec. 26, 2017 with English Translation.
Office Action for Japanese Patent Application No. 2013-237963 dated Dec. 26, 2017 with English Translation.
International Search Report for International Application No. PCT/JP2016/070848, dated Sep. 9, 2016, 5 pages.
European Patent Office, EESR for EP Application No. 16824527.2 dated Feb. 28, 2019.
European Patent Office. EESR for EP Application No. 16846372.7 dated Feb. 19, 2019.
Korean Intellectual Property Office, Office Action for Korean Application No. 10-2018-7014722 dated Dec. 26, 2018 with English Translation.
Korean Intellectual Property Office, Office Action for Korean Application No. 10-2018-7006763 dated Jan. 30, 2019 with English Translation.
Korean Intellectual Property Office, Office Action for Korean Application No. 10-2018-7034989 dated Mar. 4, 2019 with English Translation.

(56) References Cited

OTHER PUBLICATIONS

SIPO, Office Action for Chinese Application No. 201610520280.8 dated Jan. 3, 2019 with English Translation.
China Intellectual Property Office, Office Action for China Appln. No. 201510131342.1, dated Nov. 4, 2019, with English Translation.
European Patent Office, Summons to attend oral proceedings for EP Appln. No. 11853443.7, dated Oct. 10, 2019.
Korea Intellectual Property Office, Office Action for Korean Appln No. 10-2018-7020853, dated Sep. 16, 2019, with English Translation.
Korea Intellectual Property Office, Office Action for Korean Application No. 10-2019-7025296, dated Sep. 20, 2019, with English Translation.
Japan Patent Office, International Search Report for PCT/JP2016/070848 dated Sep. 6, 2016, with English translation.
Japan Patent Office, International Search Report for PCT/JP2017/000787 dated Mar. 28, 2017 (with English translation).
Japan Patent Office, JP Application No. 2015-082557 dated Mar. 19, 2019 (with English translation).
Japan Patent Office, International Search Report for PCT/JP2016/076494 dated Nov. 29, 2016, with English translation.
International Search Report and Written Opinion in PCT Application No. PCT/JP2019/037808, dated Nov. 12, 2019, 10 pages.
European Extended Search Report for EP Application No. 18179998.2_dated Oct. 26, 2018.
Korean Intellectual Property Office, Office Action for counterpart KR Application No. 10-2017-7016517 dated Oct. 31, 2018 with English translation.
Japan Patent Office, Office Action for JP Application No. 2014-256091 dated Oct. 30, 2018 with English translation.
SIPO Patent Office, Chinese Patent Application No. 2014800584218 dated Jan. 3, 2018, with English translation.
Japan Patent Office, Office Action for Japanese Patent Application No. 2013-106416 dated Jan. 9, 2018 with English translation.
European Patent Office, EESR for European Patent Application No. 15834516 dated Mar. 12, 2018.
Japan Patent Office, Office Action for Japanese Patent Application No. 2016-202733 dated Mar. 13, 2018 with English translation.
Office Action in Chinese Appln. No. 201810640135.2, dated Jan. 21, 2020, 14 pages (with English translation).
Office Action in Japanese Appln. No. 2016-120820, dated Jan. 21, 2020, 6 pages (with English translation).
Office Action in Japanese Appln. No. 2016-202836, dated Mar. 24, 2020, 8 pages (with English translation).
Korea Intellectual Property Office, Office Action for Korean Appln No. 10-2019-7011539, dated Dec. 25, 2019, 10 pages (with English translation).
Japan Patent Office, Office Action for JP 2015-141168, dated Jun. 4, 2019 with English Translation.
Korean Intellectual Property Office, Office Action for KR 10-2019-7011539 dated Jun. 20, 2019 with English Translation.
Japan Patent Office, Office Action for JP 2015-204396, dated Jul. 16, 2019 with English Translation.
Japan Patent Office, Office Action for JP 2015-082557 dated Jul. 30, 2019 with English Translation.
Japan Patent Office, Office Action for JP 2015-238764 dated Aug. 20, 2019 with English Translation.
CN Office Action in Chinese Application No. 201680041763.8, dated Apr. 3, 2020, 18 pages (with English translation).
TW Office Action in Taiwanese Application No. 10920470180, dated May 20, 2020, 6 pages.
Office Action in Chinese Application No. 201810260704, dated Jul. 1, 2020, 12 pages (with English translation).
Search Report in European Application No. 20166767.2, dated Jun. 29, 2020, 12 pages.
Office Action in Taiwanese Application No. 10920697260, dated Jul. 23, 2020, 4 pages.

\* cited by examiner

ROBOT AND ROBOT SYSTEM

TECHNICAL FIELD

The present invention relates to a robot and a robot system.

BACKGROUND ART

There have been proposed various robots that can communicate with humans. For example, Patent Document 1 listed below proposes a humanoid robot that talks in a recorded voice of a particular individual and that can simultaneously move its members based on previously registered habits of that individual to express affection and the like. On the other hand, as a watching system for people who are living alone, Patent Document 2 listed below proposes receiving data of detection both from a human detection sensor installed in a home of a person as a target to be watched and from an acceleration sensor that the resident wears, to make judgments on activities and conditions of the resident and events occurring in the home. Furthermore, Patent Document 3 listed below proposes a mastication movement detection device in which the number of mastication movements is counted based on a detected waveform received from a detector that is placed in an external auditory canal and detects an amount of deformation of the external auditory canal. Also, as for cartilage conduction, which has been discovered as a third conduction route in addition to the long-known air conduction and bone conduction, Patent Document 4 listed below describes that vibration generated by a vibration source contacting an ear cartilage around the entrance part of an external auditory canal causes air-conducted sound to be generated from a cartilage surface inside the external auditory canal, and the generated air-conducted sound then proceeds through the inside of the external auditory canal to reach an tympanic membrane.

CITATION LIST

Patent Literature

Patent Document 1: Japanese Patent Application Publication No. 2010-94799
Patent Document 2: Japanese Patent Application Publication No. 2014-89494
Patent Document 3: Japanese Patent Application Publication No. 2011-10791
Patent Document 4: Japanese Patent Application Publication No. 2013-81047

SUMMARY

Technical Problem

However, as to robots, and robot systems that utilize robots, there are many problems yet to be addressed.

Against the background discussed above, an object of the present invention is to provide a robot, and a robot system that utilizes a robot, that is capable of appropriate communication with humans.

Solution to Problem

To achieve the above object, according to one aspect of the present invention, there is provided a robot including: a hand; and a cartilage conduction vibration source which is provided in the hand and which conducts vibration to the ear cartilage of a human. Thus, communication is possible between the robot and the human by cartilage conduction with a natural movement.

According to a specific feature, the robot includes two hands, and the cartilage conduction vibration source is provided in each of the two hands. Thus, communication is possible between the robot and the human by cartilage conduction with a comforting staging in which, for example, the head of the person is held gently in both hands of the robot. In addition, stereophonic hearing is possible. According to another specific feature, the robot includes a finger in the hand, and the cartilage conduction vibration source is provided in the finger. Thus, more efficient cartilage conduction is possible. According to a more specific feature, there is provided a joint mechanism which guides the entire hand to achieve contact with the ear cartilage and which adjusts the finger to guide it to the tragus. Thus, adjustment for appropriate cartilage conduction is possible.

According to another specific feature, the robot includes a control unit which, when the two hands make contact with the ear cartilages of two ears respectively for cartilage conduction, controls the two hands so as not to restrain the movement of the face while maintaining the positions of the two hands relative to each other. Thus, cartilage conduction without a sense of restraint is possible.

According to another specific feature, the robot includes an eye which is movable in exterior appearance, and the eye is moved in coordination such that the line of sight of the eye points between the two hands. Thus, more intimate communication with the robot by cartilage conduction is possible. According to another specific feature, the robot includes a mouth mechanism which is movable in exterior appearance, and the mouth mechanism moves in coordination with the voice conducted by the vibration of the cartilage conduction vibration source. Thus, communication by natural cartilage conduction is possible.

According to another specific feature, the robot includes a limiter which, when the hand makes contact with the ear cartilage to conduct the vibration of the cartilage conduction vibration source to the ear cartilage, adjusts the pressure of the contact. Thus, safe communication by cartilage conduction is possible. According to another specific feature, the robot includes a communicating means for asking for consent when the hand is brought into contact with the ear cartilage to conduct the vibration of the cartilage conduction vibration source to the ear cartilage. Thus, communication by cartilage conduction without a sense of discomfort is possible.

According to another specific feature, the robot includes a control unit which, when the hand is brought into contact with the ear cartilage to conduct the vibration of the cartilage conduction vibration source to the ear cartilage, confirms safety beforehand. Thus, highly safe communication by cartilage conduction is possible. According to another specific feature, the robot includes an abnormality detecting means, and, when the hand is brought into contact with the ear cartilage to conduct the vibration of the cartilage conduction vibration source to the ear cartilage, if the abnormality detecting means detects an abnormality, the hand is inhibited from making contact with the ear cartilage. Thus, even in an unforeseen situation, trouble can be avoided.

According to another specific feature, the robot includes a joint mechanism which holds an arm of the robot so as not to resist the external force which guides the hand to the ear cartilage. Thus, a person who attempts to make contact with the robot can easily guide to his ear cartilage the hand of the robot. According to another specific feature, the cartilage conduction vibration source conducts vibration to one ear of the human, and, and the robot includes a following means for making the hand follow the movement of the head of the human. Thus, even when vibration is conducted to one ear, contact can be prevented from being broken by the movement of the head of the human.

According to another specific feature, the hand of the robot has: a first finger in which the cartilage conduction vibration source is provided; and a second finger which supports the weight of the head of the human. Thus, while the robot is making a movement of holding and raising the head of a lying person, natural communication by cartilage conduction is possible.

According to another specific feature of the present invention, there is provided a robot including: a hand; and a heater which heats the hand to human body temperature. Thus, contact of the robot with the human is possible without an uncomfortable sense of coldness.

According to another specific feature of the present invention, there is provided a robot system including: a robot which has, provided in a finger, a cartilage conduction vibration source for conducting vibration to the ear cartilage of a human and which is shared among a large number of humans; and accessories which are to be worn by the large number of humans respectively, each of the accessories covering at least part of the ear cartilage. The vibration of the cartilage conduction vibration source is conducted to the ear cartilage of one of the large number of humans indirectly via the corresponding one of the accessories. Thus, despite the sharing of the hand of the robot touched by no one knows whom, it is possible to build a hearing system that provides the benefits of cartilage conduction hygienically. Specifically, the accessories are each, for example, one of an ear warmer, a headband, an ear cuff, and an ear-worn article of character merchandise.

According to another specific feature of the present invention, the accessories each include an information holding unit that holds information for identifying its wearer, and the robot includes a reading means for reading the information. Thus, it is possible to build a robot system that can very adroitly cope with the needs of the wearers of the accessories, and thus it is possible to motivate people to wear the accessories.

According to another specific feature of the present invention, there is provided a robot system including: accessories which are worn by a large number of wearers respectively and which each include an information holding unit that holds information for identifying its wearer; and a robot including a reading means for reading the information. Thus, the robot can handle the individual wearers in manners proper to them respectively.

Advantageous Effects of Invention

As described above, according to the present invention, it is possible to provide a robot, and a robot system that utilizes a robot, that is capable of appropriate communication with humans.

DESCRIPTION OF EMBODIMENTS

First Embodiment

Figure 1:
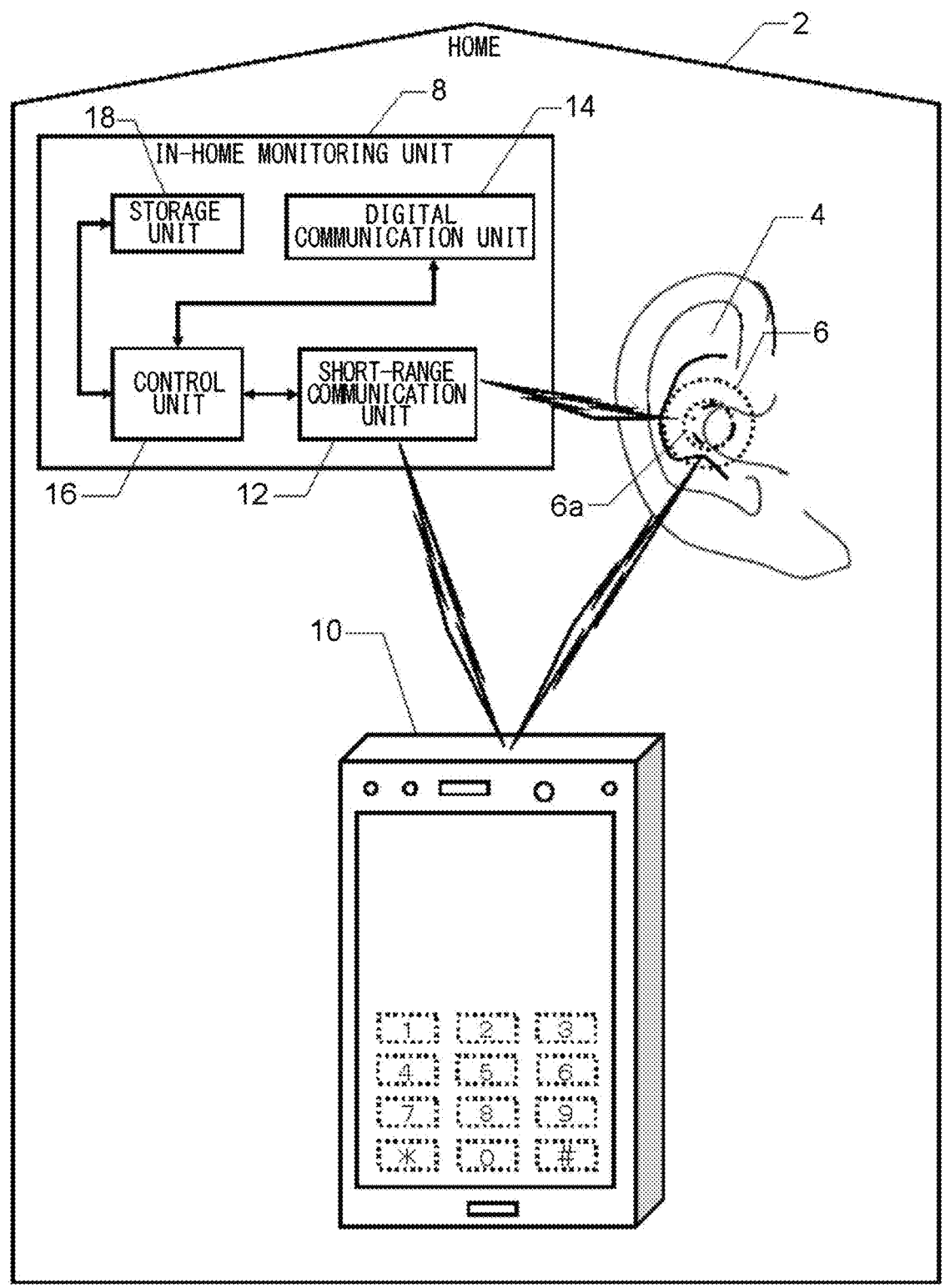
FIG. 1 is a diagram illustrating a system configuration of a first embodiment of the present invention (first embodiment)

FIG. 1 is a diagram illustrating a system configuration of a first embodiment according to an aspect of the present invention. According to the first embodiment, a watching system that performs watching inside a home 2 includes an ear-mounted unit 6 (indicated by a short-dashed line for distinction from a structure of an ear), which contacts a cartilage around a hole of an ear 4 of a watching-target person by being sandwiched between an antihelix and a tragus to fit in a cavum conchae, an in-home monitoring unit 8, and a mobile phone 10 of the watching-target person. The in-home monitoring unit 8 and the mobile phone 10 exchange information with the ear-mounted unit 6 via short-range communication. The mobile phone 10 exchanges information with the ear-mounted unit 6 and the in-house monitor unit 8 via short-range communication.

The ear-mounted unit 6 functions as a headset for the mobile phone 10 by performing the short-range communication with the mobile phone 10, and allows a phone call to be made with the mobile phone 10 kept in a clothes pocket. The ear-mounted unit 6 also independently functions as a hearing aid. These functions as a headset and as a hearing aid are both achieved by making use of cartilage conduction, which will be described later. The ear-mounted unit 6 further includes a mastication sensor to detect movement of the tragus, etc., or deformation of the external auditory canal, caused by masticatory movement. Here, the ear-mounted unit 6 is ring-shaped with a hole 6a, so that the entrance of the external auditory canal is open even when the ear-mounted unit 6 is fitted in the external auditory canal. This makes it possible to hear external sound via the hole 6a, and contributes to a comfortable wear of the ear-mounted unit 6 without a feeling of blockage in the external auditory canal. Further, by closing the hole 6a with a finger or covering it with a palm as necessary as will be described later, it is possible to obtain an occlusion effect in the cartilage conduction to hear a larger sound.

The in-home monitor unit 8 has a short-range communication unit 12 for short-range communication with the ear-mounted unit 6 and the mobile phone 10, and a digital communication unit 14 which performs always-on-connection Internet communication with an external device. A control unit 16 controls the entire in-home monitoring unit 8, which includes the short-range communication unit 12 and the digital communication unit 14. A storage unit 18 stores therein a program necessary for the control performed by the control unit 16, and also temporarily stores therein various pieces of data related to the control, etc.

With this configuration, the in-home monitoring unit 8 receives a result of detection of masticatory movement from the ear-mounted unit 6 via the short-range communication. If no masticatory movement expected in daily life has been detected, the in-home monitor unit 8 judges that there is a possibility of an abnormality, and notifies a watching-service provider to that effect via the digital communication unit 14. Further, the in-home monitoring unit 8 receives information regarding presence/absence of voice of the watching-target person detected by the headset function of the ear-mounted unit 6. In a case where there is no voice detected within a predetermined period of time, or in a case where a voice signal conveying urgency, such as a scream, has been detected, the in-home monitoring unit 8 judges that there is a possibility of an abnormality, and notifies a watching-service provider to that effect via the digital communication unit 14.

Further, the mobile phone 10 receives a result of detection of masticatory movement from the ear-mounted unit 6 via short-range communication. If no masticatory movement expected in daily life has been detected, the mobile phone 10 judges that there is a possibility of an abnormality, and makes an automatic phone call to a mobile phone of a member of family of the watching-target person or the like who lives remotely and has been registered in advance, and when an answer to the phone call is received, the mobile phone 10 notifies him/her to that effect in a form of an automatic voice message. Further, the mobile phone 10 receives information regarding presence/absence of voice of the watching-target person detected by the headset function of the ear-mounted unit 6. In a case where there is no voice detected within a predetermined period of time, or in a case where a signal of voice conveying urgency, such as a scream, has been detected, the mobile phone 10 judges that there is a possibility of an abnormality, and makes an automatic phone call to the mobile phone of the member of family of the watching-target person or the like who lives remotely and has been registered in advance, and when an answer to the phone call is received, the mobile phone 10 issues a notification to that effect.

Here, in a case where masticatory movement expected in daily life is detected, too, the mobile phone 10 makes an automatic phone call to the mobile phone of the member of family of the watching-target person or the like who lives remotely, and when an answer to the phone call is received, the mobile phone 10 notifies him/her to the effect that there is no abnormality occurring as an automatic voice message. Further, based on detection of a normal voice of the watching-target person, too, the mobile phone 10 makes an automatic phone call to the member of family of the watching-target person or the like who lives remotely as necessary, and when an answer to the phone call is received, the mobile phone 10 notifies him/her to the effect that there is no abnormality occurring in the form of an automatic voice message. This makes it possible for the member of family of the watching-target person or the like who lives remotely to know that the watching-target person regularly has three meals a day, and presence of conversation that the watching-target person is expected to usually have or a state of voice to be regularly uttered in a previously set time zone (for example, conversation in daily shopping, daily sutra chanting), and to rest reassured knowing that the watching-target person is all right. In this case, however, the mobile phone 10 makes an automatic phone call even when the watching-target person does not intend to, and thus contents of such conversations are to be undesirably heard by the member of family of the watching-target person or the like who lives remotely. Even though it is his or her own family member that hears the contents of such conversations, this is not desirable to the watching-target person in terms of privacy, and thus, as will be described later, what is notified is just whether or not voice has been uttered so that the contents of a conversation cannot be heard.

Figure 2:
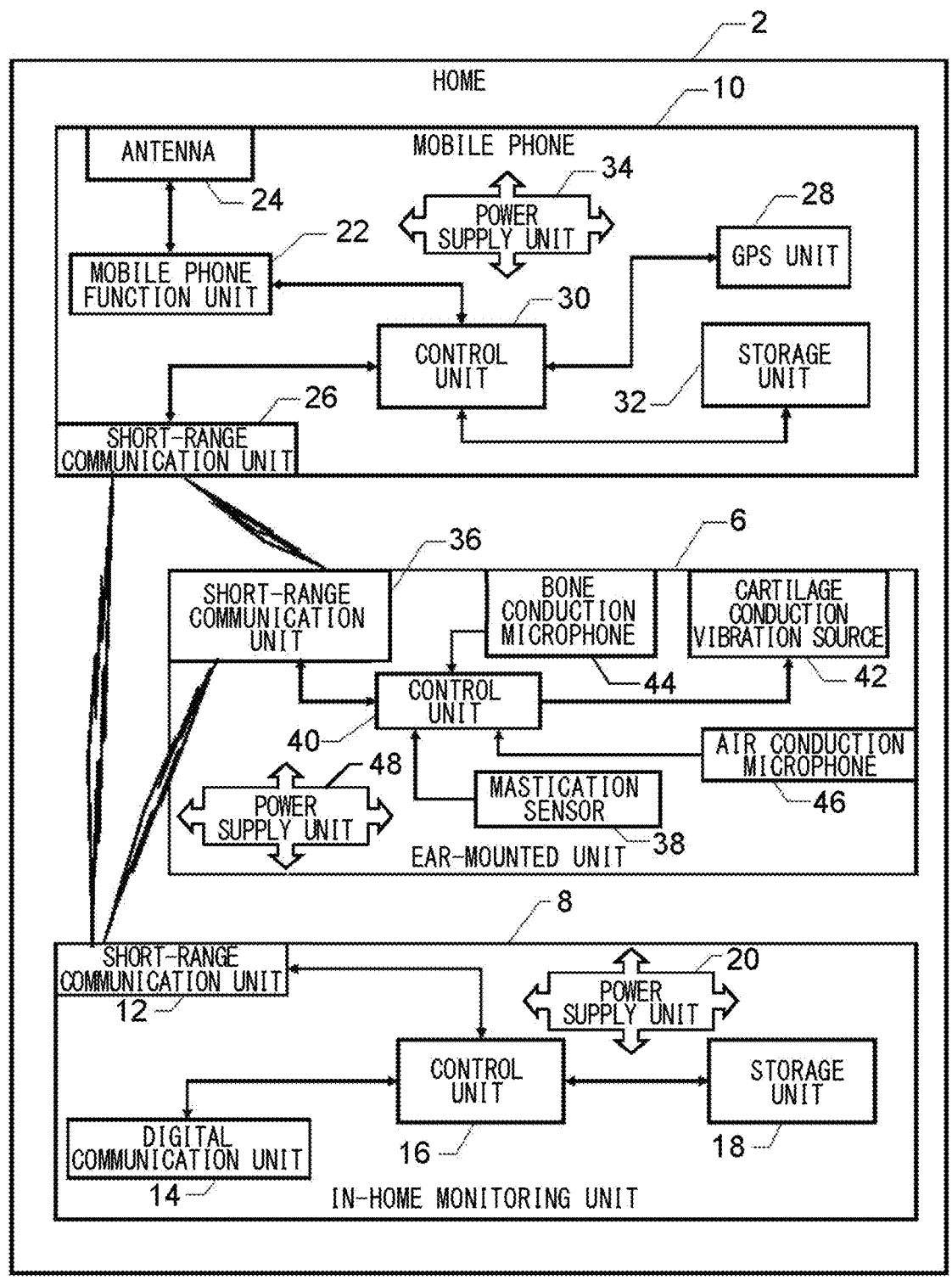
FIG. 2 is a block diagram illustrating a detailed configuration of the first embodiment described in FIG. 1.

FIG. 2 is a block diagram illustrating a detailed configuration of the first embodiment of the present invention illustrated in FIG. 1. Such elements in FIG. 2 having counterparts in FIG. 1 are given the same reference numbers as their counterparts, and descriptions thereof will be omitted unless necessary. The in-home monitoring unit 8, which is configured as illustrated in FIG. 1, includes a power supply unit 20 which supplies power to the entire in-home monitoring unit 8. The power supply unit 20 receives power from a household power supply in the home 2.

On the other hand, as illustrated in FIG. 2, the mobile phone 10 includes a mobile phone function unit 22 to perform phone communication by means of an antenna 24 via a wireless telephone network. A short-range communication unit 26 communicates with the short-range communication units 36 and 12 of the ear-mounted unit 6 and the in-home monitoring unit 8, respectively. A GPS unit 28 detects a location of the watching-target person wearing the ear-mounted unit 6 when he/she is out, and communicates with the mobile phone of the member of family of the watching-target person or the like who lives remotely or with the watching-service provider, who have been described above, to thereby provide them with information of the location of the watching-target person. A control unit 30 performs entire control of the entire mobile phone 10, which includes the mobile phone function unit 22, the short-range communication unit 26, and the GPS unit 28. A storage unit 32 stores therein a program necessary for the control performed by the control unit 30, and also, temporarily stores therein various pieces of data related to the control, etc. A power supply unit 34 includes a rechargeable storage battery, and supplies power to the entire mobile phone 10. In FIG. 2, for simplicity, such ones of the components of the mobile phone 10 as are typically included in mobile phones, such as a large-sized touch-panel liquid crystal display unit, a microphone, a speaker, a proximity sensor, and an inner camera, are not illustrated.

As illustrated in FIG. 2, the ear-mounted unit 6 includes the short-range communication unit 36, which performs short-range communication with the short-range communication unit 26 of the mobile phone 10 and the short-range communication unit 12 of the in-home monitoring unit 8. A mastication sensor 38 detects movement of the tragus, etc., or deformation of the external auditory canal of the watching-target person, caused by masticatory movement of the watching-target person, and thereby detects presence/absence of mastication of the watching-target person. The mastication sensor 38 includes, for example, a strain gage, a piezoelectric element, or the like. When a masticatory movement is detected, a control unit 40 notifies the mobile phone 10 to that effect through the short-range communication unit 36 and the short-range communication unit 26. If no masticatory movement expected in daily life is detected, the control unit 40 judges that there is a possibility of an abnormality, and, by means of the short-range communication unit 36, notifies the mobile phone 10 and the in-home monitoring unit 8 to that effect through the short-range communication unit 26 and the short-range communication unit 36, respectively.

The ear-mounted unit 6 includes a cartilage conduction vibration source 42 (which is, for example, a piezoelectric bimorph element), which vibrates in accordance with a voice signal of a call partner received from the mobile phone 10 via short-range communication, and this vibration is transmitted to an ear cartilage in contact with the ear-mounted unit 6, and this makes it possible to hear the voice of the phone call partner by cartilage conduction, which will be described later. A bone conduction microphone 44 catches bone-conducted own voice of the watching-target person and transmits a voice signal of the own voice to the mobile phone 10 via short-range communication, and this enables conversations to be conducted. In this manner, the ear-mounted unit 6 functions as a headset for the mobile phone 10. An air conduction sound microphone 46 catches an air-conducted voice of an outside conversation partner located close to the watching-target person to obtain a voice signal of the conversation partner, which makes the cartilage conduction vibration source 42 vibrate. In this manner, the ear-mounted unit 6 also independently functions as a hearing aid. The control unit 40 controls the ear-mounted unit 6 also with respect to the head-set and hearing-aid functions. In the headset function, as described above, the bone conduction microphone 44 also functions as a voice sensor for watching whether or not the watching-target person utters voice expected in daily life. A power supply unit 48, which includes a rechargeable storage battery, supplies power to the entire ear-mounted unit 6.

Now, cartilage conduction will be explained. Cartilage conduction is a phenomenon discovered by the present inventors, and denotes the phenomenon in which vibration conducted to the cartilage around an entrance part of the external auditory canal, such as that in the tragus, makes the surface of an external-auditory-canal cartilaginous part vibrate, producing air-conducted sound inside the external auditory canal. The air-conducted sound produced inside the external auditory canal travels on deeper into the external auditory canal and reaches the tympanic membrane. Thus, the greater part of the sound heard by cartilage conduction is the sound heard via the tympanic membrane. Here, however, the sound heard via the tympanic membrane is not ordinary air-conducted sound, i.e., sound that has entered the external auditory canal from outside, but air-conducted sound that is produced inside the external auditory canal.

Figure 3:
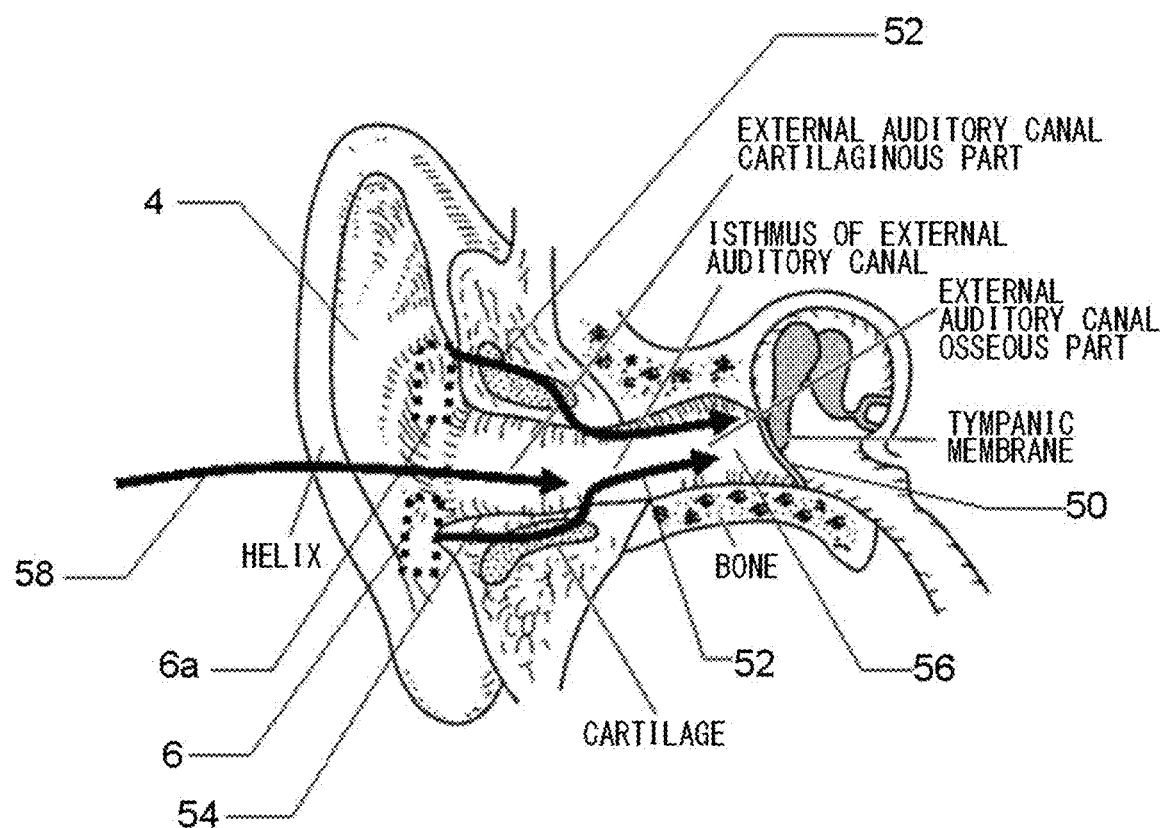
FIG. 3 is a sectional view of an ear for describing cartilage conduction.

FIG. 3 is a sectional view of an ear for illustrating the phenomenon of cartilage conduction mentioned just above, and illustrates a relationship between the structure of an ear 4 and the ear-mounted unit 6 used in the present invention. Arrows 52 indicate transmission routes of vibration of the ear-mounted unit 6 which is made to vibrate by the cartilage conduction vibration source 42. Vibration generated from the ear-mounted unit 6 is, as indicated by the arrows 52, first conducted from a contact part to a cartilage 54 around the entrance part of the external auditory canal. The vibration of the cartilage 54 generates, from its surface (the external-auditory-canal cartilaginous part), air-conducted sound inside the external auditory canal. Then the air-conducted sound travels on deeper into the external auditory canal and reaches a tympanic membrane 50 via an external auditory canal osseous part 56. Here, as indicated by an arrow 58 (which indicates a route of ordinary audible sound), air-conducted conducted sound from outside enters the external auditory canal via the hole 6a of the ear-mounted unit 6, and reaches the tympanic membrane 50. This contributes to comfortable wear of the ear-mounted unit 6 without a feeling of blockage in the external auditory canal.

Figure 4:
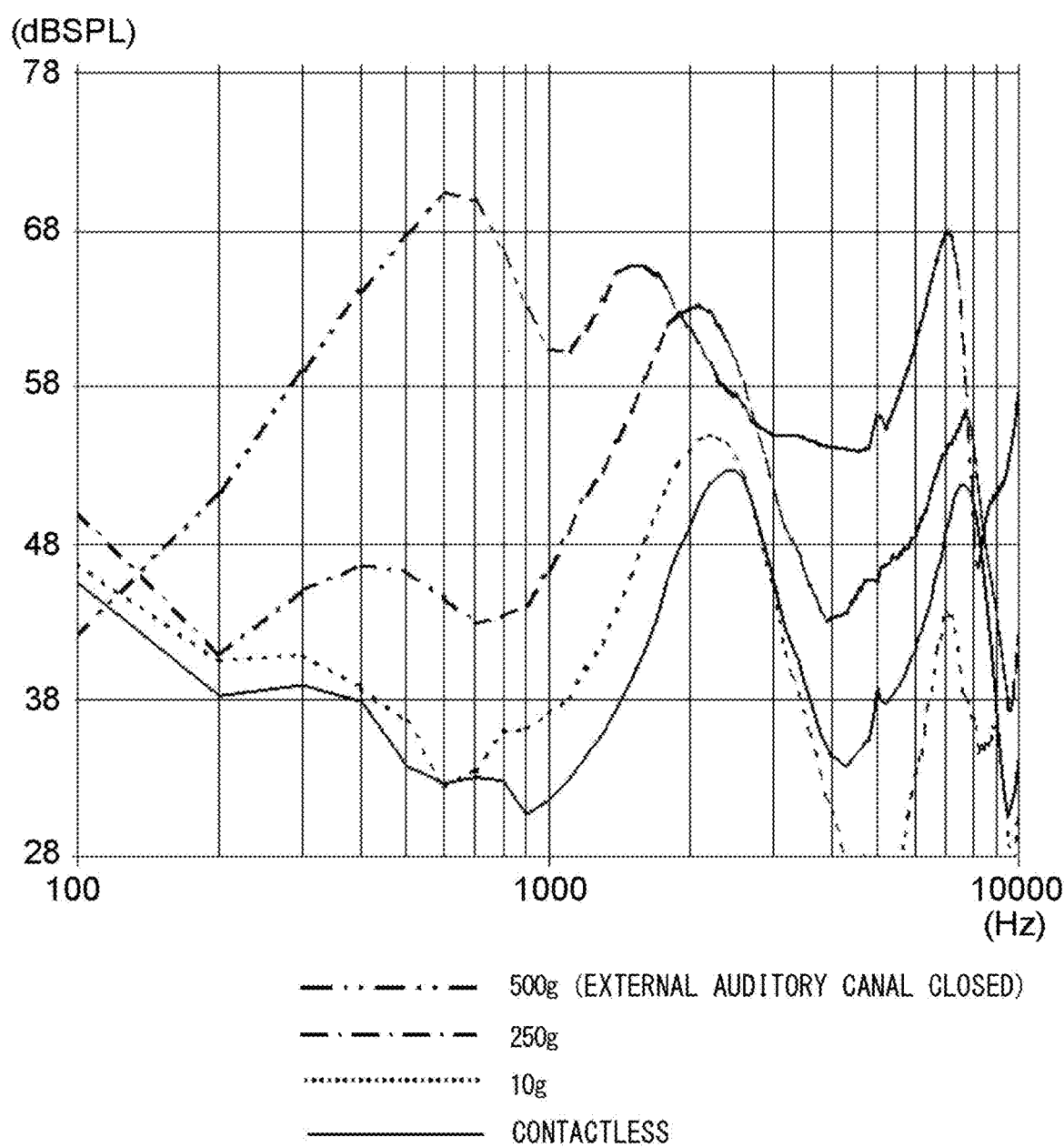
FIG. 4 is a graph illustrating an example of measured data which shows an effect of the cartilage conduction.

FIG. 4 is a graph illustrating an example of measured data showing an effect of cartilage conduction. The graph of FIG. 4 illustrates, in relation to frequency, sound pressure within the external auditory canal at a position 1 cm inside from the entrance part of the external auditory canal when, without contact with a helix, a surface of an outer wall of a vibration body that is caused to vibrate by a cartilage conduction vibration source is brought into contact with at least part of ear cartilage around the entrance part of the external auditory canal. In the graph, a vertical axis indicates sound pressure (in dBSPL), and a horizontal axis indicates frequency on a logarithmic scale (in Hz). In terms of contact pressure relationship between the surface of the outer wall of the vibration body and the cartilage around the entrance part of the external auditory canal, the graph uses a solid line to illustrate the sound pressure during a non-contact state (in a state where only air-conducted sound generated from the surface of the outer wall of the vibration body can be heard), a short dashed line to illustrate the sound pressure under a contact pressure of 10 grams, a single-dotted chain line to illustrate the sound pressure under a contact pressure of 250 grams, and a double-dotted chain line to illustrate the sound pressure under a contact pressure of 500 grams. As illustrated in the figure, the sound pressure increases as the contact pressure is increased from the non-contact state to the 10-gram contact pressure, and further increases as the contact pressure is increased to 250 grams, and then, the sound pressure increases even more as the contact pressure is further increased to 500 grams.

As can be readily understood from the graph of FIG. 4, when the surface of the outer wall of the vibration body is brought into contact with at least part of the ear cartilage around the entrance part of the external auditory canal without contacting the helix, the sound pressure at the position 1 cm inside from the entrance part of the external auditory canal increases by at least 10 dB in a main frequency range of voice (500 Hz to 2,300 Hz), compared to in the non-contact state. (See and compare the non-contact state indicated by the solid line with the state indicated by the single-dotted chain line.)

As can also be readily understood from the graph of FIG. 4, when the surface of the outer wall of the vibration body is brought into contact with at least part of the ear cartilage around the entrance part of the external auditory canal without contacting the helix, the sound pressure at the position 1 cm inside from the entrance part of the external auditory canal changes by at least 5 dB in the main frequency range of voice (500 Hz to 2,500 Hz) as the contact pressure changes. (See and compare the slightly contacting state indicated by the short-dashed line with the state indicated by the single-dotted chain line).

As is clear from the above description, even when the ear-mounted unit 6 does not have a structure for generating air-conducted sound (such as a vibration plate included in typical earphones), it is possible to obtain sufficient sound pressure by transmitting vibration of the cartilage conduction vibration source 42 to the ear cartilage by bringing the cartilage conduction vibration source 42 into contact with the ear cartilage. As is also clear from the above description, since there is no need of providing a structure for generating air-conducted sound, the ear-mounted unit 6 can be formed in a ring shape having the hole 6a, for example, and this makes it possible to hear outside sound through the hole 6a even when the ear-mounted unit 6 is mounted to an ear, and this contributes to comfortable wear of the ear-mounted unit 6 without a feeling of blockage in the external auditory canal.

Further, as can be readily understood from the graph of FIG. 4, when the entrance part of the external auditory canal is closed by bringing the surface of the outer wall of the vibration body into firm contact with at least part of the ear cartilage (the data of FIG. 4 was actually obtained by measurement performed in a state where the entrance of the external auditory canal was closed with the tragus bent with the surface of the outer wall of the vibration body pressed against the tragus from outside), the sound pressure at the position 1 cm inside from the entrance portion of the external auditory canal increases by at least 20 dB in the main frequency range of voice (300 Hz to 1800 Hz). This is caused by the occlusion effect. (See and compare the non-contact state indicated by the solid line with the state where the external auditory canal is closed indicated by the double-dotted chain line).

The measurement results of which are illustrated in FIG. 4 was all conducted under a constant output of the cartilage conduction vibration source. Regarding FIG. 4, for the measurement conducted with the surface of the outer wall of the vibration body contacting at least part of the ear cartilage around the entrance part of the external auditory canal without contacting the helix, the surface of the outer wall of the vibration body was brought into contact with at least part of the ear cartilage from outside of the tragus. Also, for the measurement conducted with the external auditory canal closed, the closed state of the external auditory canal was brought about by pressing the tragus from outside so strong as to bend the tragus as described above.

In the first embodiment, the occlusion effect as described above can be achieved by closing the hole 6a and increasing the contact pressure of the ear-mounted unit 6 against the cartilage by pushing the ear-mounted unit 6 with a finger placed over the hole 6a. Or, instead, the occlusion effect can be achieved by covering the entire ear 4 with a palm. Thus, clearly, in the first embodiment, too, it is possible to hear a larger sound by closing the hole 6a with a finger or entirely covering the ear with a palm.

The measurement graph of FIG. 4 is merely an example; upon further scrutiny, there are individual differences. Also, for simplification and standardization of the phenomenon, the values illustrated in the measurement graph of FIG. 4 were obtained through measurement performed in a state where the surface of the outer wall of the vibration body was in contact only with a small surface area of the outside of the tragus. However, increase in sound pressure caused by the contact with the cartilage also depends on the area of the contact, and in a case where the surface of the outer wall is in contact with the ear cartilage around the entrance part of the external auditory canal without contacting the helix, the increase in sound pressure is further elevated when the surface of the outer wall of the vibration body is in contact with a portion of the cartilage wider than around the entrance part of the external auditory canal. In consideration of the above facts, the values illustrated in the measurement graph of FIG. 4 have generality in illustrating the configuration making use of cartilage conduction, and can be reproduced by many and unspecified subjects. Further, the measurement graph of FIG. 4 was drawn by plotting the values obtained by the measurement conducted with the tragus being pressed from the outside in closing the entrance part of the external auditory canal to thereby increase the contact pressure and fold the tragus over, but similar results can be obtained also in a case where the outer wall of the vibration body is pressed into the entrance part of the external auditory canal to close the external auditory canal.

Figure 5:
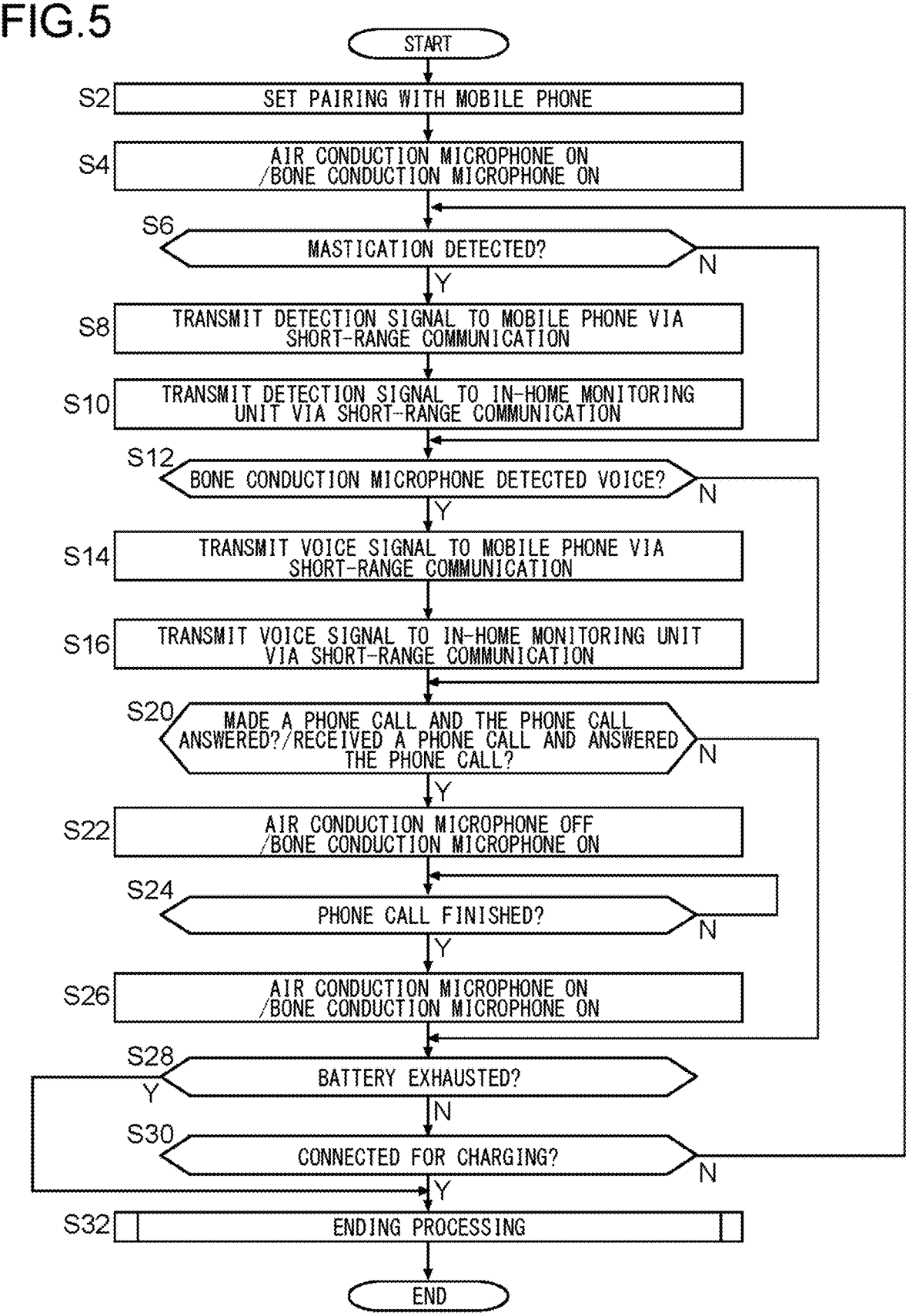
FIG. 5 is a flowchart illustrating a function of an ear-mounted unit in the first embodiment.

FIG. 5 is a flowchart illustrating a function of the control unit 40 of the ear-mounted unit 6 in the watching system of the first embodiment. The flow starts when the ear-mounted unit 6 connected to an unillustrated charger for charging is disconnected from the charger. When the flow starts, in Step S2, it is checked whether or not pairing for short-range communication with the mobile phone 10 has been set, and when no pairing is found to have been set, pairing is automatically set. Next, in Step S4, the air conduction microphone 46 and the bone conduction microphone 44 are turned on. Thereby, the ear-mounted unit 6 starts to function as a hearing aid, and also the bone conduction microphone 44 is brought into a standby state in which it stands by for detection of voice of the watching-target person. Here, although omitted in the flow, the mastication sensor 38 is constantly in an ON state from the start to an end of the flow and in a standby state in which it stands by for detection of mastication.

Next, in Step S6, it is checked whether or not the mastication sensor 38 has detected a masticatory movement. When a mastication movement is found to have been detected, the process proceeds to Step S8, where a detection signal is transmitted to the mobile phone 10 via short-range communication, and then the process proceeds to Step S12. On the other hand, when no mastication movement is found to have been detected in Step S6, the process proceeds directly to Step S12.

In Step S12, it is checked whether or not the bone conduction microphone 44 has detected voice of the watching-target person. When voice of the watching-target person is found to have been detected, the process proceeds to Step S14, and a detected voice signal is transmitted to the mobile phone 10 via the short-range communication, and meanwhile, in Step S16, the detected voice signal is transmitted to the in-home monitoring unit 8 via the short-range communication. Although the steps from Step S12 to Step S16 are illustrated in a simplified manner, in these steps, actually, for a predetermined period of time (10 seconds, for example) after voice starts to be detected by the bone conduction microphone 44, the voice signal continues to be transmitted from the bone conduction microphone 44 simultaneously to the mobile phone 10 and the in-home monitoring unit 8. At this time, even when the voice continues to be detected for a predetermined period of time or longer, the transmission is stopped as soon as the predetermined period of time elapses, whereas even though the voice disappears before the predetermined period of time elapses, the transmission of output of the bone conduction microphone 44 continues to be performed until the predetermined period of time elapses. The above-described transmission of the voice signal continued for a predetermined period of time through the steps from Step S12 to Step S16 is finished, the process proceeds to Step S20. On the other hand, when no voice signal is detected in Step S12, the process proceeds directly to Step S20.

In Step S20, it is checked whether the watching-target person has operated the mobile phone 10 to make a phone call and the other party has answered the phone call, or whether there has been an external incoming call received by the mobile phone 10 and the watching-target person has operated the mobile phone 10 to answer the incoming call. If whichever of the above is found to have occurred, the process proceeds to Step S22, where the air conduction microphone 46 is turned off and the bone conduction microphone 44 is maintained in an on state, and then the process proceeds to Step S24. Thereby, the ear-mounted unit 6 starts to function as a headset for the mobile phone 10, and prevents ambient noise from being picked up by the air conduction microphone 46 to disturb the phone call.

In Step S24, it is checked whether the phone call started in Step S20 has been ended by hanging-up of the phone. Then, when it is detected that the phone call has been ended, the process proceeds to Step S26, where the air conduction microphone 46 is turned on and the bone conduction microphone 44 is maintained in an on state, and the process proceeds to Step S28. Thereby, the ear-mounted unit 6 starts to function as a hearing aid again, and the bone conduction microphone 44 is maintained in the standby state in which it stands by for detection of voice of the watching-target person. On the other hand, when it is found that the phone call has not been ended yet in Step S24, the Step S24 is repeated until end of the phone call is detected. Further, in a case where, in Step S20, neither making a phone call and answering the phone call nor receiving a phone call and answering the phone call is detected, the process proceeds directly to Step S28.

In Step S28, it is checked whether the storage battery of the power supply unit 48 has been exhausted. When the storage battery is found not to have been exhausted, the process proceeds to Step S30, where it is checked whether the ear-mounted unit 6 has been connected to the charger, which is not illustrated, to be charged. This step is provided to deal with a case of removing the ear-mounted unit 6 from the year 4 to be charged even though the storage battery has not been exhausted. When connection for charging is detected in Step S30, the process proceeds to Step S32, where ending processing is performed to end the flow. This is significant in that this helps prevent the ear-mounted unit 6 from being maintained in an operation state by mistake when it is removed from the ear 4 and thus its watching function is disabled. On the other hand, when no connection for charging is detected in Step S30, the process returns to Step S6 to repeat the steps from Step S6 to Step S30 until the storage battery becomes exhausted or connection is achieved for charging, and the ear-mounted unit 6 maintains, as necessary, its hearing-aid function, watching function, and headset function for the mobile phone 10. Here, in a case where it is detected in Step S28 that the storage battery has been exhausted, too, the process proceeds to Step S32, where the ending processing is performed to end the flow.

Figure 6:
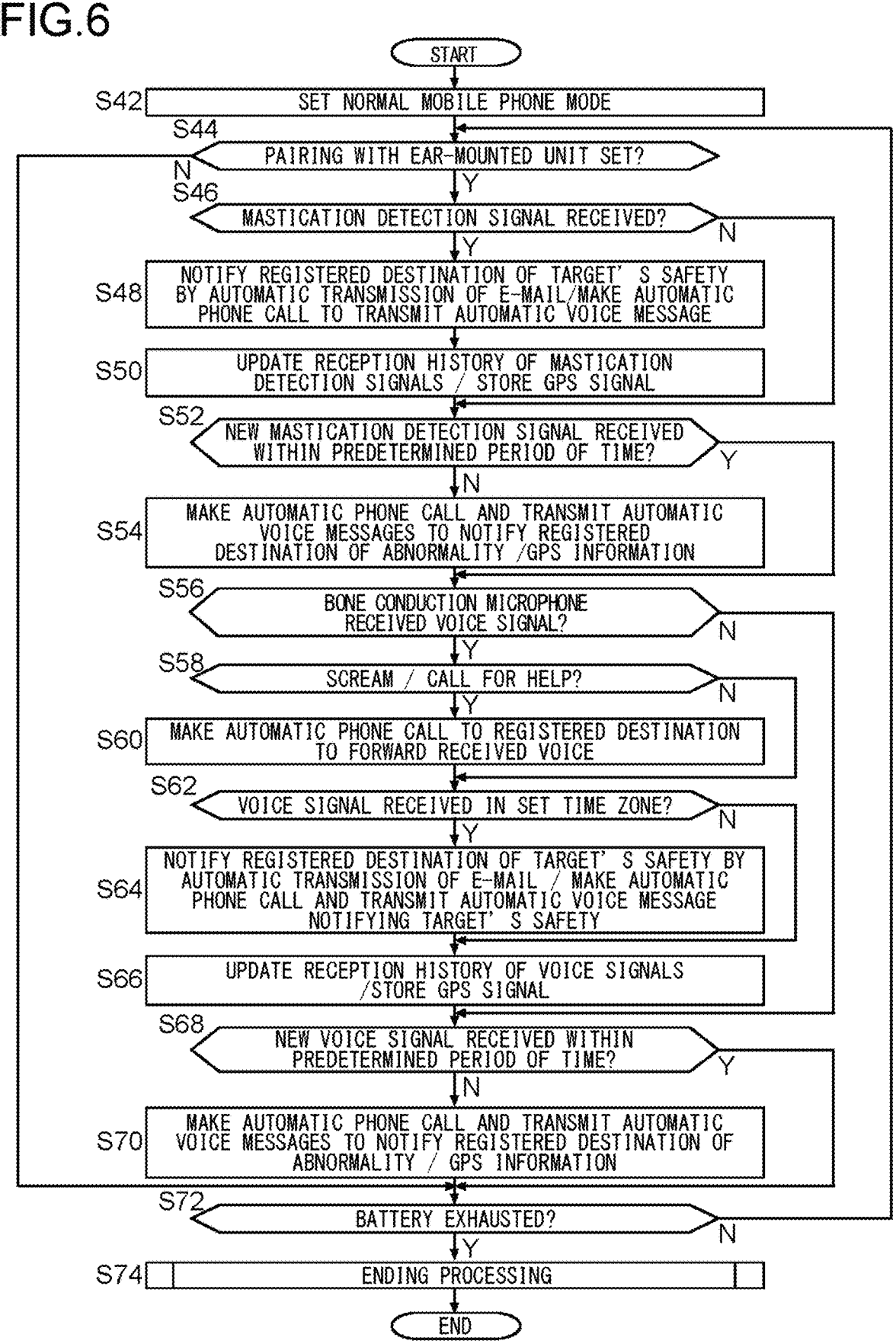
FIG. 6 is a flowchart illustrating a function of a mobile phone in the first embodiment.

FIG. 6 is a flowchart illustrating a function of the control unit 30 of the mobile phone 10 in the first embodiment. Note that FIG. 6 illustrates the flow by extracting operations of functions related to watching, and thus in the mobile phone 10, the control unit 30 has operations that are not described in the flow of FIG. 6, such as operations related to a normal mobile phone function of the mobile phone 10. A hardware configuration itself of the mobile phone 10 is one that is typically adopted in mobile phones, and the functions extracted in FIG. 6 are installed in the ear-mounted unit 6 as accessory software.

The flow of FIG. 6 starts when a power switch of the mobile phone 10 is turned on, and in Step S42, a normal mobile phone mode is set. Next, in Step S44, a check is performed for a state of pairing for the short-range communication with the ear-mounted unit 6. When the pairing is found to have been achieved, watching can be performed by the mobile phone 10 in cooperation with the ear-mounted unit 6, and thus the process proceeds to Step S46.

In Step S46, it is checked whether or not a new mastication detection signal has been received from the ear-mounted unit 6, and when it is found that there has been reception of a new mastication detection signal, the process proceeds to Step S48, where an e-mail notifying that the watching-target person is safe is automatically transmitted to a mobile phone of the member of family of the watching-target person or the like who lives remotely and has been registered in advance. Further, it may be set in advance that in Step S48, instead of sending an e-mail, an automatic phone call is made to the mobile phone of the member of family of the watching-target person or the like who lives remotely and has been registered in advance, and on reception of a response from the mobile phone, an automatic voice message is transmitted to notify him/her that the watching-target person is safe. It is also possible to set such that both an e-mail and a phone call are to be sent and made. As for detecting mastication, which basically takes place three times a day and thus can be regarded as not too often, each time a mastication detection signal is detected, the member of family of the watching-target person or the like who lives remotely is notified that the watching-target person is safe and thereby reassured. Here, in a case where the member of family of the watching-target person or the like who lives remotely feels annoyed by such safety notifications, it is possible to set in advance such that Step S48 will be omitted.

Next, the process proceeds to Step S50, where reception history of mastication detection signals stored in the storage unit 32 is updated, together with time and date information, based on the reception of the new mastication detection signal, and a GPS signal at that time point is also stored in the storage unit 32, and then the process proceeds to Step S52. On the other hand, when reception of a mastication detection signal has not been able to be confirmed in Step S46, the process proceeds directly to Step S52.

In Step S52, based on the reception history stored in the storage unit 32, it is checked whether or not there has been reception of a new mastication detection signal within a predetermined period of time after the reception of the preceding mastication detection signal. When it is found that there has not been reception of a new mastication detection signal within the predetermined period of time, the process proceeds to Step S54, where an automatic phone call is made to the mobile phone of the member of family of the watching-target person or the like who lives remotely and has been registered in advance, and on reception of a response to the phone call, an automatic voice message is transmitted to the effect that there is a possibility of an abnormality, and the process proceeds to Step S56. Further, in Step S54, another automatic voice message is transmitted to notify a current location of the watching-target person based on GPS information obtained then. On the other hand, in Step S52, when it is confirmed from the reception history that there has been reception of a new mastication detection signal, the process proceeds to Step S56.

In Step S56, it is checked whether or not there has been reception of a voice signal picked up by the bone conduction microphone 44 of the ear-mounted unit 6. When it is found that there has been reception of such a voice signal, the process proceeds to Step S58, where it is checked whether or not the received voice is a scream or begging for help (urgency) based on recognized contents of the voice signal (such as words included in the voice signal), intensity of the voice signal, a tone pattern, etc. When there is a high possibility that the voice is a scream or begging for help (when it is judged that it is a highly urgent situation), the process proceeds to Step S60, where an automatic phone call is made to the mobile phone of the member of family of the watching-target person or the like who lives remotely and has been registered in advance, and on reception of a response to the phone call, the received voice itself is transmitted to the mobile phone, and then the process proceeds to Step S62. On the other hand, when, in Step S58, it is judged that the received voice is not a scream or begging for help but merely voice of an ordinary conversation (of low urgency), the process proceeds directly to Step S62.

In Step S62, it is checked whether or not the received voice signal has been received in a time zone (for example, a time zone when the watching-target usually goes shopping, a time zone when the watching-target person usually chants a sutra) previously set based on a regular life pattern. When the result of the check is in the affirmative, the process proceeds to Step S64, where an e-mail is automatically transmitted to the mobile phone of the member of family of the watching-target person or the like who lives remotely and has been registered in advance to notify him/her that the watching-target person is safe, and the process proceeds to Step S66. On the other hand, in Step S62, when the received voice signal is found not to have been received in the previously set time zone, the process proceeds directly to Step S66. Here, a setting same as in Step S48 is also possible, that is, instead of or together with an e-mail, an automatic phone call may be made and automatic voice message may be transmitted. Further, in a case where the member of family of the watching-target person or the like who lives remotely feels annoyed by such safety notifications, it is possible to set in advance such that Steps S62 and S64 will be omitted. The message to be transmitted in Step S64 is not the voice signal actually picked up by the bone conduction microphone 44, but a message notifying merely the fact that there has been reception of a voice signal. Thus, in contrast to in Step S60, contents of conversation of the watching-target person are not heard and thus privacy of the watching-target person is preserved.

In Step S66, reception history of voice signals stored in the storage unit 32 is updated, together with time and date information, based on the reception of the new voice signal, and a GPS signal at that time point is also stored in the storage unit 32, and then the process proceeds to Step S68. On the other hand, in a case where reception of a voice signal picked up by the bone conduction microphone 44 has not been confirmed in Step S56, the process proceeds directly to Step S68.

In Step S68, based on the reception history stored in the storage unit 32, it is checked whether or not there has been reception of a new voice signal within a predetermined period of time after the reception of the preceding voice signal. When there has been no reception of a new voice signal within the predetermined period of time, the process proceeds to Step S70, where an automatic phone call is made to the mobile phone of the member of family of the watching-target person or the like who lives remotely and has been registered in advance, and on reception of a response to the phone call, an automatic voice message is transmitted to the effect that there is a possibility of an abnormality, and then the process proceeds to Step S72. In Step S70, too, another automatic voice message is transmitted to notify a current location of the watching-target person based on GPS information obtained then. On the other hand, when it is confirmed in Step S68 that there has been reception of a new voice signal within the predetermined period of time, the process proceeds directly to Step S72. Here, in a case where setting of pairing with the ear-mounted unit 6 is not confirmed in Step S44, the process proceeds directly to Step S72, the steps for watching are not performed, and the mobile phone 10 functions as an ordinary mobile phone.

In Step S72, it is checked whether or not the storage battery of the power supply unit 34 has been exhausted. When the storage battery is found not to have been exhausted, the process returns to Step S44, and then, the steps from Step S44 to Step S72 are repeated until exhaustion of the storage battery is detected, such that the mobile phone 10 deals with various situations in watching. On the other hand, in a case where, in Step S72, the storage battery is found to have been exhausted, the process proceeds to Step S74, where ending processing is performed to end the flow.

Figure 7:
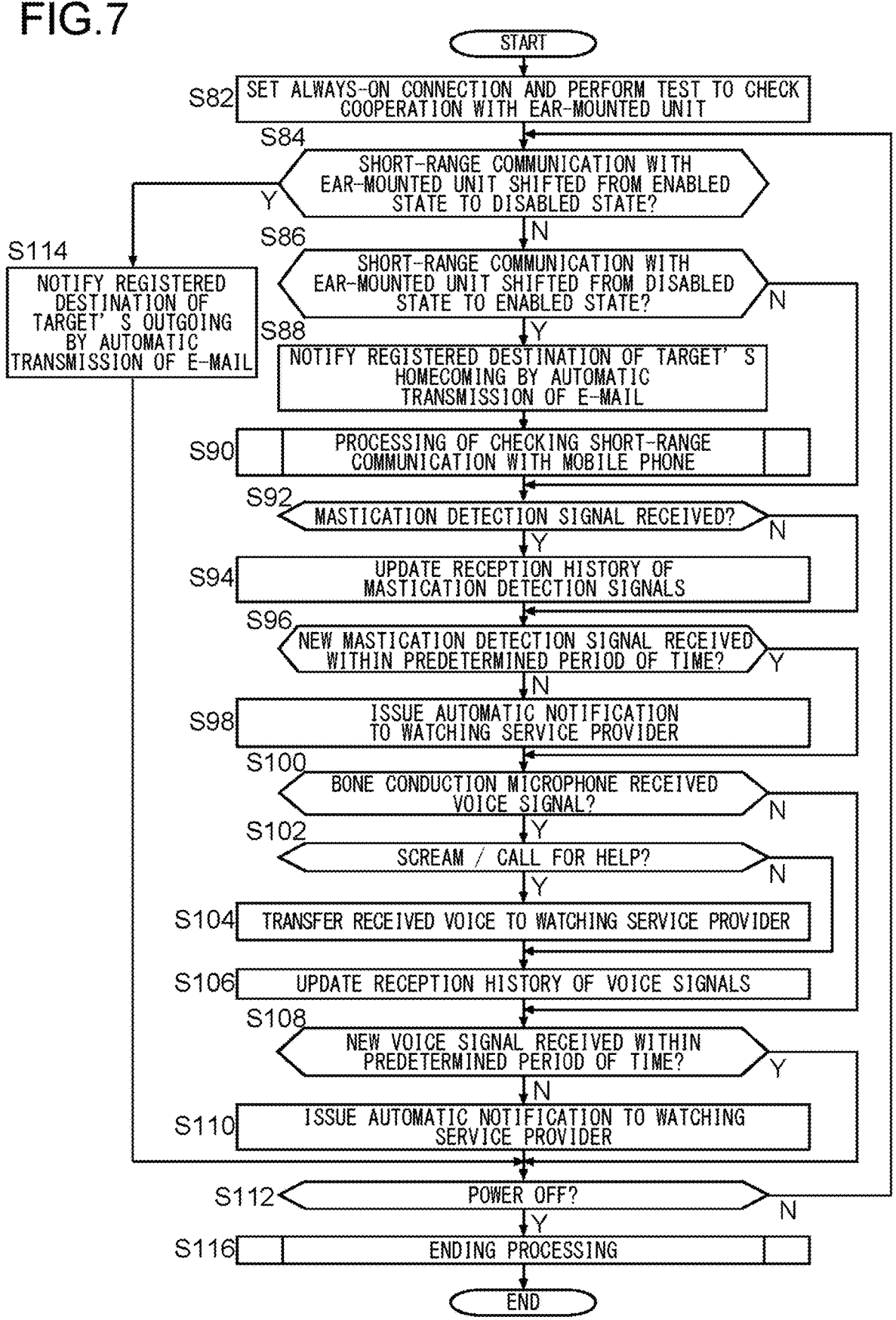
FIG. 7 is a flowchart illustrating a function of an in-home monitoring unit in the first embodiment.

FIG. 7 is a flowchart illustrating a function of the control unit 16 of the in-home monitoring unit 16 in the first embodiment. The flow starts when the in-home monitoring unit 8 is placed and connected to the household power supply or the power supply of the in-home monitoring unit 8 is turned on. Then, in Step S82, always-on connection to the Internet is automatically set for communication with the watching service provider, and an automatic test is performed to check cooperation, such as the short-range communication, with the ear-mounted unit 6, and the process proceeds to Step S84.

In Step S84, it is checked whether or not the state of the short-range communication with the ear-mounted unit 6 has been shifted from an enabled state to a disabled state. This is equivalent to checking whether or not the watching-target person has gone out into a range where the short-range communication is not available. When such shift of the state is found not to have taken place, the process proceeds to Step S86, where it is checked whether or not the state of the short-range communication with the ear-mounted unit 6 has shifted from the disabled state to the enabled state. This is equivalent to checking whether or not the watching-target person has come back into the short-range communication range. When such shift of the state is found to have taken place, the process proceeds to Step S88, where an e-mail is automatically transmitted to the mobile phone of the member of family of the watching-target person or the like who lives remotely and has been registered in advance to notify him/her that the watching-target person has come home.

Further, in Step S90, automatic short-range communication is performed with the mobile phone 10, and processing is performed to confirm that the state of short-range communication has been shifted back into the state of system configuration as illustrated in FIG. 2. This processing is performed because it can be presumed that when the watching-target person is out, the mobile phone 10 is carried by him/her into a range where the short-range communication is not available. In Step S90, if by any chance it cannot be confirmed that the short-range communication is possible with the mobile phone 10, notification to that effect is issued to the watching service provider and to the mobile phone of the member of family of the watching-target person or the like who lives remotely.

In Step S90, further, a cross check of the history of reception from the ear-mounted unit 6 and information exchange are performed between the storage unit 18 of the in-home monitoring unit 8 and the storage unit 32 of the mobile phone 10 to match the information in the storage unit 18 and the information in the storage unit 32 with each other. This is applicable mainly to a case where the watching-target person is out and the in-home monitoring unit 8 cannot receive signals from ear-mounted unit 6, during which information cannot be received from the in-home monitoring unit 8 and thus information is received from the mobile phone 10 instead. This helps prevent inconvenience of, for example, the in-home monitoring unit 8 erroneously recognizing an abnormal state without any signal transmission from the ear-mounted unit 6 for a predetermined period of time or longer, although there has been a transmission of a signal from the ear-mounted unit 6. The function of matching information in the two storage units by the cross check as described above is also useful as a measure to deal with a case where the storage battery of the mobile phone 10 has been exhausted when the mobile phone 10 is in the home 2 and thus information is not received from the ear-mounted unit 6 until the storage battery is recharged.

When the processing in Step S90 is completed, the process proceeds to Step S92, where it is checked whether or not there has been reception of a new mastication detection signal from the ear-mounted unit 6. When it is found that there has been reception of a new mastication detection signal, the process proceeds to Step S94, where reception history of mastication detection signals stored in the storage unit 18 is updated, together with time and date information, based on the reception of the new mastication detection signal, and the process proceeds to Step S96. On the other hand, when reception of a new mastication detection signal has been unable to be confirmed in Step S92, the process proceeds directly to Step S96.

In Step S96, based on the reception history stored in the storage unit 18, it is checked whether or not there has been reception of a new mastication detection signal within a predetermined period of time after the reception of the preceding mastication detection signal. When there is no reception of a new mastication detection signal within the predetermined period of time, the process proceeds to Step S98, where an automatic notification is issued to the watching service provider, with whom a contract has been made in advance, to the effect that there is a possibility of an abnormality, and then the process proceeds to Step S100. On the other hand, when it is confirmed, in Step S96, from the reception history of mastication detection signals, that there has been reception of a new mastication detection signal within the predetermined period of time, it is judged that there is no abnormality occurring, and the process proceeds directly to Step S100.

In Step S100, it is checked whether or not there has been reception of a voice signal picked up by the bone conduction microphone 44 of the ear-mounted unit 6. When it is found that there has been reception of such a voice signal, the process proceeds to Step S102, where it is checked whether or not the received voice is a scream, a cry for help, or the like, based on identification of voice in the contents (words and the like included therein) of the voice signal, intensity pattern, tone, and the like of the voice signal, etc. When there is a high possibility that the voice is a scream or a cry for help, the process proceeds to Step S104, where the received voice itself is transferred to the watching-service provider, and the process proceeds to Step S106. On the other hand, when, in Step S102, it is judged that the received voice is neither a scream nor a cry for help, but voice of an ordinary conversation, the process proceeds directly to Step S106.

In Step S106, reception history of voice signals stored in the storage unit 18 is updated, together with time and data information, based on the reception of the new voice signal, and the process proceeds to Step S108. On the other hand, when reception of a voice signal picked up by the bone conduction microphone 44 has not been confirmed in Step S100, the process proceeds directly to Step S108.

In Step S108, based on the reception history of voice signals stored in the storage unit 18, it is checked whether or not there has been reception of a new voice signal within a predetermined period of time after the reception of the preceding voice signal. When it is found that there has been no reception of a new voice signal within the predetermined period of time, the process proceeds to Step S110, where an automatic notification is issued to the watching service provider to the effect that there is a possibility of an abnormality, and then the process proceeds to Step S112. On the other hand, when it is confirmed in Step S108 that there has been reception of a new voice signal within the predetermined period of time based on the reception history, the process proceeds directly to Step S112. Here, when it is detected in Step S84 that the state of the short-range communication with the ear-mounted unit 6 has been shifted from an enabled state to a disabled state, the process proceeds to Step S114, where an e-mail is automatically transmitted to the mobile phone of the member of family of the watching-target person or the like who lives remotely and has been registered in advance to notify him/her that the watching-target person has gone out, and then the step proceeds to Step S112. In this case, since it is impossible to receive signals from the ear-mounted unit 6 and thus to perform watching, the mobile phone 10 that the watching-target person carries is charged with execution of the watching function, and the in-home monitoring unit 8 does not executes the watching function.

In Step S112, it is checked whether or not power of the in-home monitoring unit 8 has been turned off. Turning off of the power of the in-home monitoring unit 8 includes power-supply disconnection caused by power failure or the like. When it is found that there has been no turning off of the power, the process returns to Step S84, and then the steps of from Step S84 to Step S114 are repeated as long as the power is not turned off, and the in-home monitoring unit 8 deals with various situations in watching. On the other hand, when turning off of the power is detected in Step S112, the process proceeds to Step S116, where ending processing is performed to end the flow.

Second Embodiment

Figure 8:
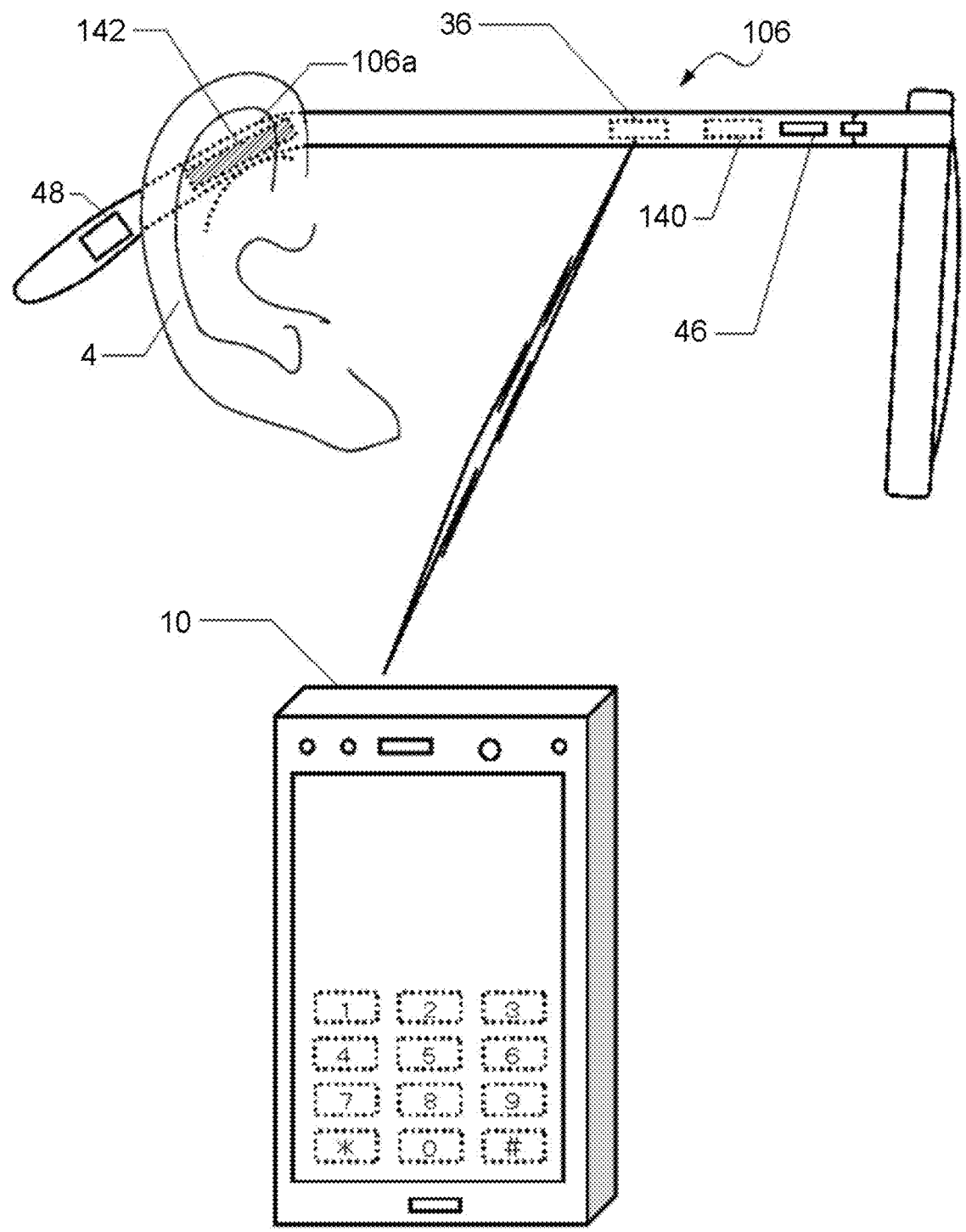
FIG. 8 is a diagram illustrating a system configuration of a second embodiment of the present invention (second embodiment)

FIG. 8 is a diagram illustrating a system configuration of a second embodiment according to an aspect of the present invention. According to the second embodiment, a watching system for watching inside a home includes an eyeglass type ear-mounted unit 106. The other features are the same as the first embodiment illustrated in FIGS. 1 and 2, and thus the common features are denoted by the same reference numerals and overlapping descriptions thereof will not be repeated. In FIG. 8, for the sake of simplicity, a home 2 and an in-home monitoring unit 8 are not illustrated, but configurations thereof are common to those of the first embodiment described in FIGS. 1 and 2.

According to the present invention, a cartilage conduction vibration source, a bone conduction microphone, and a mastication sensor can each be formed with a piezoelectric element, and thus, one piezoelectric element can serve as a cartilage conduction vibration source, a bone conduction microphone, and a mastication sensor. In the second embodiment illustrated in FIG. 8, a piezoelectric bimorph element 142 which serves as a cartilage conduction vibration source, a bone conduction microphone, and a mastication sensor are formed in such part of a temple of eyeglasses as is laid on a cartilage in a base of an ear 4 when the eyeglasses are worn. With this configuration, vibration of the piezoelectric bimorph element 142 is conducted to the cartilage at the base of the ear 4 to cause cartilage conduction. Further, voice by bone conduction is picked up by the piezoelectric bimorph element 142. Further, movement caused by mastication in part close to the base of the ear 4 is also detected by the piezoelectric bimorph element 142. In using the piezoelectric bimorph element 142 for the plurality of functions, extraction and separation of signals fed to and outputted from the piezoelectric bimorph element 142 are achieved by means of signal processing performed by a control unit 140. When the piezoelectric bimorph element 142 is used for the plurality of functions, an air conduction microphone 46, which is originally provided for the purpose of picking up voice of a conversation partner for the function of hearing aid, is used to pick up voice of a watching-target person himself or herself by air conduction, and the picked up voice is used as information for the extraction and separation of signals fed to and outputted from the piezoelectric bimorph element 142. In the second embodiment, too, the entrance of an external auditory canal is left open, and thus it is possible to hear external sound and to achieve comfortable wear of an ear-mounted unit 106 without a feeling of blockage in the external auditory canal. Further, by closing the entrance of the external auditory canal with a finger or completely covering the ear 4 with a palm, it is possible to obtain the occlusion effect in cartilage conduction, to thereby hear a larger sound.

The various features of the embodiments described above can be implemented not only in those specific embodiments but also in any other embodiment so long as they provide their advantages. Moreover, the various features of the embodiments can be implemented with various modifications. Modified features can be implemented in appropriate combinations with each other and with unmodified features.

For example, in the configuration of the first embodiment, one piezoelectric bimorph element may be used for the functions of the cartilage conduction vibration source, the bone conduction microphone, and the mastication sensor as in the second embodiment. Or, conversely, in the second embodiment, the cartilage conduction vibration source, the bone conduction microphone, and the mastication sensor may be formed as optimum separate elements to be optimally disposed at scattered positions.

Further, in the above embodiments, a bone conduction microphone is adopted to pick up voice of a watching-target person, but an air-conducted sound microphone may be used for this purpose (for example, the air conduction microphone 46 serving for this purpose, too).

Third Embodiment

Figure 9:
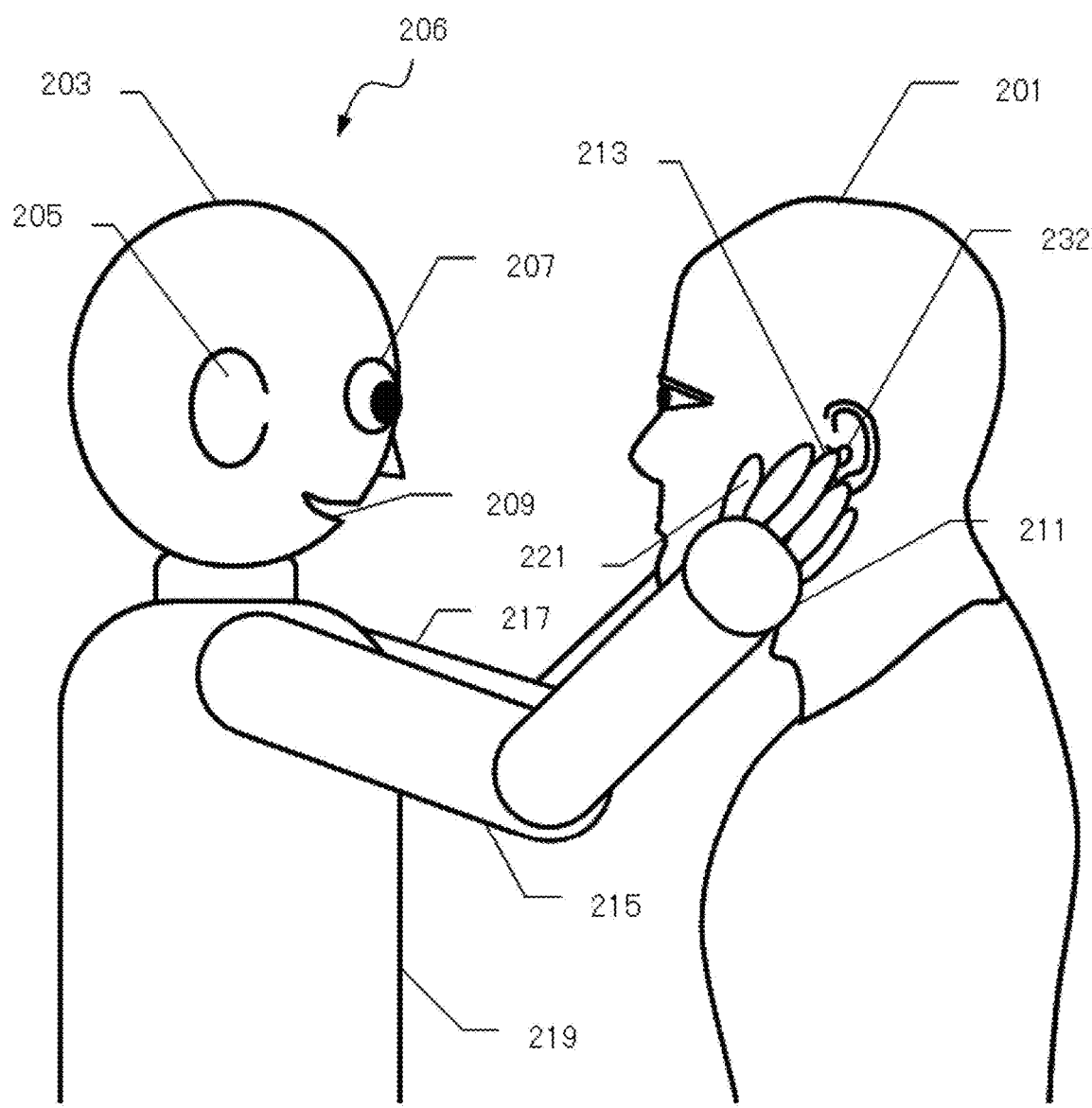
FIG. 9 is a diagram illustrating a system configuration of a third embodiment of the present invention (third embodiment)

FIG. 9 is a system configuration diagram of a third embodiment according to one aspect of the present invention. The third embodiment is configured as a robot that can communicate with a human by cartilage conduction; as in the first embodiment, it constitutes a watching system for watching inside a home and is capable of humanly communication with a watching-target person. The third embodiment in FIG. 9 is similar to the first embodiment except that the ear-mounted unit 6 in the first embodiment in FIG. 1 is replaced with a robot 206 in the third embodiment. Accordingly, illustration will be omitted except for the robot 206 and the watching-target person 201, and no description of common features will be repeated unless necessary.

As in the first embodiment, the robot 206 exchanges information with the in-home monitoring unit 8 shown in FIG. 1 and the mobile phone 10 of the watching-target person 201 via short-range communication. The robot 206 has, at the left and right ears 205 of a head part 203, a pair of stereo external air-conducted sound microphones to collect the voice of the watching-target person 201, and has, at left and right eyes 207 of the head part 203, a pair of 3D cameras to take an image of the watching-target person 201. The air-conducted sound microphones and the 3D cameras function respectively as sensors for watching the watching-target person 201, and the detected results are transmitted to the in-home monitoring unit 8 and the mobile phone 10 shown in FIG. 1. Moreover, at a mouth mechanism 209 in the head part 203 of the robot 206, an air-conducted sound speaker is provided, so that speech can be uttered to the watching-target person 201. At that time, the mouth mechanism 209 of the robot 206 moves in coordination with the speech. Moreover, the air-conducted sound microphones and the 3D cameras provided in the head part 203 of the robot 206 function also as an external talking unit of the mobile phone 10.

Next, cartilage conduction by use of the robot 206 will be described. In a middle finger 213 of a right hand 211 of the robot 206, a cartilage conduction vibration source comprising a piezoelectric bimorph or the like is arranged so that the finger tip of the middle finger 213 vibrates efficiently. The vibration of the cartilage conduction vibration source is conducted to the entire right hand 211, and thus cartilage conduction is possible from any part of the right hand 211. FIG. 9 shows a state where the finger tip of the middle finger 213 makes contact with the tragus 232 of the left ear of the watching-target person 201 and thereby optimum cartilage conduction is achieved. Though not illustrated in FIG. 9, a similar cartilage conduction vibration source is arranged also in a middle finger of a left hand of the robot 206, and makes contact with the tragus of the right ear of the watching-target person 201. In this way, cartilage conduction is possible stereophonically as in the ordinary hearing of air-conducted sound with both ears. Moreover, as in the utterance of speech from the air-conducted sound, the mouth mechanism 209 of the robot 206 moves in coordination with the voice conducted by cartilage conduction.

As shown in FIG. 9, the robot 206 gently holds the face of the watching-target person 201 in both hands and utters speech in a comforting atmosphere. Thus, the watching-target person 201 can hear the voice of the robot 206 in a comforted psychological condition. For such a staging, the right and left arms 215 and 217 of the robot 206 are provided with applied pressure limiters so that the pressure with which the robot 206 holds the face of the watching-target person 201 in both hands is not excessive.

Furthermore, to prevent the watching-target person 201 from feeling a sense of restraint, once an adequate pressure between the left and right hands is determined, while the relative distance between the left and right hands are maintained, the joints of the right and left arms 215 and 217 of the robot 206 are controlled relative to a trunk 219 of the robot 206 so that the left and right hands follow, with no resistance, the free movement of the face of the watching-target person 201. Moreover, to prevent the robot 206 from feeling cold when it touches the watching-target person 201 for the first time, the two hands of the robot 206 are heated to human body temperature before starting the movement of holding the face of the watching-target person 201. Furthermore, to conform to the staging in which the face of the watching-target person 201 is held in both hands and speech is uttered, the left and right eyes 207 of the robot 206 are movable in exterior appearance so as not to inadvertently avoid the line of sight of the watching-target person 201 but follows it naturally without giving an intimidating impression.

Utterance of speech by cartilage conduction as described above is useful in cases such as where the watching-target person 201 has impaired hearing for advanced age or the like and where the ambient noise is loud, and helps avoid a situation like one that requires the air-conducted sound speaker to yell out loudly. Moreover, in the thumb 221 of the right hand 211 of the robot 206, a bone conduction microphone is provided to collect the voice of the watching-target person 201 in cases such as where the ambient sound level is high, so as to collect bone-conducted sound from the cheek bone or the like. As will be described later, a similar bone conduction microphone is provided also in the left hand of the robot 206, and collects bone-conducted sound in a complementary manner with the bone conduction microphone on the right hand 211 side. As the bone conduction microphones, as in the second embodiment, cartilage conduction vibration sources comprising piezoelectric bimorph elements may be used to double as bone conduction microphones.

Figure 10:
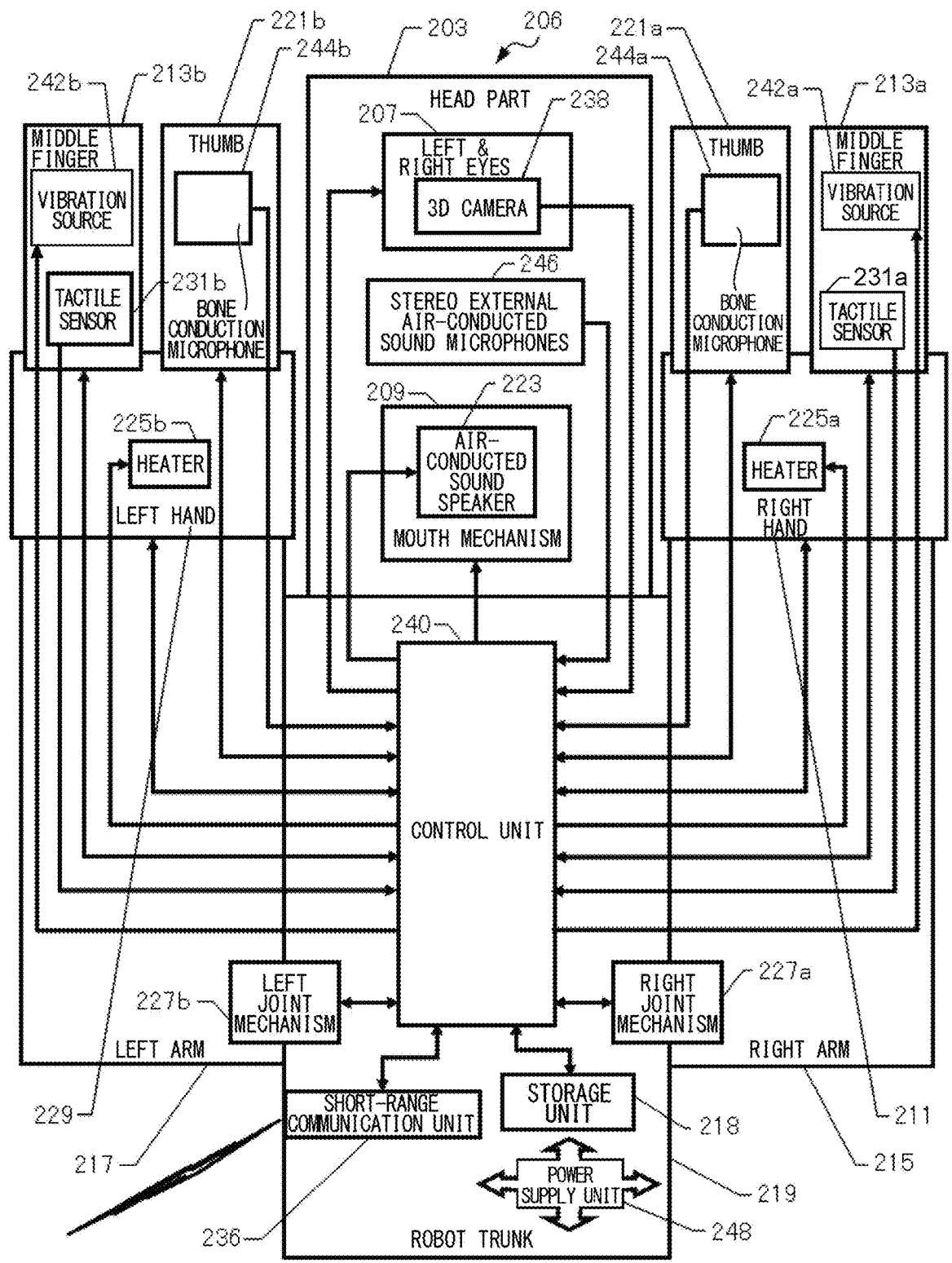
FIG. 10 is a block diagram of a robot of the third embodiment in FIG. 9.

FIG. 10 is a block diagram of the robot 206 of the third embodiment of the present invention shown in FIG. 9. Such parts as appear also in FIG. 9 are identified by the same reference numerals, and no overlapping description will be repeated unless necessary. As mentioned above, communication with the in-home monitoring unit 8 and the mobile phone 10 shown in FIG. 1 in the third embodiment is similar to that in the first embodiment, and accordingly, in FIG. 10, only a short-range communication unit 236 is illustrated and no description will be repeated.

As shown in FIG. 10, the robot 206 has, at the left and right ears 205 (see FIG.

9) of the head part 203, a pair of stereo external air-conducted sound microphones 246, and collects external sound including the voice of the watching-target person 201 stereophonically. The head part 203 has, at the left and right eyes 207, a 3D camera (a pair of cameras) 238, and takes an image of the watching-target person 201. The direction of the head part 203 and the following of the line of sight of the left and right eyes 207 are controlled through the recognition of the face and the eyes of the watching-target person 201 based on an analysis of the image of the 3D camera 238. Moreover, at the mouth mechanism 209 in the head part 203 of the robot 206, an air-conducted sound speaker 223 is provided, and this makes utterance of speech to the watching-target person 201 possible as described above. The mouth mechanism 209 moves in coordination with the utterance of speech by the robot 206 from the air-conducted sound speaker 223.

As shown in FIG. 10, in the middle finger 213a of the right hand 211 of the robot, a cartilage conduction vibration source 242a comprising a piezoelectric bimorph element or the like is arranged so that the finger tip of the middle finger 213a vibrates efficiently. As mentioned above, the vibration of the cartilage conduction vibration source 242a is conducted to the entire right hand 211, and thus cartilage conduction is possible with any part of the right hand 211 in contact with the ear cartilage. As mentioned above, the mouth mechanism 209 of the robot 206 moves in coordination with the voice delivered by the vibration of the cartilage conduction vibration source 242a. The middle finger 213a is further provided with a tactile sensor 231a comprising a pressure-sensitive sensor or the like, and this will be described later. In a thumb 221a of the right hand 211 of the robot, a bone conduction microphone 244a is provided, which collects bone-conducted sound from the cheek bone or the like. As mentioned above, as to the bone conduction microphone 244a, as in the second embodiment, the cartilage conduction vibration source 242a comprising a piezoelectric bimorph element may be used to double as a bone conduction microphone. Though omitted from illustration to avoid complexity, a tactile sensor similar to the tactile sensor 231a in the middle finger 213a is provided also in the thumb 221a, and this too will be described later. The right hand 211 is further provided with a heater 225a, which is switched on before the start of the movement of holding the face of the watching-target person 201 to heat the entire right hand 211 to human body temperature.

As shown in FIG. 10, the right arm 215 is provided with a right joint mechanism 227a, which performs, among others, a movement for holding the face of the watching-target person 201 from the right side (the left side as seen from the watching-target person 201) and uttering speech. Although, for simplicity's sake, the right joint mechanism 227a is illustrated only at the should joint, it is assumed to represents all the joints of the right hand 211 and the right arm 215, including the elbow joint, the wrist joint, and the finger joints. As will be described later, the right joint mechanism 227a is coordinated with a left joint mechanism 227b so that, when the staging in which the face of the watching-target person 201 is held in both hands gently and speech is uttered, once an adequate pressure between the left and right hands is determined, while the relative distance between the left and right hands are maintained, the mechanisms are so controlled as to follow, with no resistance, the free movement of the face of the watching-target person 201.

The configuration of the left arm 217 and the left hand 229 in FIG. 10 is similar to the configuration of the right arm 215 and the right hand 211; accordingly, the constituent elements suffixed with "a", like the middle finger 213a, at the right side are illustrated as corresponding elements suffixed with "b", like the middle finger 213b, at the left side, and no overlapping description will be repeated. Of the constituent elements provided at the left and right sides, the cartilage conduction vibration sources 242a and 242b allow stereophonic hearing on the principle of cartilage conduction via the ear drums. On the other hand, the bone conduction microphones 244a and 244b collect the same vibration of the skull because of the nature of bone conduction; thus, they are provided at the left and right sides not to constitute stereo microphones but to mutually complement the contact state. Accordingly, as will be described later, in a case where the optimal cartilage conduction contact position is secured sufficiently by fine-tuning the contact position of the thumb at one side, the bone conduction microphone in the thumb at the other side may be omitted.

During communication with the watching-target person 201 by cartilage conduction, the right and left joint mechanisms 227a and 227b extend the right and left hands 211 and 229 toward the face of the watching-target person 201 as recognized through the analysis of the image by the 3D camera 238. The right and left joint mechanisms 227a and 227b are each provided with a load detection sensor, and detect whether or not any load is acting other than a movement in a free state that may result from collision with an arm, hand, finger, or the like. If any such load is acting, those sensors identify at what part of a joint and with what intensity it is acting.

When the load detection sensors of the right and left joint mechanisms 227a and 227b detect a load, and based on the image by the 3D camera 238, the cause is judged to be the holding of the face of the watching-target person 201 in both hands, then the applied pressure limiters operate to limit the pressure with which the face of the watching-target person 201 is held. Then, while the outputs from the tactile sensors 231a and 231b provided at the finger tips of the left and right middle fingers 213a and 231b and the image by the 3D camera 238 are monitored, the positions of the right and left hands 211 and 229 and the curves of the left and right middle fingers 213a and 231b are fine-tuned. In this way, the left and right middle fingers 213a and 231b are brought into contact with the tragi of the watching-target person 201 (the state illustrated in FIG. 9 is achieved). Likewise, also for the left and right thumbs 221a and 221b, while the outputs of the tactile sensors (unillustrated) provided at their finger tips and the image by the 3D camera 238 are monitored, the curves of the left and right thumbs 221a and 221b are fine-tuned so as to make contact with the cheek bones of the watching-target person 201.

Once an adequate pressure between left and right hands is determined, the right and left joint mechanisms 227a and 227b perform control such that the left and right hands move translatorily while keeping the relative distance between them so as to follow, with no resistance, the free movement of the face of the watching-target person 201. This following is performed relative to the state where the right and left arms 215 and 217, in a free state, are raised and kept at rest against their weights, and thus the load of the right and left arms 215 and 217 does not act on the face. In this state, when the load detection sensors of the right and left joint mechanisms 227a and 227b detect a load in a upward, downward, leftward, or rightward direction based on the movement of the face, in response, while the relative distance between the left and right hands are maintained, the right and left joint mechanisms 227a and 227b are driven subordinately. Thus, the watching-target person 201, despite his face being held in both hands of the robot 206, can move the face without restraint while maintaining the cartilage conduction state.

The functions described above are achieved by a control unit 240 based on programs stored in a storage unit 218. The control unit 240 includes a dedicated image processing function unit that is connected to the 3D camera 238. The control unit 240 further includes a dedicated piezoelectric bimorph driving function unit that is connected to the cartilage conduction vibration sources 242a and 242b, and a dedicated sound processing function unit that is connected to the piezoelectric bimorph driving function unit, the air-conducted sound speaker 223, and the bone conduction microphones 244a and 244b. The storage unit 218 temporarily stores various kinds of data for the functioning of the control unit 240. A power supply unit 248 including a rechargeable battery supplies different constituent elements of the robot 206 with voltages that they respectively need. The control unit 240, the storage unit 218, the power supply unit 248, and the short-range communication unit 236 mentioned above can be built in the trunk 219 of the robot 206.

Figure 11:
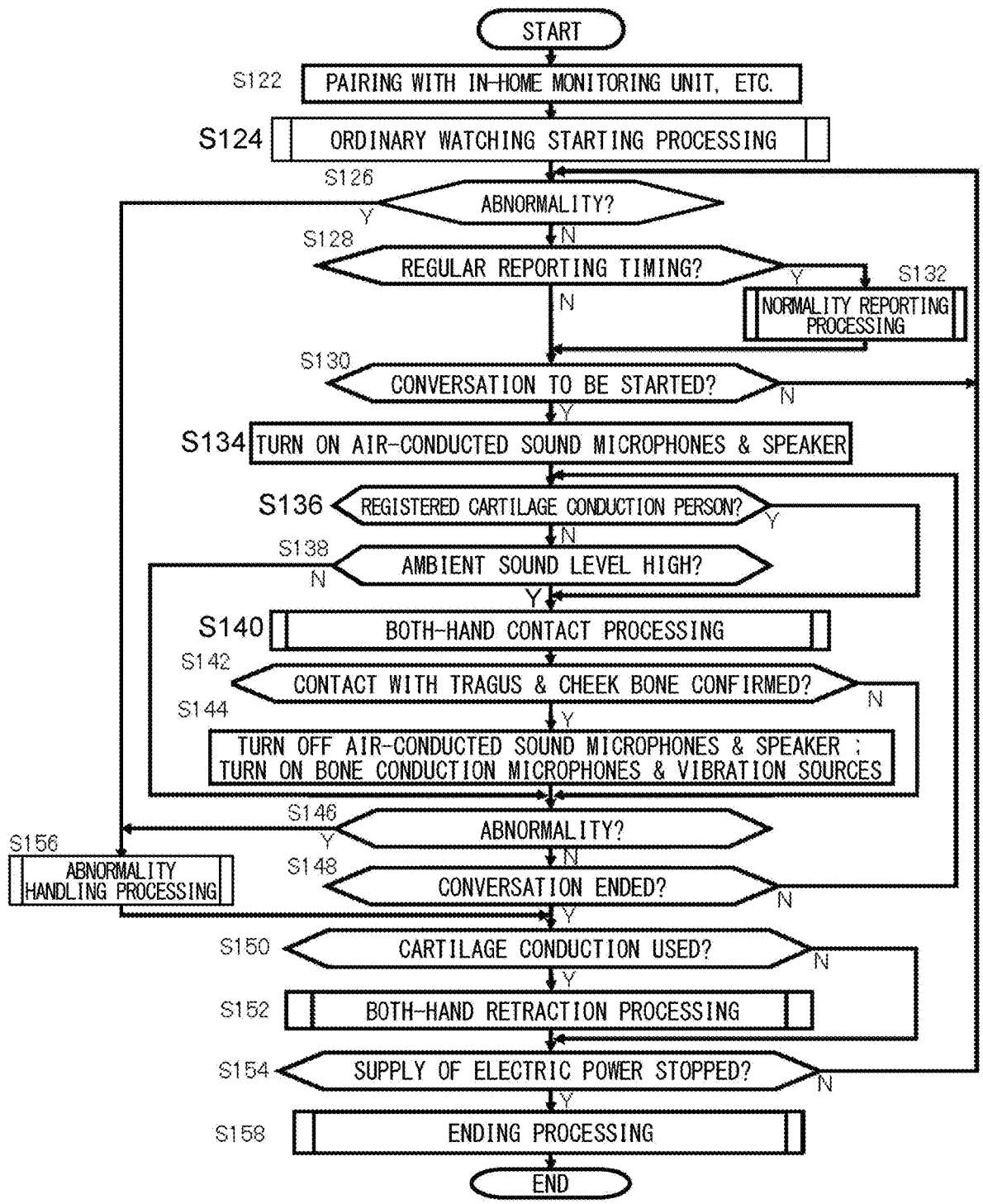
FIG. 11 is a flow chart showing functions of a control unit 240 in a robot of the third embodiment.

FIG. 11 is a flow chart showing the functions of the control unit 240 in the robot 206 of the third embodiment shown in FIG. 10. The flow starts when the supply of electric power from the power supply unit 248 is started by a main power switch of the robot 206. When the flow starts, in step S122, it is checked whether or not pairing for short-range communication with the in-home monitoring unit 8 and the mobile phone 10 (see FIG. 1) of the watching-target person 201 is set, and when no paring is set, paring is set automatically. Next, in step S124, processing for starting an ordinary watching function is performed. The ordinary watching function is basically based on the watching function in the first or second embodiment described with reference to FIGS. 1 to 8; in the case of the third embodiment, the stereo external air-conducted sound microphones 246 and the 3D camera 238 function as watching sensors.

Next, in step S126, it is checked whether or not there is an abnormality, and if there is no abnormality, an advance is made to step S128, where it is checked whether or not now is a timing for regular reporting. If now is not a timing for regular reporting, an advance is made to step S130. On the other hand, if, in step S128, it is confirmed that now is a timing for regular reporting, an advance is made to step S132, where normality reporting processing is performed, and then an advance is made to step S130. The normality reporting processing here is similar to that in the first or second embodiment.

In step S130, it is judged whether or not to start conversation with the watching-target person 201. For example, when the watching-target person 201 meets the robot 206 after a while, as when the watching-target person 201 has come home from a day-care facility or the robot 206 has come back from repair, or when the watching-target person 201 moves toward the robot 206, or when the watching-target person 201 talks to the robot 206, or when the robot 206, having observed the watching-target person 201, chooses to spontaneously talk to him, or the like can be a case where a determination that "conversation should be started" is made.

If, in step S130, a determination to start conversation is made, an advance is made to step S134, where, first, the stereo external air-conducted sound microphones 246 and the air-conducted sound speaker 223 are turned on in preparation for conversation by ordinary air-conducted sound. Next, in step S136, it is checked whether or not the watching-target person 201 is a registered person with whom to conduct conversation by cartilage conduction. Such registration can be performed beforehand in a case where the watching-target person 201 has impaired hearing due to advanced age or the like or by preference of the watching-target person 201 himself. If, in step S136, it cannot be confirmed that the watching-target person 201 is a registered person for cartilage conduction, an advance is made to step S138, where it is checked whether or not the ambient air-conducted sound level is equal to or higher than a predetermined level. In a watching environment, ordinary noise is unlikely to be present; however, in a case where a large number of people are chatting at different places in a room, the ambient air-conducted sound level may be equal to or higher than a predetermined level, making personal conversation between the robot 206 and the watching-target person 201 by air-conducted sound difficult. If, in step S138, it is judged that the ambient air-conducted sound level is equal to or higher than the predetermined level, an advance is made to step S140. On the other hand, if, in step S136, it is judged that the watching-target person 201 is a registered person with whom to conduct conversation by cartilage conduction, an advance is made directly to step S140.

In step S140, processing for bringing both hands of the robot 206 into contact with both ears of the watching-target person 201 for cartilage conduction is performed. This will be described in detail later. On completion of the both-hand contact processing in step S140, an advance is made to step S142, where it is confirmed whether or not the middle fingers 213*a* and 213*b* of both hands of the robot 206 are in contact with the tragi of both ears of the watching-target person 201 and whether or not the thumbs 221*a* and 221*b* of both hands are in contact with both cheek bones of the watching-target person 201. When it is so confirmed, an advance is made to step S144, where the stereo external air-conducted sound microphones 246 and the air-conducted sound speaker 223 are turned off, and the bone conduction microphones 244*a* and 244*b* and the cartilage conduction vibration sources 242*a* and 242*b* are all turned on; then an advance is made to step S146. In this way, conversation by air-conducted sound is switched to conversation by cartilage conduction and the bone conduction microphones.

On the other hand, if, in step S142, no contact with the tragi and the cheek bones as mentioned above is confirmed, an advance is made directly to step S146. As mentioned earlier, cartilage conduction is possible if only any part of the hands and fingers of the robot 206 is in contact with any part of the cartilage of the ears of the watching-target person 201. Thus, if such a state is confirmed in the both-hand contact processing in step S140, while the stereo external air-conducted sound microphones 246 and the air-conducted sound speaker 223 are kept on, the bone conduction microphones 244*a* and 244*b* and the cartilage conduction vibration sources 242*a* and 242*b* are all turned on. By contrast, if no contact between the hands of the robot 206 and the watching-target person 201 takes place in the both-hand contact processing in step S140, no processing for extending both hands of the robot 206 toward the watching-target person 201 is performed, nor are the bone conduction microphones 244*a* and 244*b* and the cartilage conduction vibration sources 242*a* and 242*b* turned on; thus, conversation with the stereo external air-conducted sound microphones 246 and the air-conducted sound speaker 223 is continued. The both-hand contact processing in step S140 will be described in detail later.

If, in step S138, it is not judged that the ambient air-conducted sound level is equal to or higher than the predetermined level, an advance is made directly to step S146. In this case, no processing for extending both hands of the robot 206 toward the watching-target person 201 is performed, but conversation with the stereo external air-conducted sound microphones 246 and the air-conducted sound speaker 223 is continued.

In step S146, it is checked whether or not there is an abnormality. This is to cope with an unexpected situation that may arise during the conversation started with no abnormality in step S126. At this stage, cartilage conduction by the hands of the robot 206 may already be underway, and thus the robot 206 comes to have increased sensor functions for watching. Specifically, while the bone conduction microphones 244*a* and 244*b* and the tactile sensors 231*a* and 231*b* contribute to abnormality detection, in case, for example, the watching-target person 201 falls, an abnormal load acts on the load detection sensors in the right and left joint mechanisms 227*a* and 227*b* via the hands holding the face; this, together with the image by the 3D camera 238, makes exact abnormality detection possible.

If, in step S146, no abnormality is detected, an advance is made to step S148, where it is checked whether or not conversation has ended. This check is done comprehensively based on a check of whether or not both sides have remained silent for a predetermined period or longer, an analysis of the contents of conversation, a check for presence of key words suggesting the end of conversation, and the like. If it is not judged that conversation has ended, a return is made to step S136 and thereafter, until it is judged that conversation has ended, steps S136 through S148 are repeated. Owing to this repetition, even while no cartilage conduction is being performed yet, when, in step S138, the ambient sound level becomes equal to or higher than the predetermined level, transition to cartilage conduction is possible. Transition from communication by air-conducted sound to communication by cartilage conduction is one-directional. That is, during the just-mentioned repetition, even when, in step S138, the ambient sound level becomes low, no function is available whereby once-started communication by cartilage conduction is switched back to communication by air-conducted sound. Accordingly, in the middle of a session of conversation, no frequent switching occurs between cartilage conduction communication and air-conducted sound communication. However, in case of an abnormality, leaving the hands of the robot 206 holding the face of the watching-target person 201 is dangerous, and this is dealt with by step S146 in the above-mentioned repetition. This will be described in detail later.

If, in step S148, it is judged that conversation has ended, an advance is made to step S150, where it is checked whether or not a cartilage conduction state is in effect. If a cartilage conduction state is in effect, an advance is made to step S152, where both hands of the robot 206 are retracted to release the face of the watching-target person 201, and an advance is made to step S154. On the other hand, if, in step S150, a cartilage conduction state is not detected, it means that conversation is proceeding by ordinary air-conducted sound, and the watching-target person 201 is not restrained; thus an advance is made directly to step S154.

Now, processing in case of an abnormality will be described. If, in step S126, an abnormal state is detected, an advance is made to step S156, where abnormality handling processing is performed, and an advance is made to step S150. The abnormality handling processing here basically is notifying processing similar to that in the first or second embodiment; however, since the third embodiment is configured as a robot 206, in accordance with the condition of the watching-target person 201 as grasped by the robot 206, if possible and if the degree of urgency exceeds the risk, a previously programmed emergency treatment is performed. Also if, in step S146, an abnormality is detected during conversation, an advance is made to step S156, where abnormality handling processing is performed, and an advance is made to step S150. What is important here is that, as mentioned above, in case some abnormal state occurs while conversation is proceeding by cartilage conduction, leaving the hands of the robot 206 holding the face of the watching-target person 201 is dangerous. Here, if, in step S146, an abnormality is detected, then even if it is not judged that conversation has ended, the repetition loop from steps S136 through S148 is exited, and an advance is made, through the abnormality handling processing in step S156, to step S150. Then if, in step S150, it is confirmed that a cartilage conduction state has been in effect, an advance is made to step S152, where both hands of the robot 206 are retracted to release the face of the watching-target person 201.

In step S154, it is checked whether or not, as a result of the main power switch of the robot 206 being turned off or as a result of the rechargeable battery in the power supply unit 248 being depleted, the supply of electric power to the robot 206 has stopped. If it is not confirmed that the supply of electric power has stopped, a return is made to step S126. If, in step S130, it is not detected that conversation has started, a return is made directly to step S126. Thereafter, until, in step S154, it is confirmed that the supply of electric power has stopped, steps S126 to S154 are repeated to cope with various changes in the condition of the robot 206. On the other hand, if, in step S154, it is confirmed that the supply of electric power has stopped, an advance is made to step S158, where predetermined ending processing is performed, and then the flow ends. The ending processing here includes, as a fail-safe measure, a function whereby, in case both hands of the robot 206 remain in contact with the face of the watching-target person, they are retracted.

Figure 12:
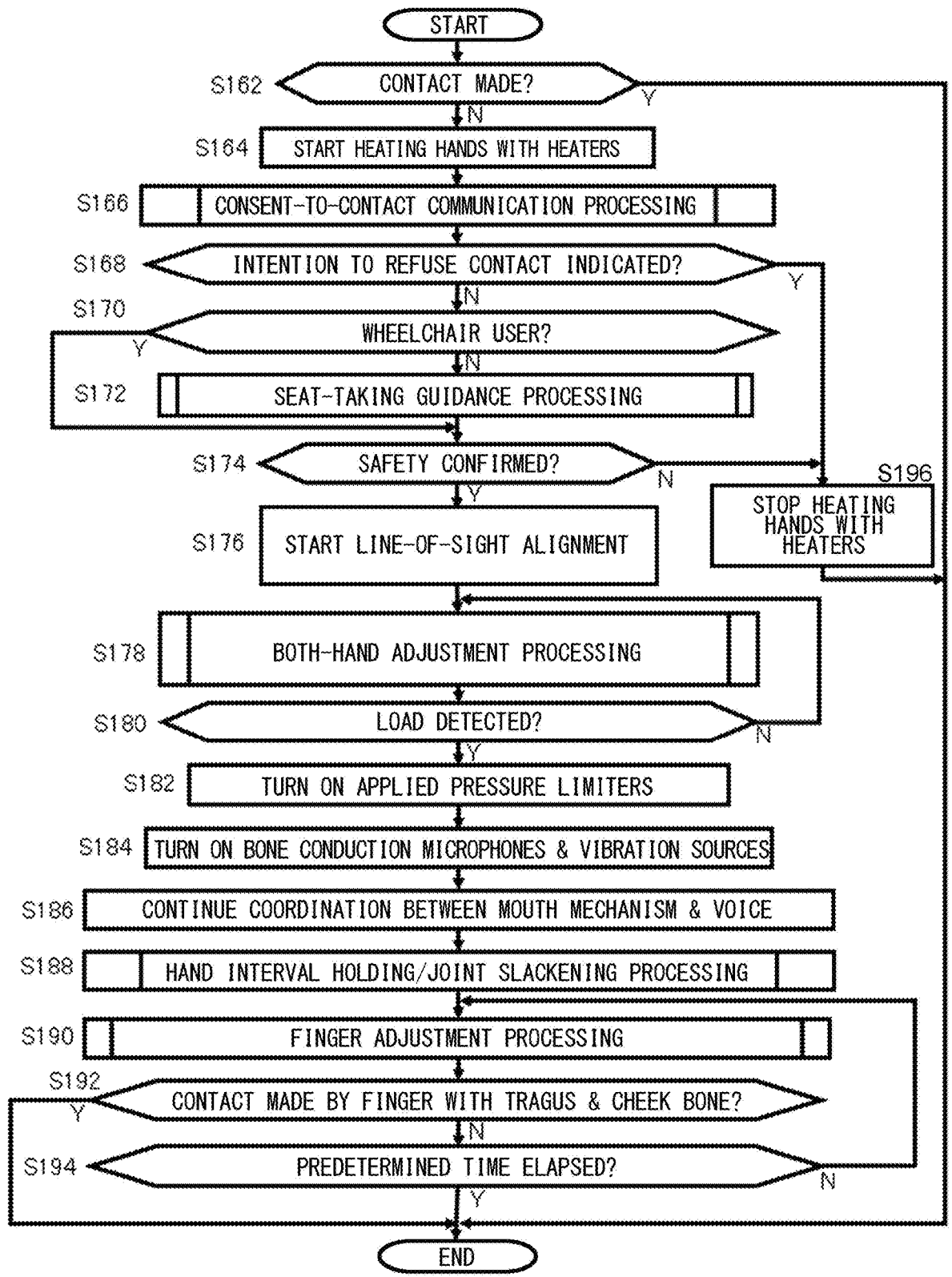
FIG. 12 is a flow chart showing details of step S140 in FIG. 11.

FIG. 12 is a flow chart showing the details of the both-hand contact processing in step S140 in FIG. 11. When the flow starts, in step S162, it is checked whether or not step S140 has already been performed so that the hands are already in contact with the watching-target person 201. If it is detected that contact has already been made, the flow ends immediately; this means that nothing is performed in step S140. This is a result equivalent to that reached when, in the flow in FIG. 11, as a result of, in step S138, it being detected that the ambient sound level is higher than the predetermined level, nothing is performed in steps S140 through S144 and thus, virtually, step S146 is reached directed. In this way, once, as a result of step S140 being performed, contact by the hands with the watching-target person 201 is achieved in some way, it is thereafter possible to avoid, in the middle of conversation, step S140 being repeated to change the state and to persistently repeat the same processing.

On the other hand, if, in step S162, contact by the hands of the robot 206 is confirmed, an advance is made to step S164, where rapid heating of the hands to human body temperature by the heaters 225a and 225b is started, and an advance is made to step S166. In step S166, consent-to-contact communication processing is performed. In general, physical contact (in this case, with the robot 206 as a partner) is comfortable to one who is willing to accept it, but can be very annoying in some cases. Accordingly, the robot 206, even if step S140 is reached after the checks in steps S130 through S138 have been gone through, does not act unilaterally but, respecting the intention of the watching-target person 201, ask for consent to contact in step S166 in FIG. 12. The communication performed in step S166 at that time is not limited to a direct inquiry by speech only such as "may I touch your face?" but may instead be, for example, a gesture involving, as if about to give a hug, first spreading the arms and then shifting, in such a way as not to surprise the target, into a movement of gently holding the face. Such a movement may be accompanied with suggestive words such as "shall we chat in peace?" to attempt comprehensive communication. While such an approach is being made, the target's behavior is observed with the 3D camera 238 and the stereo external air-conducted sound microphones 246, and an advance is made to step S168.

In step S168, it is checked whether or not there is an indication of intention of the watching-target person 201 with a refusing phrase, or with a refusing movement such as turning his head away, from the watching-target person 201, and if it is judged that there is no indication of intention to refuse contact, an advance is made to step S170. In step S170, it is checked whether or not the watching-target person 201 uses a wheelchair. This is because, with a wheelchair user, the position of the face is comparatively stable, and applying a contact pressure with the hands of the robot 206 is unlikely to lead to a danger such as a fall. If, in step S170, it is not confirmed that the watching-target person 201 is a wheelchair user, an advance is made to seat-taking guidance processing in step S172. This processing involves checking whether or not there is a chair and where it is located, making an announcement to recommend the watching-target person 201 to take a seat and guiding him to a chair, confirming whether or not he has taken the seat, etc. Next, in step S174, a final check is done to see whether or not bringing the hands into contact with the face of the watching-target person 201 is dangerous. This check should best be done by confirming whether or not the watching-target person 201 has taken a seat, but, even when he is standing, may instead be done by confirming, through the seat-taking guidance processing, that the watching-target person 201 shows no weakness in the legs and thus applying a certain pressure to his face is unlikely to lead to a risk of a fall.

When, in step S174, safety is confirmed, an advance is made to step S176, where line-of-sight alignment is started whereby the direction in which both hands are extended toward the face is aligned with the direction of the line of sight, and an advance is made to step S178. In step S78, both-hand adjustment processing is performed whereby, to hold the face in both hands, based on information from the 3D camera 238, the right and left joint mechanisms 227a and 227b are driven, and an advance is made to step S180. In step S180, it is checked whether or not the load resulting from both hands making contact with the face is detected by the load detection sensors in the right and left joint mechanisms 227a and 227b. If no load is detected, a return is made to step S178, so that, until both hands make contact with the face, steps S178 and S180 are repeated. When, in step S180, a load is detected, an advance is made to step S182, where the applied pressure limiters are turned on to start to limit the pressure with which the face of the watching-target person 201 is held such that it is not excessive.

In this state, it is possible to recognize which parts of both hands (including fingers) of the robot 206 are in contact with the cartilage of both ears of the watching-target person 201; thus, an advance is made to step S184, where the bone conduction microphones 244a and 244b and the cartilage conduction vibration sources 242a and 242b are turned on, and then an advance is made to step S186. In this state, the air-conducted sound speaker 223 and the bone conduction microphones 244a and 244b in an on state are used together. Moreover, in step S186, in a similar manner as when speech is uttered from the air-conducted sound speaker 223 alone, synchronization is continued so that the mouth mechanism 209 moves in coordination with the voice by the vibration of the cartilage conduction vibration sources 242a and 242b.

The synchronization in step S186 is continued even after, in step S144 in FIG. 12, the air-conducted sound speaker 223 is turned off Next, in step S188, hand interval holding/joint slackening processing is started. This is processing whereby the right and left joint mechanisms 227a and 227b are controlled so as to follow, so to speak, in a slackened state such that, as mentioned earlier, both hand move translatorily while keeping the relative distance between them such that they follow, with no resistance, free movement of the face of the watching-target person 201. This processing is continued even after the flow exits step S188.

Furthermore, in step S190, processing is started whereby, while the curves of the left and right middle fingers 213a and 231b are fine-tuned, the finger tips are brought into contact with the tragi of the watching-target person 201 and, while the curves of the left and right thumbs 221a and 221b are fine-tuned, they are brought into contact with the cheek bones of the watching-target person 201. Next, in step S192, it is checked whether or not, as a result of the just-mentioned processing, the left and right middle fingers 213a and 231b are in contact with the tragi and the left and right thumbs 221a and 221b are in contact with the cheek bones, and if contact is not confirmed, an advance is made to step S194. In step S194, it is checked whether or not a predetermined time has elapsed since step S190 was started, and if the predetermined time has not elapsed, a return is made to step S190. Thereafter, steps S190 through S194 are repeated. During this repetition, if, in step S192, contact with the tragi and the cheek bones is confirmed, the flow ends, and a jump is made to step S142 in FIG. 11. In this case, as mentioned earlier, an advance is made from step S142 to step S144, and thus the stereo external air-conducted sound microphones 246 and the air-conducted sound speaker 223 are turned off. On the other hand, also if, in step S194, it is confirmed that the predetermined time has elapsed, the flow ends, and a jump is made to step S142 in FIG. 11. In this case, step S144 in FIG. 11 is skipped, and while the stereo external air-conducted sound microphones 246 and the air-conducted sound speaker 223 in an on state is kept being used together, a jump is made to step S146.

On the other hand, if, in step S168, it is judged that there is even a slight indication of intention to refuse contact, an advance is made to step S196, where the heating of the hands to human body temperature by the heaters 225a and 225b is stopped, and the flow ends. Likewise, also if, in step S174, safety is not confirmed, an advance is made to step S196, where the heating of the hands to human body temperature by the heaters 225a and 225b is stopped, and the flow ends. In either case, no cartilage conduction by contact between the hands of the robot 206 and the watching-target person 201 is performed, and communication by air-conducted sound is continued.

The various features of the embodiments described above can be implemented not only in those specific embodiments but also in any other embodiment so long as they provide their advantages. Moreover, the various features of the embodiments can be implemented with various modifications. Modified features can be implemented in appropriate combinations with each other and with unmodified features.

For example, in the configuration of the robot of the third embodiment, bone conduction microphones are provided in thumbs and cartilage conduction vibration sources are provided in middle fingers. This, however, is not meant as any limitation; for example, cartilage conduction vibration source may be provided in forefingers. For another example, a plurality of cartilage conduction vibration sources may be provided respectively in a plurality of fingers of one hand. In the third embodiment, when cartilage conduction is started, the heating of the hands to human body temperature is started. Instead, the heaters may be kept on all the time to keep the hands of the robot at human body temperature so that, even when the robot touches the watching-target person for other purposes, it does not feel cold.

In the flow in FIG. 11, only if, in step S136, a registered person for cartilage conduction is confirmed or if, in step S138, the ambient sound level becomes high, the both-hand contact processing in step S140 is started. In addition to those cases, an interrupt may be issued based on a free indication of intention from the watching-target person 201 (for example, when an utterance of the watching-target person 201 wishing contact is confirmed by the stereo external air-conducted sound microphones 246, or when a movement of the watching-target person 201 wishing cartilage conduction is confirmed by the 3D camera 238, or when the watching-target person 201 himself takes a hand of the robot 206 and puts it to his ear) so that an advance is then made to step S140 in FIG. 11.

In the third embodiment, the hands of the robot are provided with tactile sensors for confirming contact of the finger tips with the tragi of the watching-target person. These sensors may be replaced with optical proximity sensors, or tactile sensors and optical proximity sensors may be used together.

Fourth Embodiment

Figure 13:
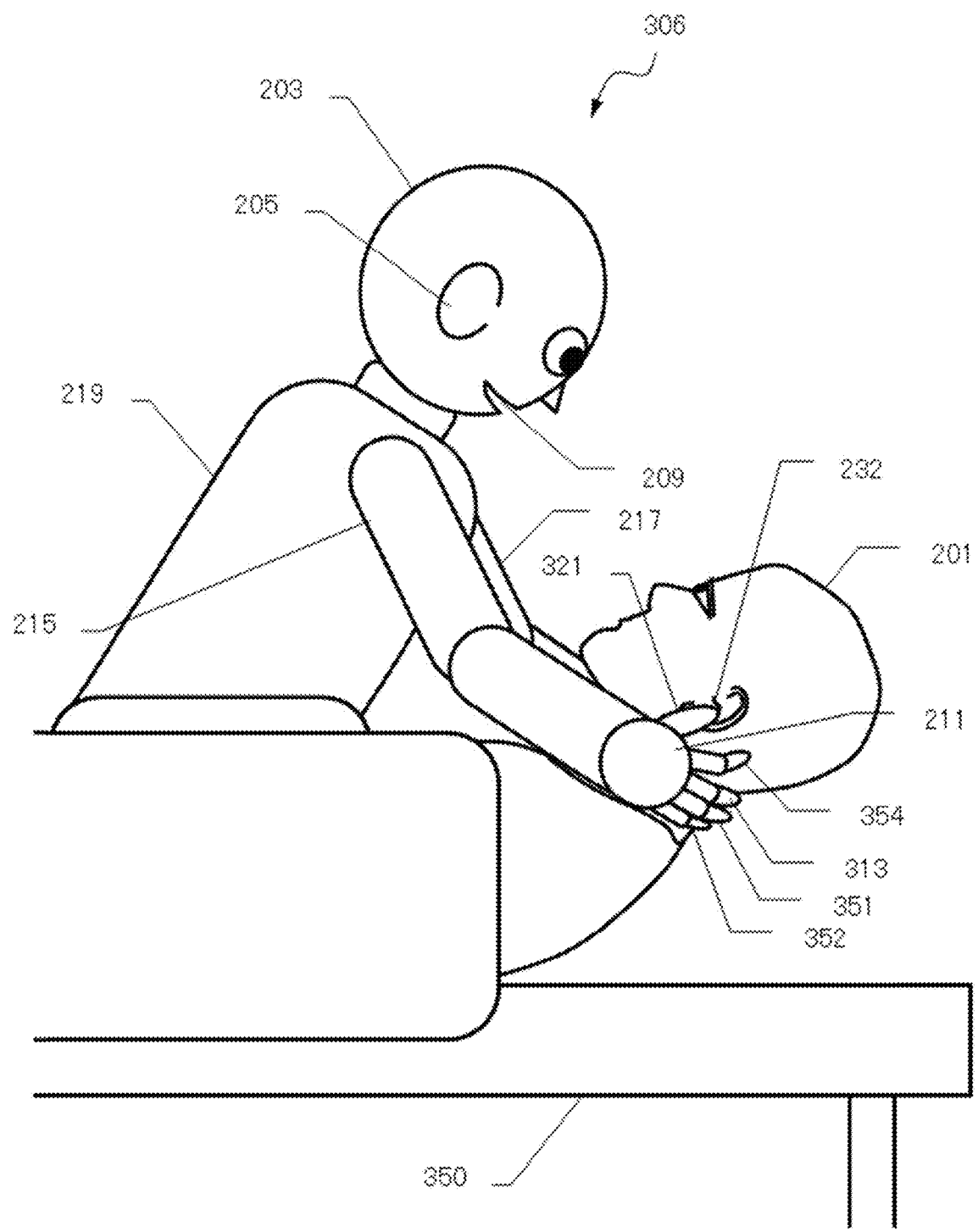
FIG. 13 is a diagram illustrating a system configuration of a fourth embodiment of the present invention (fourth embodiment)

FIG. 13 is a system configuration diagram of a fourth embodiment according to one aspect of the present invention. Like the third embodiment shown in FIGS. 9 to 12, the fourth embodiment is configured as a robot that can communicate with a human by cartilage conduction; as in the first embodiment, it constitutes a watching system for watching inside a home and, like the robot 206 of the second embodiment, is capable of humanly communication with a watching-target person 201. The fourth embodiment in FIG. 13 has much in common with the third embodiment, and accordingly, similar parts are identified by the same reference numerals, and no overlapping description will be repeated unless necessary.

The fourth embodiment shown in FIG. 13 differs from the third embodiment shown in FIG. 3 in the structure and control of the hands of the robot 306. As a result, as shown in FIG. 13, the robot 306 of the fourth embodiment can hold and raise a watching-target person 201 lying on a bed 350 and communicate with him by cartilage conduction. Like the robot 206 of the third embodiment, the robot 306 of the fourth embodiment can communicate also with a watching-target person 201 who can go about by himself Next, with reference to FIG. 13, the functions of the robot 306 related to communication with a lying watching-target person 201 will be described in detail. In preparation for communication, as shown in FIG. 13, the robot 306 holds and raises the watching-target person 201 a little with both hands so that he will face the face of the robot 306. This permits friendlier communication than if the robot 306 standing beside a bed 350 looks down at the watching-target person 201 with no physical contact.

The functions of different fingers in the state in FIG. 13 will be described. The middle fingers 313, the ring fingers 351, and the little fingers 352 put behind the back of the head and the neck of the watching-target person 201 chiefly support the weight of the upper body of the watching-target person 201. The thumbs 321 provided with cartilage conduction vibration sources make contact with the tragi 232 of the watching-target person 201, and conduct voice from the robot 306 by cartilage conduction. The forefingers 354 provided with bone conduction microphones make contact with the mastoid bones of the watching-target person 201, and collect the voice of the watching-target person 201 by bone conduction.

Figure 14:
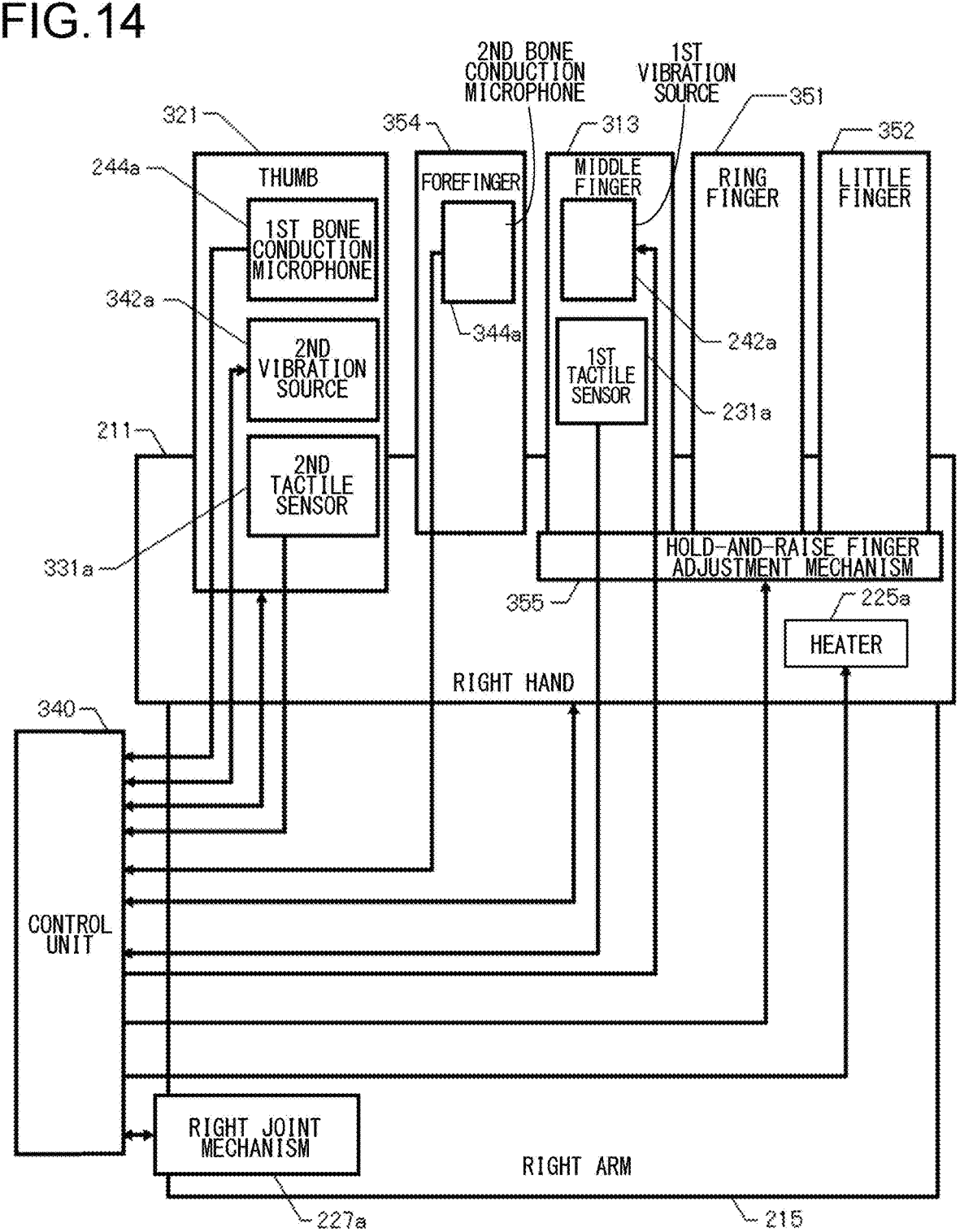
FIG. 14 is a block diagram of the fourth embodiment.

FIG. 14 is a block diagram of the robot 306 of the fourth embodiment of the present invention shown in FIG. 13. Such parts as appear also in FIG. 13 are identified by the same reference numerals, and no overlapping description will be repeated unless necessary. As mentioned above, the fourth embodiment has much in common with the third embodiment, and thus the configuration of the right hand 211, which differs from that in the third embodiment, is illustrated in relation to a control unit 340. For the other parts, FIG. 10, which is a block diagram of the third embodiment, and the corresponding description are to be referred to, and their illustration is omitted or simplified in FIG. 14. Even such parts as are illustrated in FIG. 14, if they appear also in FIG. 10, are identified by the same reference numerals, and no overlapping description will be repeated.

As will be clear from FIG. 14, the middle finger 313 of the right hand 211 of the robot 306 is provided with a first cartilage conduction vibration source 242a and a first tactile sensor 231a. On the other hand, the thumb 321 of the right hand 211 of the robot 306 is provided with a first bone conduction microphone 244a, and this collects bone-conducted sound from the cheek bone or the like. The configuration thus far is the same as that of the cartilage conduction vibration source 242a, the tactile sensor 231a, and the bone conduction microphone 244a shown in FIG. 10, and these are used, as in the third embodiment, to communicate with a watching-target person 201 who can go about by himself Next, the configuration that functions when communicating with a watching-target person 201 lying as in FIG. 13 will be described. The thumb 321 is provided with a second cartilage conduction vibration source 342a, and this makes contact with the tragus 232 of the watching-target person 201 to conduct voice from the robot 306 by cartilage conduction. The thumb 321 is also provided with a second tactile sensor 331a which monitors the state of contact with the tragus 232 of the watching-target person 201 to achieve and maintain satisfactory cartilage conduction. On the other hand, the forefinger 354 is provided with a second bone conduction microphone 344a, and this makes contact with the mastoid bode of the watching-target person 201 to collect the voice of the watching-target person 201 by bone conduction. The second cartilage conduction vibration source 342a, the second tactile sensor 331a, and the second bone conduction microphone 344a just mentioned are switched with the first cartilage conduction vibration source 242a, the first tactile sensor 231a, and the first bone conduction microphone 244a mentioned previously so that either set functions at the time.

As shown in FIG. 14, between the middle, ring, and little fingers 313, 351, and 352 and the right hand 211, a hold-and-raise finger adjustment mechanism 355 is provided, and this supports those fingers such that, put behind the back of the head and the neck, they can support the weight of the upper body of the watching-target person 201. At this time, also the right joint mechanism 227a supports the right hand 211 and the right arm 215 so as to support the weight of the upper body of the watching-target person 201. However, to avoid excessive restraint on the head of the watching-target person 201, the right joint mechanism 227 controls such that, while the position in the vertical direction is maintained, movement is possible in the horizontal direction so as to follow, with no resistance, free movement of the head of the watching-target person 201. Also in the up-down direction, if the head of the watching-target person 201 exhibits a larger than predetermined movement, it is followed, with no resistance, to comfortably support the weight of the upper body of the watching-target person 201.

With the configuration described above, in the fourth embodiment, as shown in FIG. 13, a watching-target person 201 lying on a bed 350 can be held and raised naturally and communication can be conducted by cartilage conduction in a friendlier, comfortable state.

Figure 15:
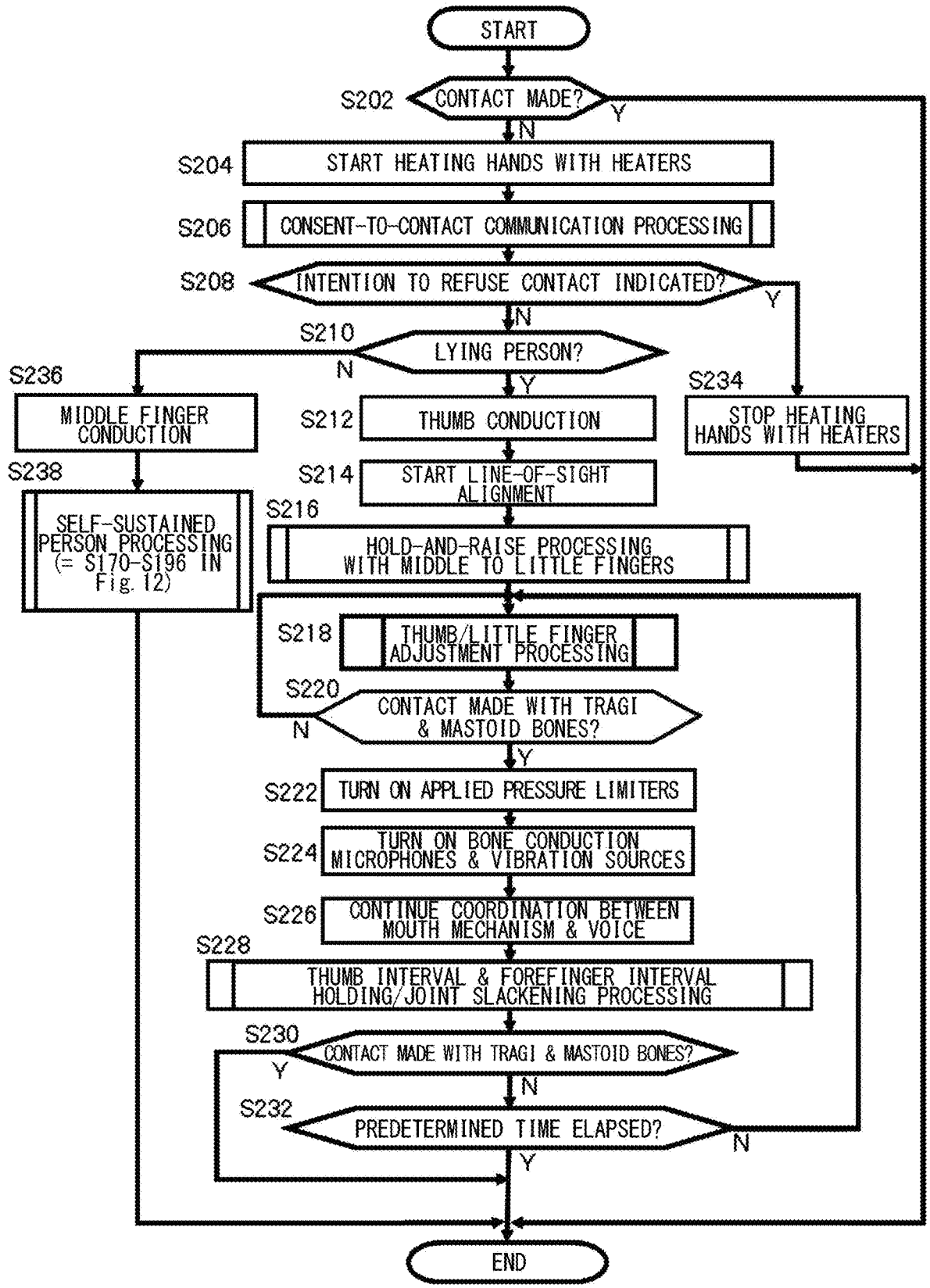
FIG. 15 is a flow chart showing part of functions of a control unit in the fourth embodiment.

FIG. 15 is a flow chart showing part of the functions of the control unit 340 in the robot 306 of the fourth embodiment shown in FIG. 14. As mentioned above, the fourth embodiment has much in common with the third embodiment, and thus for a flow chart showing the functions of the entire control unit 340, the one in FIG. 11 directed to the third embodiment is to be referred to. In other words, the flow chart in FIG. 15 will be described as showing the details of the both-hand contact processing in step S140 in the flow chart in FIG. 11. When the flow chart in FIG. 11 is referred to as being directed to the fourth embodiment, in the both-hand retraction processing in step S152, before the face of the watching-target person 201 is released, processing is performed whereby the head of the watching-target person 201 is put back on the bed 350 slowly. Also similar to the third embodiment is that, when the both-hand retraction processing in step S152 ends, the heating of the hands by the heaters 225a is stopped.

The flow in FIG. 15 starts when the flow in FIG. 11 reaches step S140. In step S202, it is checked whether or not step S140 has already been performed so that the hands of the robot 306 are already in contact with the watching-target person 201. If it is detected that contact has already been made, it is judged that cartilage conduction has already been achieved, and the flow ends immediately. In this case nothing is performed in step S140.

On the other hand, if, in step S202, contact by the hands of the robot 306 is not confirmed, an advance is made to step S204, where rapid heating of the hands to human body temperature by the heaters 225a and 225b is started, and an advance is made to step S206. In step S206, consent-to-contact communication processing is performed whereby, while the intention of the watching-target person 201 is respected, consent to contact for head-raising is prompted. The communication here is similar to that in the third embodiment. Then, with the 3D camera 238 and the stereo external air-conducted sound microphones 246, while a response from the other side is waited, his behavior is observed, and an advance is made to step S208.

In step S208, it is checked whether or not there is an indication of intention of the watching-target person 201 with a refusing phrase or a refusing movement from the watching-target person 201, and if it can be judged that there is no indication of intention to refuse contact, an advance is made to step S210. In step S210, it is checked whether or not the watching-target person 201 is a lying person. If, in step S210, it is confirmed that the watching-target person 201 is a lying person, the first cartilage conduction vibration source 242a, the first tactile sensor 231a, and the first bone conduction microphone 244a are brought into a disabled state, and the second cartilage conduction vibration source 342a, the second tactile sensor 331a, and the second bone conduction microphone 344a are brought into an enabled state.

Thus, switching to a state where cartilage conduction is performed by the thumb 321 is complete, and an advance is made to step S214.

In step S214, line-of-sight alignment is performed whereby the direction in which both hands are extended toward the face is aligned with the direction of the line of sight, and an advance is made to step S216. In step S216, based on information from the 3D camera 238, the right and left joint mechanisms 227a and 227b and the hold-and-raise finger adjustment mechanism 355 are driven, then processing is performed whereby the middle to little fingers 313 to 352 of the robot 306 are put behind the back of the head and the neck of the watching-target person 201 to hold and raise him, and an advance is made to step S218. In step S218, processing is performed whereby, in a held and raised state, the curves of the thumb 321 and the forefinger 354 are fine-tuned according to information from the second tactile sensor 331a (as necessary, the first tactile sensor 231a is used together; the same applies in similar cases below) and the 3D camera 238 so that those fingers are brought into contact with the tragus and the mastoid bone respectively, and an advance is made to step S220. In step S220, based on information from the second tactile sensor 331a and the 3D camera 238, it is checked whether or not the above-mentioned contact has been achieved. If no contact is confirmed, a return is made to step S218, so that, until contact is confirmed, steps S218 and S220 are repeated. When, in step S220, contact is confirmed, an advance is made to step S222, where the applied pressure limiters are turned on to start to limit the pressure with which the face of the watching-target person 201 is held on the thumbs 321 and the forefingers 354 of both hands such that it is not excessive.

Subsequently, an advance is made to step S224, where the second bone conduction microphone 344a and the second cartilage conduction vibration source 342a are turned on, and an advance is made to step S226. In step S226, synchronization is performed such that the mouth mechanism 209 moves in coordination with the voice by the vibration of the second cartilage conduction vibration source 342a, and an advance is made to step S228.

In step S228, processing is performed whereby joints are slackened so that, while the distance between the thumbs of both hands and the distance between the forefingers of both hands are maintained, both hands can move translatorily in the horizontal direction. As mentioned earlier, this is processing for performing control such that, without the fingers of the robot 306 restraining the watching-target person 201, both hands follow, in a slackened state, free movement of the head. This processing is continued even after the flow exits the step S228.

When the processing in step S228 is started, an advance is made to step S230, where, based on information from the second tactile sensor 331a and the 3D camera 238, it is checked once again whether or not the thumb 321 and the forefinger 354 are in contact with the tragus and the mastoid bone respectively. If, in step S230, contact is confirmed once again, the flow ends. As a result, the flow jumps to step S142 in FIG. 11. On the other hand, if, in step S230, no contact is confirmed any longer, an advance is made to step S232. In step S232, it is checked whether or not a predetermined time has elapsed since step S218 was started, and if the predetermined time has not elapsed, a return is made to step S218. Thereafter, steps S218 through S232 are repeated. During this repetition, if, in step S230, contact of the fingers with the tragus and the mastoid bone is confirmed or if, in step S232, the lapse of the predetermined time is confirmed, the flow ends, and a jump is made to step S142 in FIG. 11. In a case where the target is a lying person, the processing in step S142 is to be read as "contact with tragus/mastoid bone confirmed?".

On the other hand, if, in step S208, it is judged that the watching-target person 201 shows even a slight indication of intention to refuse contact, an advance is made to step S234, where the heating of the hands to human body temperature by the heater 225a is stopped, and the flow ends. In this case, no cartilage conduction by contact of the hands of the robot 306 with the watching-target person 201 is performed, and communication by air-conducted sound is continued.

If, in step S210, it is not confirmed that the watching-target person 201 is a lying person, an advance is made to step S236, where the second cartilage conduction vibration source 342a, the second tactile sensor 331a, and the second bone conduction microphone 344a are brought into a disabled state, and the first cartilage conduction vibration source 242a, the first tactile sensor 231a, and the first bone conduction microphone 244a are brought into an enabled state. Thus, switching to a state where cartilage conduction is performed by the middle finger 313 is complete; thus, an advance is made to self-sustained person processing in step S238, and when the processing is complete, the flow ends. The self-sustained person processing in step S238 is the same as steps S170 through S196 in FIG. 12.

Fifth Embodiment

Figure 16:
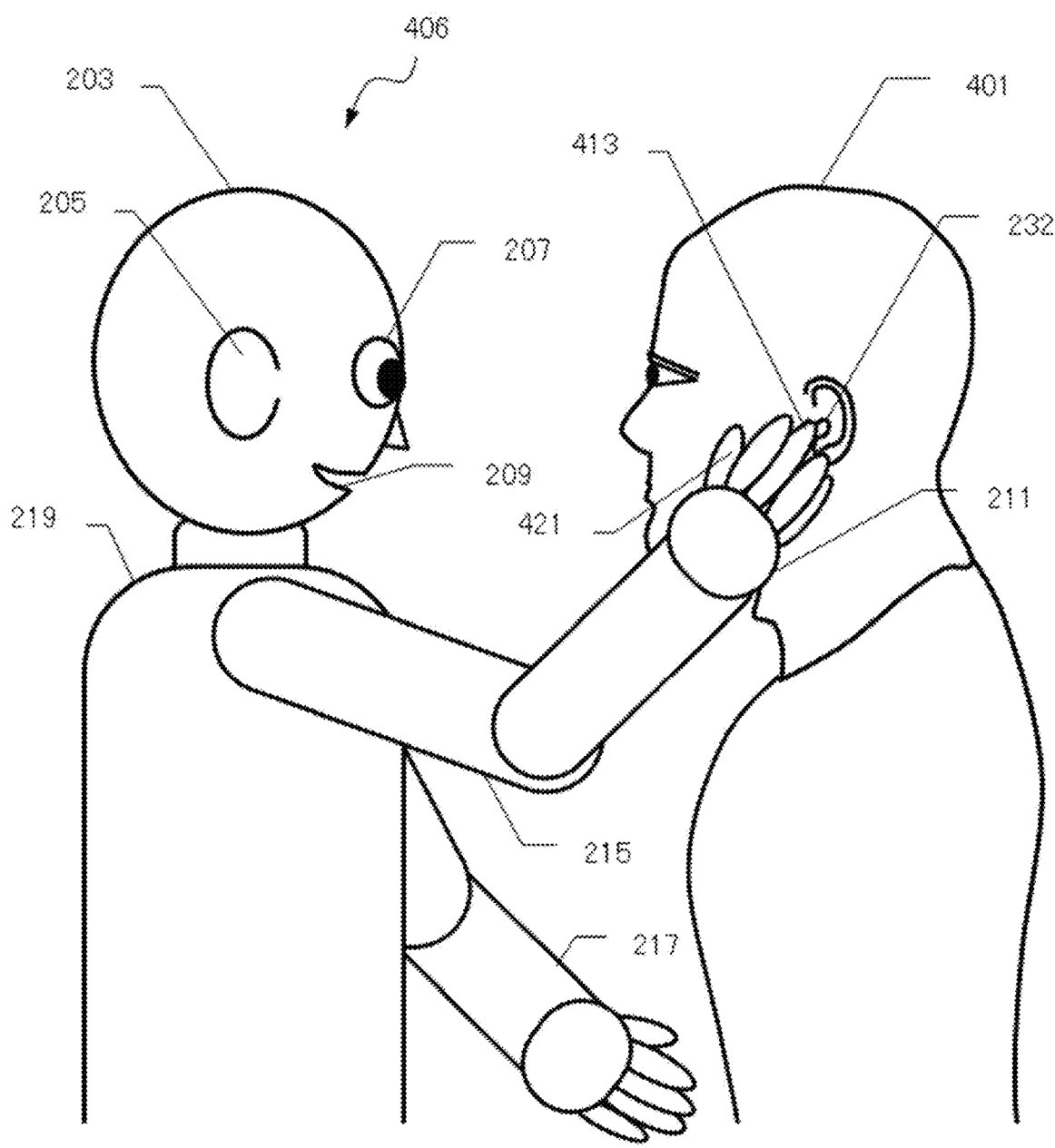
FIG. 16 is a diagram illustrating a system configuration of a fifth embodiment of the present invention (fifth embodiment)

FIG. 16 is a system configuration diagram of a fifth embodiment according to one aspect of the present invention. Like the third embodiment shown in FIGS. 9 to 12, the fifth embodiment is configured as a robot 406 that can communicate with a human by cartilage conduction. However, the robot 406 is configured as a customer handling system in a bank. It makes smooth communication with particular customers possible in a noisy environment in a bank visited by many customers, and provides a system that is useful also from the perspective of privacy protection. The fifth embodiment in FIG. 16 has much in common with the third embodiment; accordingly, similar parts are identified by the same reference numerals, and no overlapping description will be repeated unless necessary.

The fifth embodiment shown in FIG. 16 differs from the third embodiment shown in FIG. 9 in that the robot 406 can maintain satisfactory cartilage conduction even when it, by using one hand, makes contact with an ear of a customer, in that hygiene-related problems that may result from serial contact with many customers are coped with, and in that customers can be handled adroitly. As shown in FIG. 16, the robot 406, by using only the right hand 211, makes contact with the left ear of a customer 401. Specifically, as in the third embodiment in FIG. 9, the middle finger 413 makes contact with the tragus 232, and the thumb 421 makes contact with the cheek bone. (Likewise, it is also possible, by using only the left hand 229, to make contact with the right ear of the customer 401.) When the customer 401 moves his head, to maintain contact by following it, the finger is provided with an acceleration sensor. Moreover, for adroit communication with the customer 401, an IC tag reader is provided in a finger. These features will be described in detail later.

Figure 17:
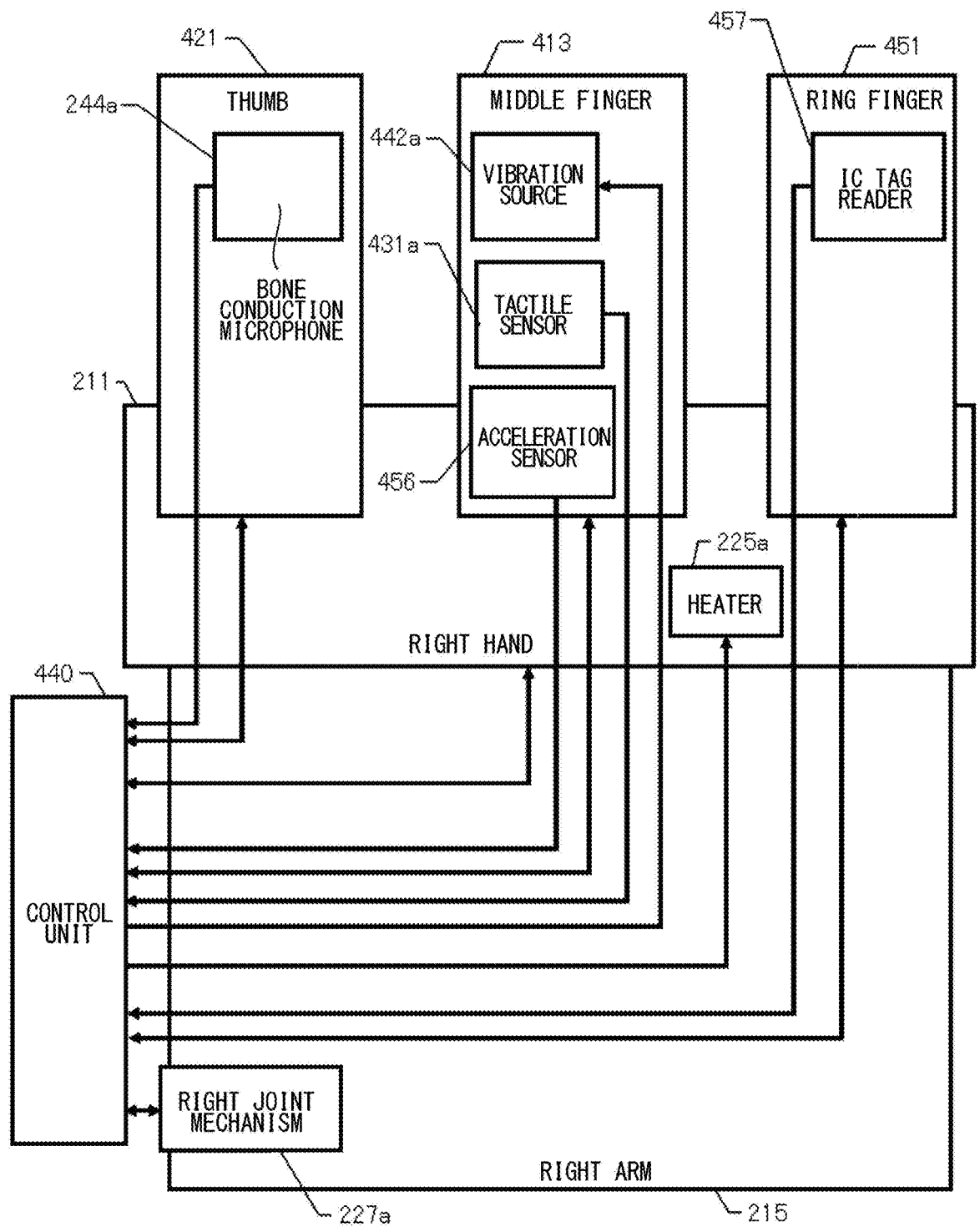
FIG. 17 is a block diagram of the fifth embodiment.

FIG. 17 is a block diagram of the robot 406 of the fifth embodiment of the present invention shown in FIG. 16. Such parts as appear also in FIG. 16 are identified by the same reference numerals, and no overlapping description will be repeated unless necessary. As mentioned above, the fifth embodiment has much in common with the third embodiment, and thus, as with the fourth embodiment, the configuration of the right hand 211, 93in the third embodiment, is illustrated in relation to a control unit 440. For the other parts, FIG. 10, which is a block diagram of the third embodiment, and the corresponding description are to be referred to, and their illustration is omitted or simplified in FIG. 17. Even such parts as are illustrated in FIG. 17, if common to FIG. 10, are identified by the same reference numerals, and no overlapping description will be repeated.

As will be clear from FIG. 17, the middle finger 413 of the right hand 211 of the robot 406 is provided with, in addition to a cartilage conduction vibration source 442a and a tactile sensor 431a, an acceleration sensor 456. The acceleration sensor 456 detects the acceleration of the middle finger 413 which is dragged by the movement of the head due to contact friction. Based comprehensively on information on the acceleration detected by the acceleration sensor 456, information on the change of the contact pressure detected by the tactile sensor 431a, and information on the movement of the head detected by the 3D camera 238, the control unit 440 determines the movement of the head. Based on the determination, the right joint mechanism 227 is driven so that the movement of the right hand 211 follows the movement of the head. In this way, even when the head of the customer 401 moves, the contact of the middle finger 413 with the tragus and the contact of the thumb 421 with the cheek bone are maintained.

As shown in FIG. 17, the ring finger 451 is provided with an IC tag reader 457.

This serves, when the right hand 211 of the robot 406 makes contact with an accessory (described later) distributed to the customer 401, to read the information of an IC tag provided in the accessory. In a case where, as in FIG. 16, the robot 406 makes direct contact with an ear of the customer 401, the IC tag reader 457 does not read customer information. The just-mentioned accessory and its significance will be described later.

Figure 18:
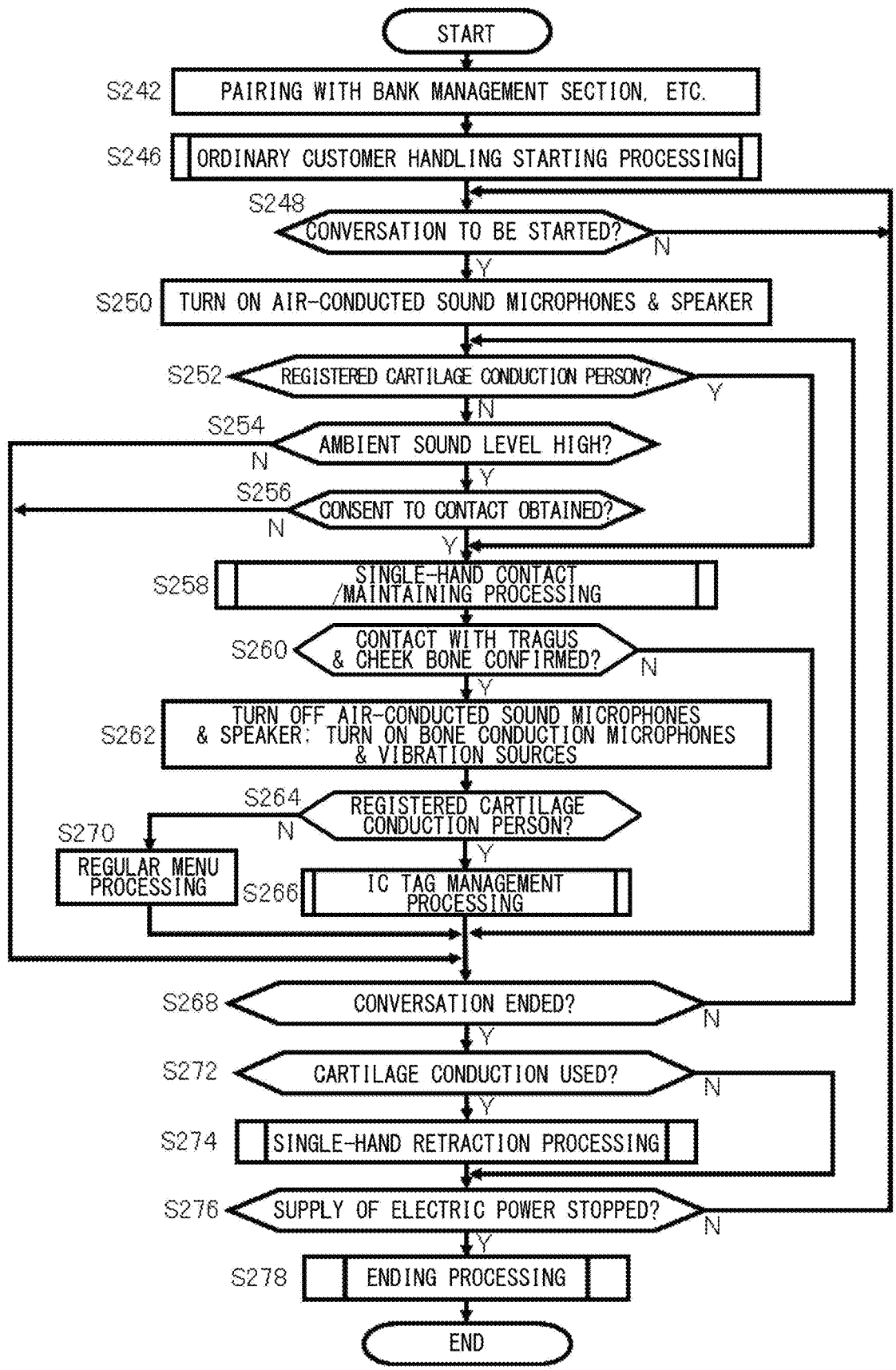
FIG. 18 is a flow chart showing functions of a control unit in the fifth embodiment.

FIG. 18 is a flow chart showing the functions of the control unit 440 in the robot 406 of the fifth embodiment in FIG. 17. The flow starts when the supply of electric power is started by a main power switch of the robot 406. When the flow starts, in step S242, it is checked whether or not pairing for short-range communication with a bank management section is set, and when no paring is set, paring is set automatically. Next, in step S247, processing for starting an ordinary customer handling function is performed. The ordinary customer handling function is a function whereby, in a bank, the robot 406 handles a customer 401 by conducting conversation with the customer 401 by ordinary air-conducted sound.

Next, in step S248, it is judged whether or not the situation is one in which to start conversation with the customer 401. If, in step S248, it is judged that conversation should be started, an advance is made to step S250, where, first, the stereo external air-conducted sound microphones 246 and the air-conducted sound speaker 223 (see FIG. 10) are turned on in preparation for conversation by ordinary air-conducted sound. Next, in step S252, it is checked whether or not the customer 401 is a registered person (described later) with whom to conduct conversation by cartilage conduction. If, in step S252, it cannot be confirmed that the customer 401 is a person registered for cartilage conduction, an advance is made to step S254, where it is checked whether or not the ambient air-conducted sound level is equal to or higher than a predetermined level. The purpose of this step is to recognize a case where, as when the bank is crowded with customers, the ambient air-conducted sound level is equal to or higher than the predetermined level and personal conversation between the robot 406 and a given customer 401 is difficult. If, in step S254, the ambient air-conducted sound level is equal to or higher than the predetermined level, an advance is made to step S256. In step S256, it is checked whether or not the customer 401 consents to the robot 406 making contact with his ear for cartilage conduction. If consent is confirmed, an advance is made to step S258. On the other hand, if, in step S252, the customer 401 is judged to be a registered person, an advance is made directly to step S258.

In step S258, processing for bringing one hand of the robot 406 into contact with one ear of the customer 401 for cartilage conduction and then maintaining the contact is started. The details will be given later. When the single-hand contact processing in step S258 is started, an advance is made to step S260, where it is checked whether or not the middle finger 413 of the robot 406 is in contact with the tragus of the customer 401 and the thumb 421 is in contact with the cheek bone of the customer 401. When that is confirmed, an advance is made to step S262, where the stereo external air-conducted sound microphones 246 and the air-conducted sound speaker 223 (see FIG. 10) are turned off, and the bone conduction microphone 244a and the cartilage conduction vibration source 442a are turned on; then, an advance is made to step S264. In this way, conversation by air-conducted sound is switched to conversation by cartilage conduction and the bone conduction microphone 244a.

Next, in step S264, it is checked whether or not the customer 401 is a registered person (described later) with whom to conduct conversation by cartilage conduction, and if it is confirmed that he is a registered person, an advance is made to step S266, where IC tag management processing is performed, and an advance is made to step S268. What is performed in the IC tag management processing in step S266 will be described later. On the other hand, if, in step S264, it cannot be confirmed that the customer 401 is a registered person, an advance is made to step S270, where regular menu processing for a state (the state in FIG. 16) where a hand of the robot 406 makes direct contact with the customer 401 is performed, and an advance is made to step S268.

If, in step S260, no contact with the tragus or the cheek bone as mentioned above is confirmed, an advance is made directly to step S268. Also if, in step S254, it is not judged that the ambient air-conducted sound level is equal to or higher than the predetermined level or if, in step S256, no consent of the customer 401 to the robot 406 making contact with his ear for cartilage conduction is confirmed, an advance is made to step S268. In these cases, no processing for bringing one hand of the robot 406 to an ear of the customer 401 is performed, nor are the bone conduction microphone 244a and the cartilage conduction vibration source 442a turned on, but conversation by the stereo external air-conducted sound microphones 246 and the air-conducted sound speaker 223 is continued.

In step S268, it is checked whether or not conversation-based handling of the customer 401 by the robot 406 has ended. This check is done, as in the third embodiment, comprehensively based on a check of whether or not both sides have remained silent for a predetermined period or longer, an analysis of the contents of conversation, a check for presence of key words suggesting the end of conversation, and the like. If, in step S268, it is not judged that conversation has ended, a return is made to step S252, and thereafter, until it is judged that conversation-based customer handling has ended, steps S252 through S268 are repeated. Owing to this repetition, even while no cartilage conduction is being performed yet, when, for example, in step S254, the ambient sound level becomes equal to or higher than the predetermined level, transition to cartilage conduction is possible.

On the other hand, if, in step S268, it is judged that conversation-based customer handling has ended, an advance is made to step S272, where it is checked whether or not a cartilage conduction state is in effect. If a cartilage conduction state is in effect, an advance is made to step S274, where the one hand of the robot 406 is retracted, and an advance is made to step S276. At this time, as will be described later, if the customer 401 is, by using his own hand, putting the hand of the robot 406 to the ear, so that the hand of the customer 401 will not be pushed aside, while the load from the hand of the customer 401 is being monitored, until the customer 401 spontaneously removes his hand, a gentle retracting action is performed. On the other hand, if, in step S272, it is confirmed that a cartilage conduction state is not in effect, an advance is made directly to step S276.

In step S276, it is checked whether or not, as a result of the main power switch of the robot 406 being turned off or as a result of the rechargeable battery in the power supply unit 248 (see Fig. mobile phone 10) being depleted, the supply of electric power to the robot 206 has stopped. If it is not confirmed that the supply of electric power has stopped, a return is made to step S248. Thereafter, until, in step S276, it is confirmed that the supply of electric power has stopped, steps S248 through S276 are repeated to cope with various changes in the condition of the robot 406. On the other hand, if, in step S276, it is confirmed that the supply of electric power has stopped, the flow reaches step S278, where predetermined ending processing is performed, and then the flow ends. The ending processing here includes, as a fail-safe measure, a function whereby, in case one hand of the robot 406 remains extended toward the face of the customer 401, it is retracted. When it is retracted, in a similar manner as described in connection with step S274, safety measures are taken so that, for example, the hand of the customer 401 will not be pushed aside.

Figure 19:
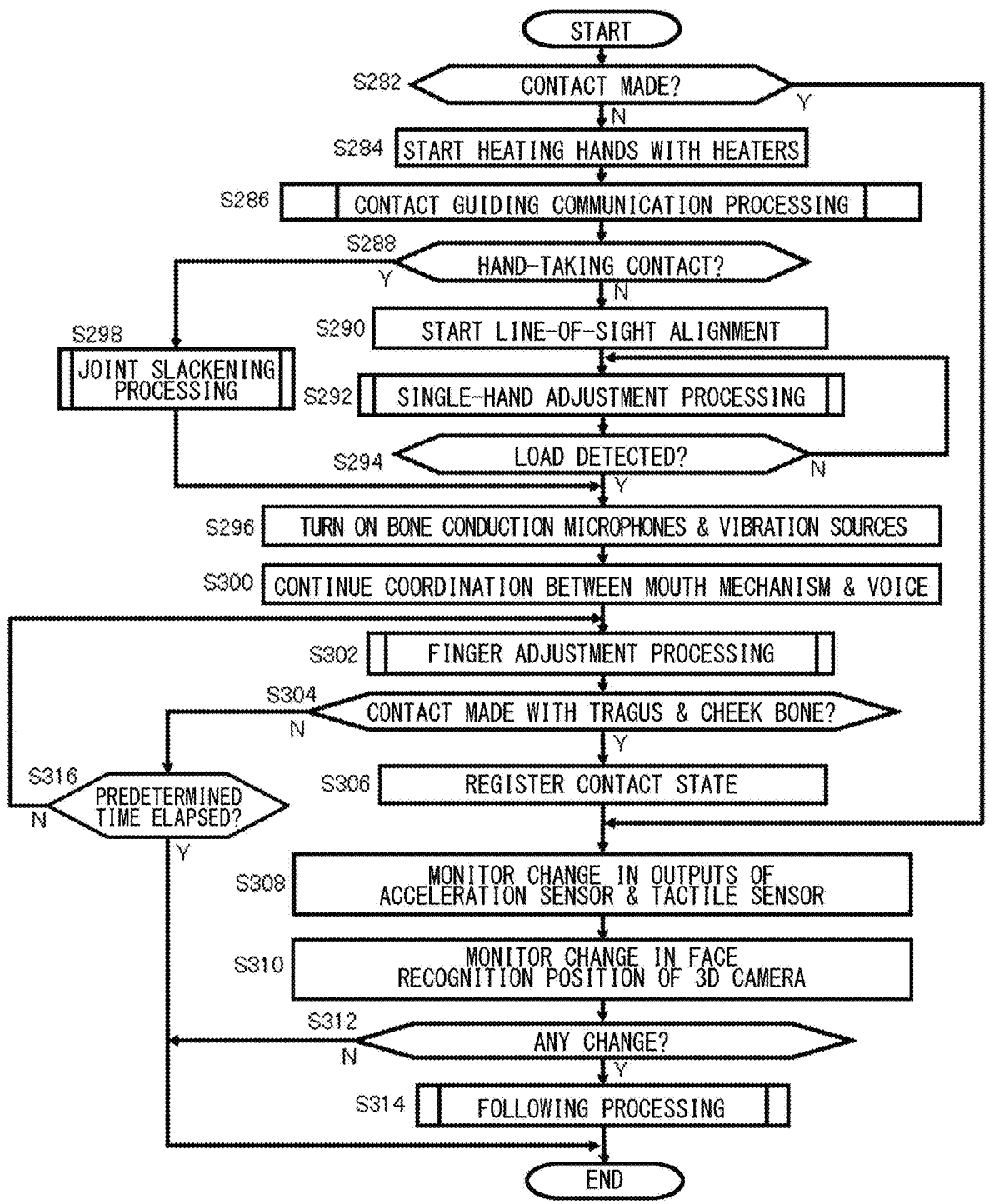
FIG. 19 is a flow chart showing details of step S258 in FIG. 18.

FIG. 19 is a flow chart showing the detains of the single-hand contact/maintaining processing in the step S258 in FIG. 18. When the flow starts, in step S282, it is checked whether or not a hand of the robot 406 is already in contact with the customer 401. If it is not detected that contact has already been made, an advance is made to step S284, where rapid heating of the hand to human body temperature by the heater 225a is started, and an advance is made to step S286. In step S286, contact guiding communication processing is performed. Guidance is given chiefly by air-conducted sound, but may be given visually by a display provided at the chest of the robot 406. The guidance basically comprises an explanation of cartilage conduction-based combination itself, but may include communication for introducing specific methods of contact and prompting a choice from them, the methods including one in which the customer 401 takes in his own hand a hand of the robot 406 and puts it to his ear and one in which the robot 406 extends a hand toward the face of the customer 401 and attempts contact. By way of such communication, an advance is made to step S288.

In step S288, it is checked whether or not the customer 401 has chosen a method in which the customer 401 takes in his own hand a hand of the robot 406 and puts it to his ear. This check is done based on not only a choice response from the customer 401 but also detection of the customer 401 having abruptly started an action of taking a hand of the robot 406 and putting it to his ear. If, in step S288, it is judged that the customer 401 has not chosen contact started by hand-taking, an advance is made to step S290, where line-of-sight alignment is started whereby the direction in which the robot 406 extends one hand toward the face of the customer 401 is aligned with the direction of the line of sight of the robot 406, and an advance is made to step S292.

In step S292, single-hand adjustment processing is performed whereby the right joint mechanism 227a (or the left joint mechanism 227b) is driven based on information from the 3D camera 238 so that one hand is extended automatically to bring a finger into contact with an ear of the customer 401, and an advance is made to step S294. In step S294, it is checked whether or not a load resulting from one hand making contact with the face is detected by the load detection sensor in the right joint mechanism 227a. If no load is detected, a return is made to step S292, and then, until one hand makes contact with the face, steps S292 and S294 are repeated. If, in step S294, a load is detected, the applied pressure limiter is turned on to start to limit the pressure with which the hand of the robot 406 pushes the face of the customer 401 from one side such that it is not excessive, and an advance is made to step S296. The applied pressure limiter prevents an accident such as one in which the robot 406 pushes down the customer 401 sideways.

On the other hand, if, in step S288, it is judged that the customer 401 has chosen a method in which the customer 401 takes in his own hand a hand of the robot 406 and puts it to his ear, an advance is made to joint slackening processing in step S298, where the hand of the robot 406 is left just to follow, without resistance, the movement of the hand of the customer 401. In this slackening processing, to prevent the load of the weight of the hand of the robot 406 from acting on the hand of the customer 401, the arm of the robot 406 is balanced in a gravity-free state the up-down direction and is supported on the trunk 219 (see FIG. 10) of the robot 406 to permit movement without resistance in the upward, downward, leftward, and rightward directions. If, in step S298, it is confirmed that, by the hand of the customer 401 himself, one hand of the robot 406 has been brought into contact with the face, an advance is made to step S296.

In step S296, the bone conduction microphone 244a and the cartilage conduction vibration source 442a are turned on, and an advance is made to step S300. In this state, the air-conducted sound speaker 223 (see FIG. 10) and the bone conduction microphone 244a in an on state are used together. In step S300, as in a case where speech is uttered only from the air-conducted sound speaker 223, synchronization is continued so that the mouth mechanism 209 (see FIG. 10) moves in coordination with the voice by the vibration of the cartilage conduction vibration source 442a. The synchronization in step S300 is continued even after the air-conducted sound speaker 223 is turned off in step S262 in FIG. 18.

Next, in step S302, finger adjustment processing is started. Started here is processing whereby, while the curve of the middle finger 413 is fine-tuned, the fingertip is brought into contact with the tragus of the customer 401 and, while the curve of the thumb 421 is fine-tuned, it is brought into contact with the cheek bone of the customer 401. Next, in step S304, it is checked whether or not, as a result of the just-mentioned processing, the middle finger 413 is in contact with the tragus and the thumb 421 is in contact with the cheek bone, and if contact is confirmed, an advance is made to step S306, where the normal contact state is registered as a pressure of the tactile sensor 431a and an image of the 3D camera 238 (FIG. 10). Then, an advance is made to step S308, where monitoring of changes in the outputs of the acceleration sensor 456 and the tactile sensor 431a is started. In step S310, monitoring of a face recognition position by the 3D camera 238 is started.

Then, in step S312, it is checked whether or not there is a change in the outputs of the acceleration sensor 456 and the tactile sensor 431a or a change in the face recognition position by the 3D camera 238. If there is any change, an advance is made to step S314, where following processing is performed whereby the hand of the robot 406 is made to follow the detected movement of the head, and the flow ends. In the processing here, as mentioned earlier, based on the acceleration, detected by the acceleration sensor 456, of the middle finger 413 which is dragged by the movement of the head due to contact friction and the change in contact pressure detected by the tactile sensor 431a (the pressure decreasing as the head moves in the direction away from the hand of the robot 406 and increasing as the head moves in the direction in which it pushes the hand of the robot 406) as well as information on the movement of the head detected by the 3D camera 238, the control unit 440 comprehensively determines the movement of the head, and makes the hand of the robot 406 follow in such a direction as to compensate for the movement, so that thereby, even when the head of the customer 401 moves, the contact of the middle finger 413 with the tragus and the contact of the thumb 421 with the cheek bone are maintained. If, in step S312, none of a change in the outputs of the acceleration sensor 456 and the tactile sensor 431a and a change in the face recognition position by the 3D camera 238 is detected, the head is considered to be at rest, and thus the flow ends immediately.

On the other hand, if, in step S304, no contact between the middle finger 413 and the tragus or between the thumb 421 and the cheek bone is confirmed, an advance is made to step S316, where it is checked whether or not a predetermined time has elapsed since step S302 was started. If the predetermined time has not elapsed, a return is made to step S302, and then, until, in step S304, contact is detected or, in step S316, the lapse of the predetermined time is detected, the loop of steps S302, S304, and S316 is repeated. If, in step S316, the lapse of the predetermined time is detected, the flow ends immediately. When, via any of these steps, the flow in FIG. 19 ends, a jump is made to step S260 in FIG. 18.

Figure 20A:
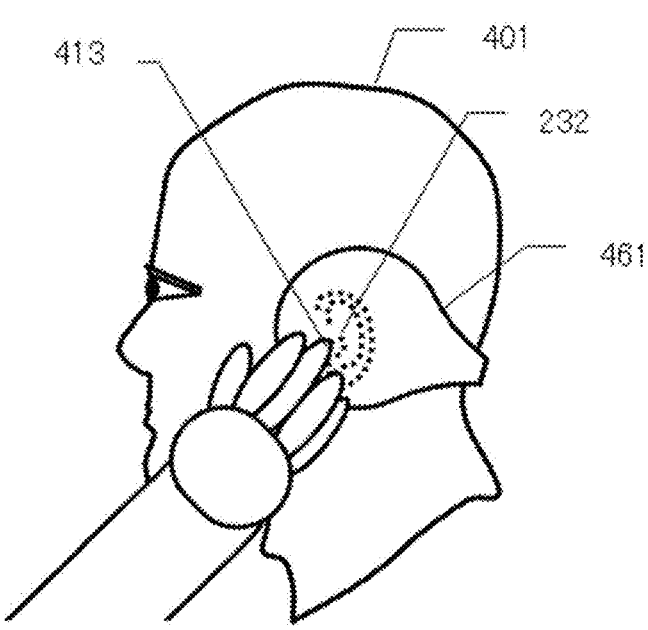
FIGS. 20A to 20D comprise side views showing contact via accessories in the fifth embodiment.

FIGS. 20A to 20D comprise side views showing how, in the fifth embodiment described with reference to FIGS. 16 to 19, the middle finger 413 of the robot 406 makes contact with the tragus 232 of the customer 401 via an accessory. The overall system is the same as in FIG. 16, and all parts except contact parts are omitted from illustration. In FIG. 20A, as an example of an accessory, an ear warmer 461 is worn on both ears. The tragus 232 hides beneath the ear warmer 461, and the middle finger 413 of the robot 406 is in indirect contact with the tragus 232 of the customer 401 via the ear warmer 461.

Figure 20B:
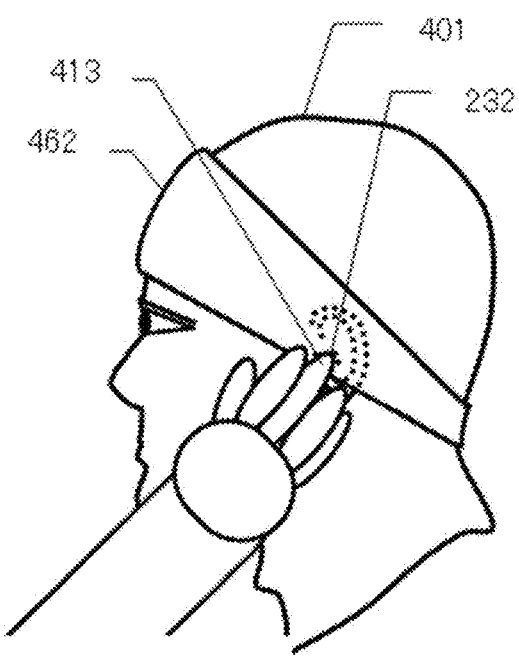
Figure 20C:
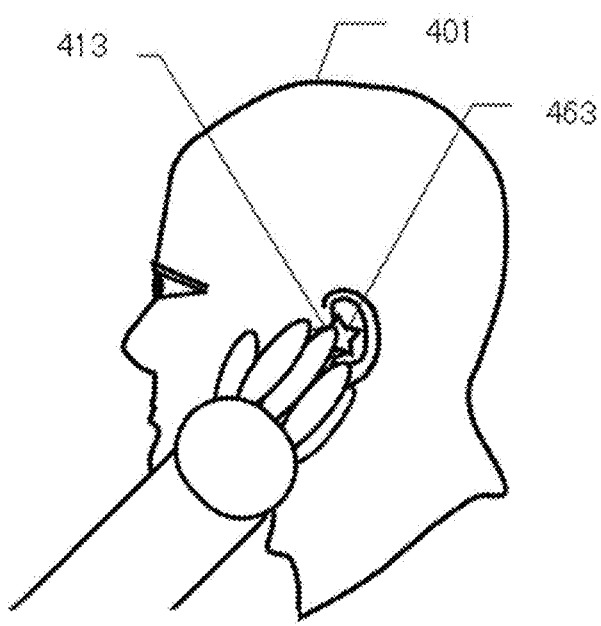
Figure 20D:
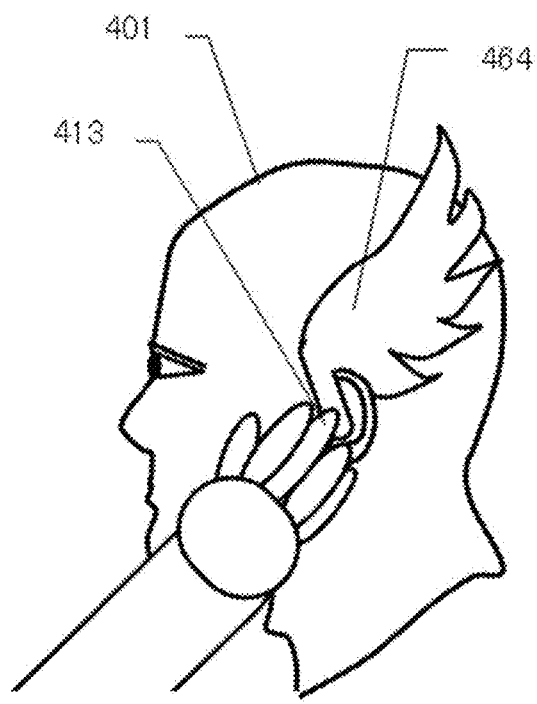

On the other hand, in FIG. 20B, as an example of an accessory, a headband 462 462 is worn around the head. The tragus 232 hides beneath the headband 462, and the middle finger 413 of the robot 406 is in indirect contact with the tragus 232 of the customer 401 via the headband 462. In FIG. 20C, as an example of an accessory, an ear cuff 463 is worn on the tragus. The middle finger 413 of the robot 406 is in indirect contact with the tragus of the customer 401 from over the ear cuff 463. In FIG. 20D, as an example of an accessory, an article of character merchandise 464 for kids is worn on the ear. The tragus hides beneath the article of character merchandise 464 for kids, and the middle finger 413 of the robot 406 is in indirect contact with the tragus of the customer 401 via the article of character merchandise 464 for kids. These accessories are distributed to customers 401 visiting a bank as presents in exchange for registering their individual information and consultation subjects. The accessories are provided with an IC tag, to which a customer ID is written in by the bank management section. The hand (for example, the ring finger 451) of the robot 406 is, as shown in FIG. 17, provided with an IC tag reader 457, so that, when the hand of the robot 406 comes close to the accessory, the ID of the customer 401 is read out.

The accessories shown in FIG. 20 have a significance also as a measure for good hygiene. A bank is visited by an unspecified number of customers, and the hand of the robot 406 touches the ears of a large number of customers. From the perspective of hygiene, some customers may be unwilling to be touched by the hand of the robot 406 which has touched no one knows whom. The accessories shown in FIG. 20, by covering the ear, prevent the hand of the robot 406 from directly touching the skin of a customer, and thereby meet the needs of such customers. Wearing an accessory has the advantage of permitting a customer 401 to be identified by the IC tag, and it is possible to handle different customers adroitly according to their consultation subjects registered beforehand. Thus, customers can enjoy being presented with accessories as well as good hygiene and appropriate customer handling, and this further heighten the incentive to visit a bank for contact with the robot 406.

Figure 21:
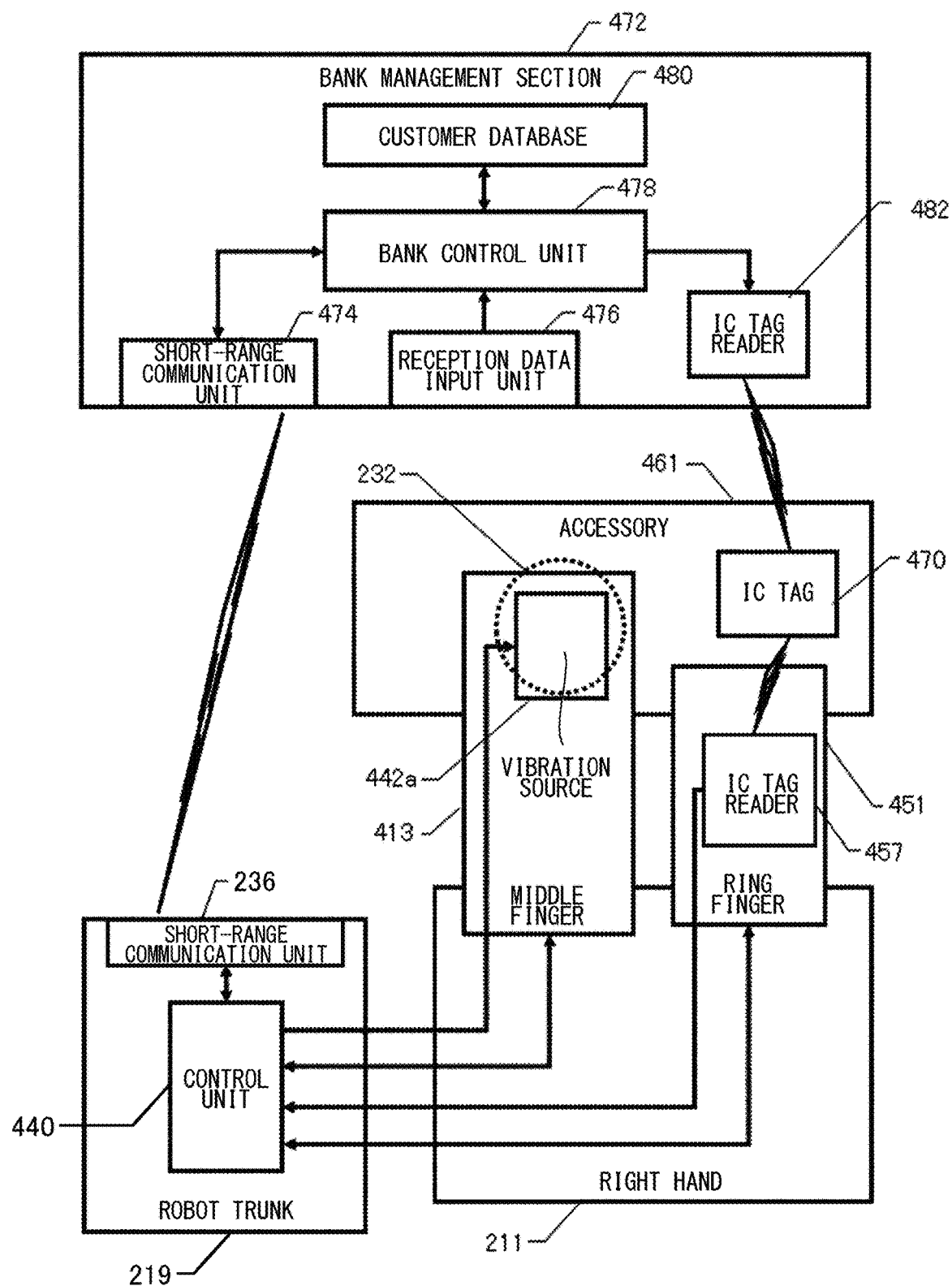
FIG. 21 is a system block diagram of an entire bank in the fifth embodiment.

FIG. 21 is a system block diagram of the entire bank in the fifth embodiment, and illustrates the parts related to the functions of the IC tag in an extracted fashion. Such parts as appear also in FIGS. 17 and 20 are identified by the same reference numerals, and no overlapping description will be repeated unless necessary.

In FIG. 21, the bank management section 472 handles a customer before the customer makes contact with the robot 406. By a reception data input unit 476 (a keyboard operated by a receptionist, or a bank card reader), the customer is identified, and information on his consultation subject is entered. A bank control unit 478 stores the thus entered information in a customer database 480, then writes in, with an IC tag reader 482, the customer ID to an accessory 461 (an ear warmer 461 is illustrated as a representative), and distributes the accessory 461 as a present to the received customer.

Next, when the customer 401 wearing the distributed accessory 461 as shown in

FIG. 20 makes contact with the robot 406, the IC tag reader 457 provided in the ring finger 451 reads out the customer ID written in to an IC tag 470 provided in the accessory 461, and transmits identification information of the customer 401 currently in contact from a short-range communication unit 236 to a short-range communication unit 474 of the bank management section 472. In this way, the bank management section 472 reads out information on the consultation subject of the corresponding customer 401 stored in the customer database 480, and replies from the short-range communication unit 474 to the short-range communication unit 236 of the robot 406. Thus, the robot 406 can communicate with a particular customer 401 according to a consultation subject registered beforehand. Communication is conducted by the vibration of the cartilage conduction vibration source 442a provided in the middle finger 413 of the robot 406 being conducted to the tragus 232 indirectly via the accessory 461, and by the speech of the customer 401 being picked up by the bone conduction microphone 244a.

Figure 22:
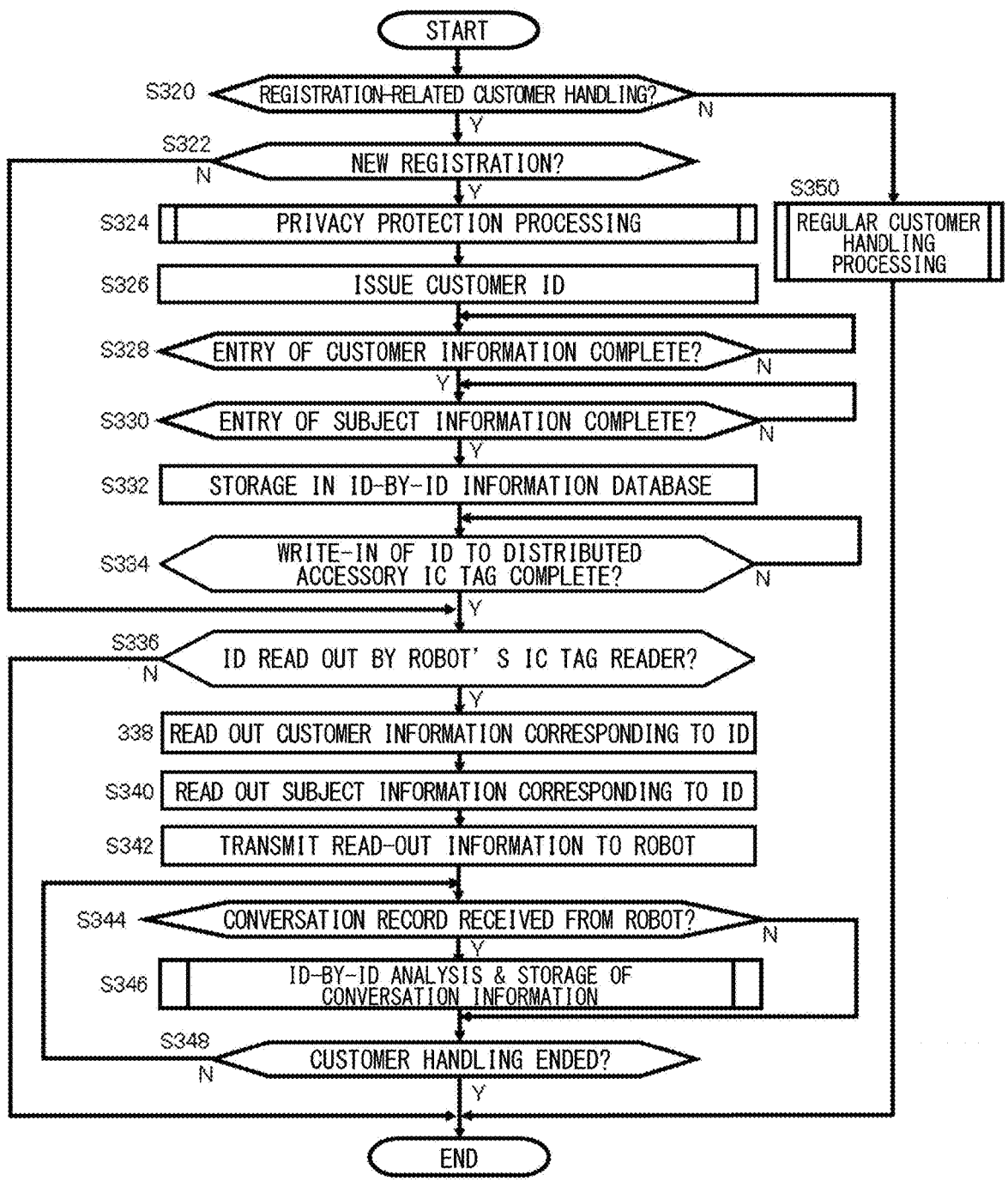
FIG. 22 is a flow chart showing functions of a bank control unit in FIG. 21.

FIG. 22 is a flow chart showing the functions of the bank control unit 478 in FIG. 21. The flow starts when the bank starts business on a given day, and in step S320, it is checked whether or not customer handling related to customer registration is requested. If there is a request, an advance is made to step S322, where it is checked whether or not the request is for new registration of a customer. If the request is for registration of a new customer, then, in step S324, mutual agreement processing as to privacy protection is performed, and an advance is made to step S326. In step S326, a customer ID is issued.

Next, in step S328, it is checked whether or not entry of customer information is complete, and if it is complete, then, in step S330, it is checked whether or not entry of the customer's subject information is complete. If this too is complete, an advance is made to step S332, where, for each ID issued, the customer information and the subject information are stored in the customer database 480, and an advance is made to step S334. In step S334, it is checked whether or not writing-in of the ID to an IC tag in the accessory to be distributed to the registered customer is complete, and when it is confirmed to be complete, an advance is made to step S336. At this time, the accessory is distributed to the customer. On the other hand, if, in step S322, no new registration is being request, it is judged that registration is complete and that an accessory has been distributed, and an advance is made directly to step S336.

In step S336, it is checked whether or not the robot 406 has read out, with the IC tag reader 457, the customer ID of the customer 401 currently in contact and has transmitted it. If it has been transmitted, an advance is made to S338, where the customer information corresponding to the received customer ID is read out from the customer database 480. Then an advance is made to step S340, where the subject information corresponding to the received customer ID is read out from the customer database 480. Then, in step S342, the thus read-out data is transmitted to the robot 406.

Next, in step S344, it is checked whether or not a conversation record based on cartilage conduction has been received from the robot 406. If there is a received conversation record, an advance is made to S346, where, for each ID, it is analyzed and organized as conversation information and is written in to the customer database 480; then an advance is made to step S348. If, in step S344, no reception is conformed, an advance is made directly to S348. In step S348, it is checked whether or not handling of the customer 401 by the robot 406 has ended, and if it has not ended, a return is made to S344, so that, until the end of customer handling, steps S344 through S348 are repeated. When, in step S348, the end of customer handling is detected, the flow ends.

On the other hand, if, in step S336, it is not confirmed that the robot 406 has read out a customer ID and has transmitted it, the flow ends immediately. If, in step S320, no request for customer handling related to customer registration is confirmed, an advance is made to step S350, where regular customer handling processing not involving processing by an IC tag 470 is performed, and the flow ends.

Sixth Embodiment

Figure 23A:
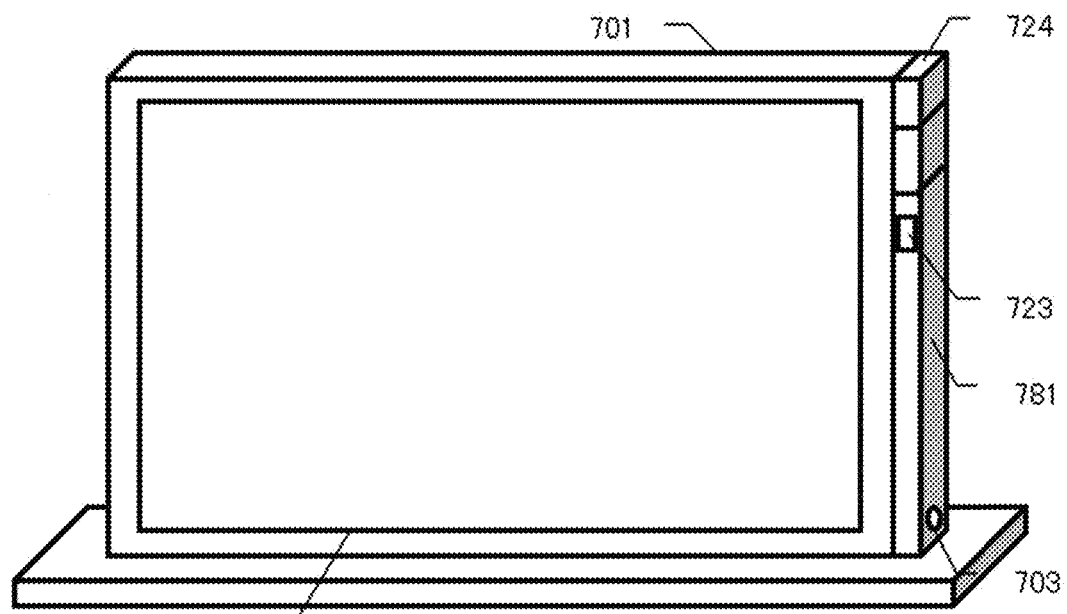
FIGS. 23A and 23B comprise perspective views related to a sixth embodiment of the present invention.
Figure 23B:
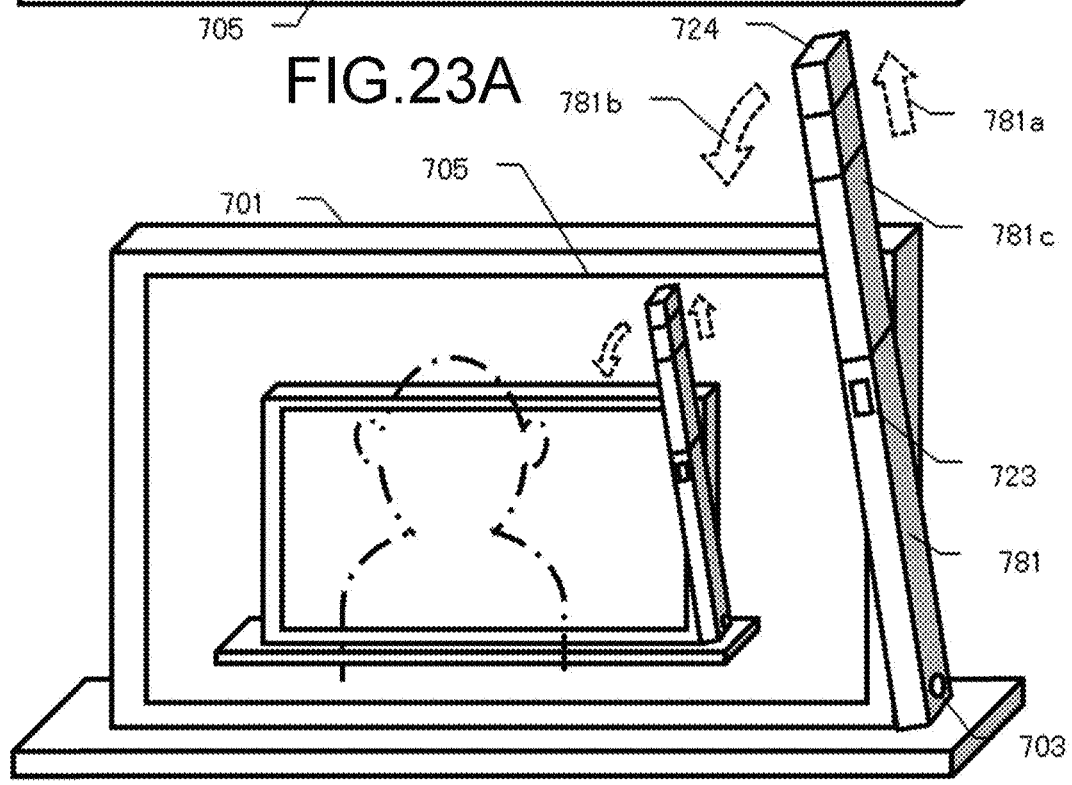

FIGS. 23A and 23B are perspective views related to a sixth embodiment according to one aspect of the present invention, and it is configured, like the fifth embodiment, as a customer handling system in a bank. However, whereas the fifth embodiment is a system employing a humanoid robot, the sixth embodiment is configured as a system including a display which a customer faces and a telescopic cartilage conduction talking unit which is provided at a side of the display and which a customer can take in his hand and put to his ear.

A detailed description follows with reference to FIGS. 23A and 23B. FIG. 23A is a front view of a stationary customer handling apparatus 701. The stationary customer handling apparatus 701 is provided with a large-screen display unit 705 which doubles as a touch panel. The stationary customer handling apparatus 701 is provided with, at its right side, a telescopic cartilage conduction talking unit 781 which is coupled to it via a free joint 703. The telescopic cartilage conduction talking unit 781 has, at the top end, a cartilage conduction unit 724, and is provided with, in a middle part, a microphone 723. As will be described later, the cartilage conduction unit 724 has a telescopic structure such that the cartilage conduction unit 724 can be pulled out upward. FIG. 23A basically shows a state where the telescopic cartilage conduction talking unit 781 is not in use and is stored at the right side of the stationary customer handling apparatus 701.

On the other hand, FIG. 23B shows a state where the telescopic cartilage conduction talking unit 781 of the stationary customer handling apparatus 701 is in use. As will be clear from FIG. 23B, a customer can, with his hand, pull out the cartilage conduction unit 724 upward by sliding a sliding part 781c in the direction of the arrow 781a, and can incline the cartilage conduction unit 724 forward. Since, as mentioned above, the telescopic cartilage conduction talking unit 781 is coupled to the stationary customer handling apparatus 701 via the free joint 703, it can be inclined not only forward but in any direction.

With the structure described above, a customer can, while keeping a posture in which he views bank information displayed on the large-screen display unit 705, pull out the cartilage conduction unit 724 and put it to his ear with his hand to hear bank information conveyed by voice even in a noisy environment in a bank. On the other hand, the customer's own voice can be collected by the microphone 723 which, in a state as just mentioned, is located close to the mouth. The cartilage conduction unit 724 is so balanced that it does not fall under its own weight or put a load on the customer, and is supported in a slack state so as not to resist the movement of the customer's hand. These features are also seen also in the fifth embodiment.

As shown in FIG. 23B, how to pull out the cartilage conduction unit 724 is displayed on the large-screen display unit 705 so that a first-time customer can communicate with the bank properly by cartilage conduction.

The various features of the embodiments described above can be implemented not only in those specific embodiments but also in any other embodiment so long as they provide their advantages. Moreover, the various features of the embodiments can be implemented with various modifications. Modified features can be implemented in appropriate combinations with each other and with unmodified features. For example, a configuration where an accessory like any shown in FIGS. 20 to 22 in connection with the fifth embodiment is used can be applied also to the sixth embodiment shown in FIGS. 23A and 23B.

In the fifth embodiment, as a means for holding a customer ID, an IC tag is taken.

However, what is usable as such a means for holding information is not limited to an IC tag, but may instead be a bar code or a two-dimensional bar code. A configuration where a customer ID is held directly in a means for holding information is not meant as any limitation. Instead, an accessory ID by which an accessory can be identified may be held there, in which case, by holding information associating each accessory with the customer to which it was distributed in a database, it is possible, by reading out the accessory ID, to identify the wearer indirectly.

Needless to say, the single-hand contact/maintaining processing described with reference to FIG. 19 in connection with the fifth embodiment is effective also in a case where vibration is conducted to the tragus or the like indirectly via an accessory as shown in FIG. 20.

Conclusive Descriptions: The following is conclusive descriptions of the features of the embodiments disclosed herein.

According to one embodiment disclosed herein, there is provided a watching system including a watching detection device and a watching notification device. The watching detection device has a cartilage conduction vibration source and a watching detection sensor, and is mountable to an ear with an entrance of an external auditory canal open. The watching notification device receives watching information from the watching detection sensor by performing short-range communication with the watching detection device. This contributes to comfortable wear of the watching detection device.

According to a specific feature, the watching detection device has an air conduction microphone, and functions as a hearing aid by vibrating the cartilage conduction vibration source in accordance with a voice signal picked up by the air conduction microphone. This makes it possible to perform watch by using a hearing aid which is used daily. According to another specific feature, the watching detection device makes the cartilage conduction vibration source vibrate in accordance with a voice signal received from the watching notification device via short-range communication. This makes it possible to perform watch by using a device, such as a mobile phone, through which it is possible to hear a voice signal received from another device.

According to another specific feature, the watching detection sensor is a masticatory movement sensor. According to another specific feature, the watching detection sensor is a voice sensor. For example, the voice sensor is a bone conduction microphone or an air-conducted sound microphone.

According to another specific feature, the watching notification device issues a notification when it has been impossible to receive a detection signal for a predetermined period of time.

According to another embodiment disclosed herein, there is provided a watching system including a watching detection device, and a plurality of watching notification devices which each receive watching information from the watching detection device via short-range communication with the watching detection device. The plurality of watching notification devices exchange with each other the watching information received. This makes it possible to deal with a missing part in the watching information received by one watching notification device by sharing the watching information received by the other watching notification devices, and thus to prevent confusion from occurring among the plurality of watching notification devices.

According to another embodiment disclosed herein, there is provided a watching system including a watching detection device, and a plurality of watching notification devices which each receive watching information from the watching detection device via short-range communication with the watching detection device. The plurality of watching notification devices issue different notifications based on the watching information. This makes it possible to perform watch in a manner suitable to each of the plurality of watching notification devices, which are different from each other in properties. According to a specific feature, the plurality of watching notification devices include a mobile phone and a notification device placed in a home.

According to another embodiment disclosed herein, there is provided a watching system including a watching detection device having a voice sensor, and a watching notification device that receives watching information from the watching detection sensor via short-range communication with the watching detection device. The watching notification device issues a notification of whether a voice signal picked up by the voice sensor is present, without issuing any notification of the contents of the voice signal. This helps protect privacy of a watching-target person. According to a specific feature, the watching notification device makes a judgment on urgency of the voice signal picked up by the voice sensor, and when the urgency is high, the contents of the voice signal is exceptionally notified. This makes it possible to obtain a specific notification in raw voice in a case where a scream or a cry for help has been received.

According to another embodiment disclosed herein, there is provided a watching detection device including a cartilage conduction vibration source and a watching detection sensor, and the watching detection device is mountable to an ear with an entrance of an external auditory canal open. This contributes to comfortable wear of the watching detection device.

According to a specific feature, the watching detection device has an air conduction microphone, and functions as a hearing aid by vibrating the cartilage conduction vibration source in accordance with a voice signal picked up by the air conduction microphone. According to another specific feature, the watching detection device vibrates the cartilage conduction vibration source in accordance with a voice signal received from the watching notification device via short-range communication, to thereby function as a device, such as a mobile phone, through which it is possible to hear a voice signal received from another device.

According to another specific feature, the watching detection sensor is a masticatory movement sensor. According to a more specific feature, the masticatory movement sensor can serve also as the cartilage conduction vibration source. According to another specific feature, the watching detection sensor is a voice sensor. More specifically, the voice sensor is a bone conduction microphone. Still more specifically, the bone conduction microphone can serve also as the cartilage conduction vibration source.

According to another specific feature, the watching detection sensor includes an air-conducted sound microphone for a hearing aid, and the air-conducted sound microphone is turned off when the bone conduction microphone is used. According to another specific feature, the voice sensor is an air-conducted sound microphone.

According to another embodiment disclosed herein, there is provided a watching notification device having an acquisition unit that acquires watching information from a voice sensor and a notification unit that issues a notification of whether a voice signal acquired by the acquisition unit is present, without issuing any notification of contents of the voice signal. This helps protect privacy of a watching-target person. According to a specific feature, the notification unit makes a judgment on urgency of the voice signal picked up by the voice sensor, and the contents of the voice signal is notified exceptionally when the urgency is high.

According to one embodiment disclosed herein, there is provided a robot including: a hand; and a cartilage conduction vibration source which is provided in the hand. Thus, communication is possible between the robot and the human by cartilage conduction with a natural movement.

According to a specific feature, the robot includes two hands, and the cartilage conduction vibration source is provided in each of the two hands. Thus, communication is possible between the robot and the human by cartilage conduction with a comforting staging in which, for example, the head of the person is held gently in both hands of the robot. In addition, stereophonic hearing is possible.

According to another specific feature, the robot includes a finger in the hand, and the cartilage conduction vibration source is provided in the finger. Thus, more efficient cartilage conduction is possible.

According to a more specific feature, there is provided a joint mechanism which guides the entire hand to achieve contact with the ear cartilage and which adjusts the finger to guide it to the tragus. Thus, adjustment for appropriate cartilage conduction is possible.

According to another specific feature, the robot includes a control unit which, when the two hands make contact with the ear cartilages of two ears respectively for cartilage conduction, controls the two hands so as not to restrain the movement of the face while maintaining the positions of the two hands relative to each other. Thus, cartilage conduction without a sense of restraint is possible.

According to another specific feature, the robot includes an eye which is movable in exterior appearance, and the eye is moved in coordination such that the line of sight of the eye points between the two hands. Thus, more intimate communication with the robot by cartilage conduction is possible.

According to another specific feature, the robot includes a mouth mechanism which is movable in exterior appearance, and the mouth mechanism moves in coordination with the voice conducted by the vibration of the cartilage conduction vibration source. Thus, communication by natural cartilage conduction is possible.

According to another specific feature, the robot includes a limiter which, when the hand makes contact with the ear cartilage to conduct the vibration of the cartilage conduction vibration source to the ear cartilage, adjusts the pressure of the contact. Thus, safe communication by cartilage conduction is possible.

According to another specific feature, the robot includes a communicating means for asking for consent when the hand is brought into contact with the ear cartilage to conduct the vibration of the cartilage conduction vibration source to the ear cartilage. Thus, communication by cartilage conduction without a sense of discomfort is possible.

According to another specific feature, the robot includes a control unit which, when the hand is brought into contact with the ear cartilage to conduct the vibration of the cartilage conduction vibration source to the ear cartilage, confirms safety beforehand. Thus, highly safe communication by cartilage conduction is possible.

According to another specific feature, the robot includes an abnormality detecting means, and, when the hand is brought into contact with the ear cartilage to conduct the vibration of the cartilage conduction vibration source to the ear cartilage, if the abnormality detecting means detects an abnormality, the hand is inhibited from making contact with the ear cartilage. Thus, even in an unforeseen situation, trouble can be avoided.

According to another feature of an embodiment disclosed herein, there is provided a robot including: a hand; and a heater which heats the hand to human body temperature. Thus, it is possible to achieve comfortable physical contact.

According to another embodiment disclosed herein, there is provided a cartilage conduction hearing system including: a cartilage conduction unit which conducts vibration to the ear cartilage of a human; and an accessory which is worn by the human and which covers at least part of the ear cartilage. The vibration of the cartilage conduction unit is conducted to the ear cartilage indirectly via the accessory. Thus, problems that arise from the cartilage conduction unit being in direct contact with the ear cartilage can be solved.

According to a specific feature, the cartilage conduction unit is shared among a large number of people, and different accessories are worn by the large number of people respectively. Thus, despite the sharing of the cartilage conduction unit touched by no one knows whom, it is possible to build a hearing system that provides the benefits of cartilage conduction hygienically.

According to another specific feature, the accessory is configured as one of an ear warmer, a headband, an ear cuff, and an ear-worn article of character merchandise. Thus, it is possible to motivate the person to wear the accessory spontaneously.

According to another specific feature, the cartilage conduction hearing system of this embodiment is configured as a customer handling system in a bank. Thus, despite the sharing of the cartilage conduction unit used by no one knows whom, it is possible to make suitable use of the benefits of the hearing system according to the present invention which provides the benefits of cartilage conduction hygienically.

According to another specific feature, in the cartilage conduction hearing system of this embodiment, the accessory includes an information holding unit that holds information for identifying an wearer thereof, and there is provided a reading means for reading the information in a state where the cartilage conduction unit can conduct the vibration of the cartilage conduction unit to the ear cartilage via the accessory. Thus, it is possible to build a hearing system that can meet the wearer's needs adroitly, and thus to motivate the person to wear the accessory. According to a more specific feature, the information is information on the wearer. According to another more specific feature, the information is information for identifying the accessory, and there is provided a related information holding means for holding information on the relationship between the wearer and the accessory.

According to another specific feature of this embodiment, the cartilage conduction unit is provided in a finger of the robot. Thus, the effect of contact with the ear cartilage is enhanced, and cartilage conduction can be used effectively.

According to a more specific feature, the robot includes a joint mechanism which, when the human guides the finger of the robot to the ear cartilage, holds an arm of the robot so as not to resist it. Thus, the cartilage conduction unit can be guided to the ear cartilage reliably, and smooth cooperation for cartilage conduction is possible between the human and the robot.

According to another more specific feature, the cartilage conduction unit conducts vibration to one ear of the human, and there is provided a following means for making the finger of the robot follow the movement of the head of the human. Thus, despite vibration being conducted to one ear, the conduction of the vibration can be prevented from being broken by the movement of the head of the human.

According to another feature of this embodiment, there is provided a cartilage conduction hearing system including: a cartilage conduction unit which conducts vibration to the ear cartilage of a human; and a support unit which movably supports the cartilage conduction unit. When the human guides to the ear cartilage, the support unit supports the cartilage conduction unit so as not to resist it. Thus, the cartilage conduction unit can be guided to the ear cartilage reliably without giving a sense of discomfort to the user. According to a specific feature, the cartilage conduction unit is provided in a finger of the robot. According to another specific feature, the cartilage conduction hearing system of this embodiment includes a display screen, and the cartilage conduction unit is supported on the display screen by the support unit.

According to another feature of this embodiment, there is provided a cartilage conduction hearing system including: a cartilage conduction unit which is provided in a finger of a robot to conduct vibration to the ear cartilage of a human; and a following means which is provided in the robot to make the finger of the robot follow the movement of the head of the human when the cartilage conduction unit conducts vibration to one ear of the human. Thus, despite vibration being conducted to one ear, the conduction of the vibration can be prevented from being broken by the movement of the head of the human.

According to another feature of this embodiment, there is provided a cartilage conduction hearing system including: a cartilage conduction unit provided in a first finger of a robot to conduct vibration to the ear cartilage of a human. The head of the human is supported by a second finger of the robot. Thus, for example, a lying person can be raised naturally to conduct communication.

According to a specific feature, it is provided in the first finger of each of a left and a right hand of the robot to conduct vibration to the ear cartilages of the left and right ears, respectively, of the human, and the head of the human is supported by the second fingers of the left and right hands of the robot. According to another specific feature, the first finger is a thumb, and the second finger is a middle finger.

According to another feature of this embodiment, there is provided a robot suitable for use in various cartilage conduction hearing systems as described above.

INDUSTRIAL APPLICABILITY

The present invention is applicable to a robot that can communicate with a human, and to a customer handling system in a bank or the like.

LIST OF REFERENCE SIGNS 211, 229 hand
242a, 242b cartilage conduction vibration source
206 robot
213 finger
227a, 227b joint mechanism
227a, 227b, 240 control unit
207 eye
209 mouth mechanism
225a, 225b heater
240 limiter
223, 215, 217, 240 communicating means
240 control unit
246, 238, 227a, 227b abnormality detection unit
321, 313, 413, 724 cartilage conduction unit
461, 462, 463, 464 accessory
470 information holding unit
457 information reading means
480 related information holding unit
227a joint mechanism
431a, 456, 238, 440 following means
227a support unit
705 display unit
321 first finger
313 second finger

The invention claimed is:

1. A robot comprising:
a hand having a finger;
a cartilage conduction vibration source which is provided in the finger and which conducts vibration to an ear cartilage of a human; and
a joint mechanism which guides the entire hand to achieve contact with the ear cartilage and which adjusts the finger to guide the finger to a tragus.

2. The robot according to claim 1, wherein
the robot has two hands, and
the cartilage conduction vibration source is provided in each of the two hands.

3. The robot according to claim 1, further comprising:
a heater which heats the hand to human body temperature.

4. The robot according to claim 1, further comprising:
a limiter which, when the hand makes contact with the ear cartilage to conduct vibration of the cartilage conduction vibration source to the ear cartilage, adjusts a pressure of the contact.

5. The robot according to claim 1, further comprising:
a communicating means for asking for consent when the hand is brought into contact with the ear cartilage to conduct vibration of the cartilage conduction vibration source to the ear cartilage.

6. The robot according to claim 1, further comprising:
a control unit which, when the hand is brought into contact with the ear cartilage to conduct vibration of the cartilage conduction vibration source to the ear cartilage, confirms safety beforehand.

7. The robot according to claim 1, further comprising:
an abnormality detecting means,
wherein, when the hand is brought into contact with the ear cartilage to conduct vibration of the cartilage conduction vibration source to the ear cartilage, if the abnormality detecting means detects an abnormality, the hand is inhibited from making contact with the ear cartilage.

8. The robot according to claim 1, wherein the joint mechanism holds an arm of the robot so as not to resist an external force which guides the hand to the ear cartilage.

9. The robot according to claim 1, wherein
the cartilage conduction vibration source conducts vibration to one ear of the human, and
the robot further comprises a following means for making the hand follow movement of a head of the human.

10. The robot according to claim 1, wherein
the finger is a first finger, and the hand has:
the first finger; and
a second finger which supports weight of a head of the human.

11. A robot comprising:
a hand;
a cartilage conduction vibration source which is provided in the hand and which conducts vibration to an ear cartilage of a human; and
a control unit,
wherein the robot has two hands, the cartilage conduction vibration source being provided in each of the hands, and the control unit, when the two hands make contact with ear cartilages of two ears respectively for cartilage conduction, controls the two hands so as not to restrain movement of a face while maintaining positions of the two hands relative to each other.

12. A robot comprising:

a hand;

a cartilage conduction vibration source which is provided in the hand and which conducts vibration to an ear cartilage of a human; and an eye which is movable in exterior appearance, wherein the robot has two hands, the cartilage conduction vibration source being provided in each of the hands, and the eye is moved in coordination such that a line of sight of the eye points between the two hands.

13. A robot comprising:

a hand;

a cartilage conduction vibration source which is provided in the hand and which conducts vibration to an ear cartilage of a human; and a mouth mechanism which is movable in exterior appearance, wherein the mouth mechanism moves in coordination with voice conducted by vibration of the cartilage conduction vibration source.

\* \* \* \* \*